(12) United States Patent
Savoi

(10) Patent No.: US 12,540,135 B2
(45) Date of Patent: Feb. 3, 2026

(54) COCRYSTALS DERIVATIVES OF APIXABAN

(71) Applicant: Guilherme Savoi, Buenos Aires (AR)

(72) Inventor: Guilherme Savoi, Buenos Aires (AR)

( * ) Notice: Subject to any disclaimer, the term of this patent is extended or adjusted under 35 U.S.C. 154(b) by 748 days.

(21) Appl. No.: 17/905,310

(22) PCT Filed: Jun. 21, 2021

(86) PCT No.: PCT/IB2021/055434
§ 371 (c)(1),
(2) Date: Aug. 30, 2022

(87) PCT Pub. No.: WO2021/260519
PCT Pub. Date: Dec. 30, 2021

(65) Prior Publication Data
US 2023/0133435 A1    May 4, 2023

Related U.S. Application Data

(60) Provisional application No. 63/042,692, filed on Jun. 23, 2020.

(51) Int. Cl.
C07D 471/04        (2006.01)

(52) U.S. Cl.
CPC ........ *C07D 471/04* (2013.01); *C07B 2200/13* (2013.01)

(58) Field of Classification Search
CPC .................................................. C07D 471/04
See application file for complete search history.

(56) References Cited

U.S. PATENT DOCUMENTS

| | | | |
|---|---|---|---|
| 9,045,473 B2 | 6/2015 | Peddi Reddy et al. | |
| 2006/0069258 A1 | 3/2006 | Shapiro et al. | |
| 2007/0203178 A1 | 8/2007 | Malley | |
| 2015/0018386 A1 | 1/2015 | Dwivedi et al. | |

FOREIGN PATENT DOCUMENTS

| | | |
|---|---|---|
| CN | 103360391 | 10/2013 |
| CN | 103539795 | 1/2014 |
| CN | 103833755 | 6/2014 |
| CN | 104086544 | 10/2014 |

(Continued)

OTHER PUBLICATIONS

Jafari et al., Cryst Growth Des, 2018, 18:6370-6387 (Year: 2018).*

(Continued)

*Primary Examiner* — Andrew D Kosar
*Assistant Examiner* — Jonathan D Mahlum
(74) *Attorney, Agent, or Firm* — Defillo & Associates, Inc; Evelyn A. Defillo

(57) ABSTRACT

New derivatives of 1-(4-methoxyphenyl)-7-oxo-6-[4-(2-oxopiperidin-1-yl) phenyl]-4,5,6,7-tetrahydro-1H-pyrazolo[3,4c] pyridine-3-carboxamide (Apixaban) able to increase its water solubility. These derivatives are cocrystals derivatives of Apixaban of different acids, from which the most outstanding are the following: Apixaban Malonic Acid derivative, Apixaban-a-Ketoglutaric Acid derivative, Apixaban-Gallic Acid derivative, Apixaban-Maleic Acid derivative, Apixaban-L-Tartaric Acid derivative, and Apixaban Citric Acid derivative.

16 Claims, 57 Drawing Sheets

(56) References Cited

FOREIGN PATENT DOCUMENTS

| | | |
|---|---|---|
| CN | 104650074 | 5/2015 |
| CN | 104672233 | 6/2015 |
| CN | 104788448 | 7/2015 |
| CN | 104910147 | 9/2015 |
| CN | 106986868 | 7/2017 |
| CN | 110922403 | 3/2020 |
| CN | 110934839 | 3/2020 |
| EP | 2752414 | 7/2014 |
| WO | WO2007001385 | 1/2001 |
| WO | WO2012168364 | 12/2012 |
| WO | WO2013119328 | 8/2013 |
| WO | WO2014056434 | 4/2014 |
| WO | WO2014111954 | 7/2014 |
| WO | WO2014173377 | 10/2014 |
| WO | WO2014203275 | 12/2014 |
| WO | WO2015021902 | 2/2015 |
| WO | WO2014108919 | 7/2017 |

OTHER PUBLICATIONS

Chen et al., Cryst Growth Des, 2016, 16:2923-2930 (Year: 2016).*
George et al., Cryst Growth Des, 2016, 16:5273-5282 (Year: 2016).*
Karimi-Jafari et al., Cryst Growth Des, 2018, 18:6370-6387 (Year: 2018).*
Shimono et al., Eur J Pharmaceut Sci, 2015, 76:217-224 (Year: 2015).*
Barbas et al., Mol Pharm, 2018, 15:1909-1916 (Year: 2018).*
Yong Chen, Long Li, Jia Yao, Yu-Yu Ma, Jia-Mei Chen and Tong-Bu Lu, Improving the Solubility and Bioavailability of Apixaban via Apixaban-Oxalic Acid Cocrystal, Cryst. Growth Des. 2016, 16, 2923-2930.
IPCOM000216902D-Rafael Barbas, Cristina Puigjaner and Rafel Prohens, Assembling the Puzzle of Apixaban Solid Forms, Mol. Pharmaceutics 2018, 15, 1909-1916.
Saroj Bembalkar, Investigation on Polymorphs of Apixaban, an Anticoagulant Drug: Study of Phase Transformations and Designing Efficient Process for tier Preparation, World Journal of Pharmaceutical Sciences, 2015, 3 (3), 663-677.
Peter Larkin, Polymorph Characterization of Active Pharmaceutical Ingredients (APIs) using Low-Frequency Raman Spectroscopy, Applied Spectroscopy, vol. 68, No. 7, 2014, pp. 758-766.
PCOM000216217D-Rafael Barbas, Cristina Puigjaner and Rafel Prohens, Assembling the Puzzle of Apixaban Solid Forms, Mol. Pharmaceutics 2018.
PCOM000227611D-Rafael Barbas, Cristina Puigjaner and Rafel Prohens, Assembling the Puzzle of Apixaban Solid Forms, Mol. Pharmaceutics 2018.

* cited by examiner

COCRYSTALS DERIVATIVES OF APIXABAN

CROSS REFERENCE TO RELATED APPLICATION

This application is a national stage entry of PCT/162021/055434 filed Jun. 21, 2021, under the International Convention and claiming priority over U.S. provisional Patent Application No. 63/042,692 filed Jun. 23, 2020.

FIELD OF THE INVENTION

The present application pertains to the field of pharmaceutical solid forms of Apixaban, particularly pharmaceutical forms that provide Apixaban with higher solubility, more particularly the pharmaceutical forms are Apixaban cocrystals obtained with pharmaceutical acceptable organic acids as coformers.

BACKGROUND OF THE INVENTION

The present application refers to derivatives of 1-(4-methoxyphenyl)-7-oxo-6-[4-(2-oxopiperidin-1-yl)phenyl]-4,5,6,7-tetrahydro-1H-pyrazolo[3,4c] pyridine-3-carboxamide (Apixaban).

Regarding the Apixaban polymorphism landscape, several patents and papers report on the synthesis and the interconversion of anhydrous and solvated Apixaban forms. In addition, several polymorphs were described. Although, the nomenclature employed and the accompanying characterization data are often unclear and incomplete, leading to a situation in which apparently the same form has been reported by different authors or claimed by different inventors.

A tentative rationalization of all the data reported in literature was performed by Barbas and coworker in 2018 (Mol. Pharmaceutics 2018, 15, 1909): an experimental screening, along with the comparison of the collected data with those from literature was carried out and up to 23 crystal forms were identified.

In the following Table 1 the comprehensive nomenclature rationalization for the polymorph and pseudo-polymorph landscape was reported:

| Adopted nomenclature | Reference Patent (Papers) | Native nomenclature |
|---|---|---|
| I (anhydrous form) | (Mol. Pharmaceutics 2018, 15, 1909) | I |
| | (RSC Adv. 2015, 5, 81696-81706) | N-1 |
| | (World Journal of Pharmaceutical Sciences, 2015, 3 (3), 663-677) | N-1 |
| | WO2007001385 | N-1 |
| | WO2014108919 | M |
| | CN103539795 | I |
| | WO2014111954 | "form" |
| | WO2014056434 | I |
| | WO2015021902 | A |
| | CN103539795 | III |
| | CN104788448 | X |
| II (anhydrous form) | (Mol. Pharmaceutics 2018, 15, 1909) | II |
| | WO2013119328 | III |
| | EP2752414 | A |
| III (hydrate) | (Mol. Pharmaceutics 2018, 15, 1909) | III |
| | WO2013119328 | DF-1 |
| | WO2012168364 | α |
| | EP2752414 | H-3 |
| | CN103539795 | IV |
| | WO2014108919 | N |
| | CN103833755 | B |
| | WO2014173377 | AP3 |
| | WO2014173377 | AP5 |
| | IPCOM000216902D | A |
| | WO2014203275 | "form" |
| IV (hydrate) | (Mol. Pharmaceutics 2018, 15, 1909) | IV |
| V (hydrate) | (Mol. Pharmaceutics 2018, 15, 1909) | V |
| | US2006/0069258 A1 | H2-2 |
| | CN103539795 | II |
| | CN104086544 | monohydrate |
| | WO2014108919 | S |
| VI | (Mol. Pharmaceutics 2018, 15, 1909) | VI |
| | WO2014173377 | AP4 |
| VII | (Mol. Pharmaceutics 2018, 15, 1909) | VII |
| VIII (hemibenzyl alcohol solvate) | (Mol. Pharmaceutics 2018, 15, 1909) | VIII |
| IX (DMSO solvate) | (Mol. Pharmaceutics 2018, 15, 1909) | IX |
| | PCOM000216902D | D |
| | CN103360391 | β |
| X (isopropanol solvate) | (Mol. Pharmaceutics 2018, 15, 1909) | X |
| XI (amorphous) | (Mol. Pharmaceutics 2018, 15, 1909) | XI |
| | U.S. Pat. No. 9,045,473 | amorphous |
| | WO2014203275 | amorphous |
| | CN103539795 | amorphous |
| | US20150018386 | amorphous |
| XII | (Mol. Pharmaceutics 2018, 15, 1909) | XII |
| XIII (unclear) | (Mol. Pharmaceutics 2018, 15, 1909) | XIII |
| | WO2013119328 | I |
| | IPCOM000216217D | I |
| | IPCOM000216902D | B |
| XIV (DMF solvate) | US20070203178 | DMF-5 |
| XV (formamide solvate) | US20070203178 | FA-2 |
| XVI (unclear) | WO2013119328 | II |
| | IPCOM000216217D | II |
| XVII | IPCOM000216902D | C |
| XVIII | PCOM000227611D | "form" |
| XIX | CN103539795 | V |
| XX | CN104672233 | Y |
| XXI | CN104650074 | "form" |
| XXII | CN104910147 | I |
| XXIII | CN104910147 | II |

According to the literature research, the XRPD calculated pattern (necessary for the crystalline phase determination) was available (from research in CSD—crystalline structure reported within) only for:

Apixaban anhydrous phase (named Form I—crystalline phase of the starting material);

Apixaban dimethyl formamide solvate (named Form XIV);

Apixaban formamide solvate (named Form XV);

Apixaban-Oxalic acid cocrystal (*Cryst. Growth Des.* 2016, 16, 2923-2930).

For all the remaining isolated Apixaban and its derivatives, crystalline phases and observed from literature research it was not possible to retrieve, nor the XRPD calculated pattern (the crystal structure not reported in CSD) neither the raw data of the experimental XRPD analysis (only images were available). In this sense, from the perspective of a cocrystal investigation, the resulting crystalline phases obtained were assessed by direct comparison with available reference XRPD calculated patterns as well as with XRPD experimental patterns images.

Moving to cocrystal derivatives of Apixaban, patent CN 106986868 firstly reported the preparation methods of eutectic crystals of Apixaban with oxalic acid, isonicotine, 3-aminopyridine and urea, along with their XRPD. Moreover, further derivatives were reported and characterized in two different papers.

In detail, Apixaban derivatives with Fumaric, Succinic and D,L-malic acids were prepared and characterized in *Appl. Spectrosc.* 2014, 68, 758; these derivatives were described as isostructural polymorphs, and XRPD of the described species are reported. Furthermore, in *Cryst. Growth Des.* 2016, 16, 2923, even an Apixaban/oxalic acid cocrystal was described. In the same article, even other coformers were tested, such as Malonic acid, Succinic acid, Maleic acid, Adipic acid, Glycolic acid, Salicylic acid, 4-hydroxybenzoic acid, L-malic acid and L-tartaric acid. Nevertheless, no cocrystals with these coformers were reported.

In the Table 2 below, the results on the cocrystal derivatives of Apixaban in the literature are reported.

| Title | Patent Number | DOI | Author/Applicants | Journal | Patent Type | Compound Name | Date | Analytical techniques and notes | Notes |
|---|---|---|---|---|---|---|---|---|---|
| Patents | | | | | | | | | |
| Eutectic crystals containing apixaban, and preparation methods thereof | CN106986868A | | / | | Preparation of eutectic crystals of Apixaban | Apixaban | 2017 Jul. 28 | XRPD of Apixaban derivatives | Eutectic crystals and preparation methods of: apixaban/oxalic acid apixaban/isonicotine apixaban/3-aminopyridine apixaban/urea |
| Papers | | | | | | | | | |
| Polymorph Characterization of Active Pharmaceutical Ingredients (APIs) using Low-Frequency Raman Spectroscopy | | 10.1366/13-07329 | Peter J. Larkin, Marta Dabros, Beth Sarsfield, Eric Chan, James T. Carriere, Brian C. Smith | Applied Spectroscopy | | Apixaban | Volume 68, Number 7, 2014 | Low frequency Raman, XRPD and SC XRD (not reported in CSD) | Coformer tested: Fumaric acid Succinic acid D,L malic acid Isostructural CoCrystals (crystalline structure determined). From CSD research not found. |
| Improving the Solubility and Bioavailability of Apixaban via Apixaban-Oxalic Acid Cocrystal | | 10.1021/ac s.c gd.6b00266 | Young Chen, Long Li, Jia Yao, Yu-Yu Ma, Jia-Mei Chen and Tong-Bu Lu | Crystal Growth & Design | | Apixaban | Mar. 31, 2016 | XRPD DSC on oxalic apixaban cocrystal hydrate. CSD ref. OKAWEE | Other coformer tested: Malonic acid Succinic acid Maleic acid Adipic acid Glycolic acid Salicylic acid 4-hydroxybenzoic acid L-malic acid L-tartaric acid No cocrystal with these coformers are reported. |

Therefore, it is desirable to provide new derivatives of Apixaban with good solubility in water, a defined chemical structure and no observed adverse effect level (NOAEL). The new derivatives of Apixaban must have good stability and compressibility, useful for preparing pharmaceutical compositions in the form of tablets.

BRIEF DESCRIPTION OF THE DRAWINGS

The features and advantages of certain embodiments will be more readily appreciated when considered in conjunction with the accompanying figures. The figures are not to be construed as limiting any of the preferred embodiments.

DETAILED DESCRIPTION OF THE INVENTION

Figure 1:
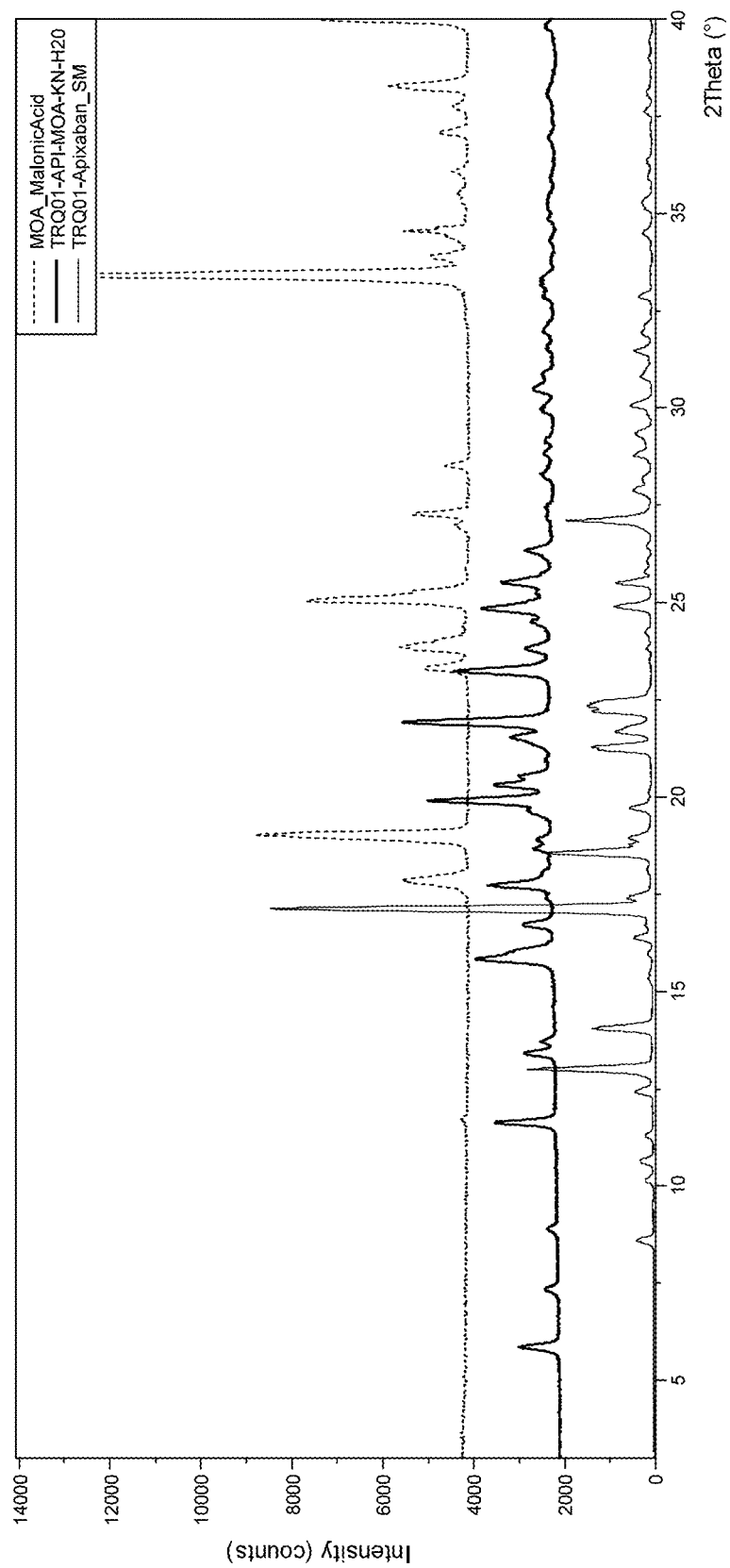
FIG. 1 is the XRPD pattern comparison between TRQ01-Apixaban (black line) and the solid isolated from KN experiment using MOA (red line). XRPD pattern of Malonic Acid (green line) is reported as reference.

For the sake of clarity and comprehension of the description, the following Table comprises a Glossary of terms used along the same.

TABLE 3

Glossary: Abbreviation table

| Abbreviation | Definition |
|---|---|
| ABZ | Benzyl alcohol |
| ACT | Acetone |
| API | Apixaban |
| CAN | Acetonitrile |
| CIA | Citric Acid |

TABLE 3-continued

Glossary: Abbreviation table

| Abbreviation | Definition |
| --- | --- |
| Class 1 | Unrestricted salt-formers used because physiologically ubiquitous ions or intermediate metabolites in biochemical pathways |
| Class 2 | Not naturally occurring salt-formers but profusely employed due to their low toxicity and good tolerability |
| Class 3 | No prohibitive adverse salt-formers but some of these have their own pharmacological activity or less frequently used in the past |
| COU | p-Coumaric Acid |
| CSD | Cambridge Structure Database |
| DCBA | 2,4-Dichlorobenzyl Alcohol |
| DHB | 2,5-Dihydroxybenzoic Acid |
| DMA | Dimethylacetamide |
| DSC | Differential Scanning Calorimetry |
| EGA | Evolved Gas Analysis |
| ETA | Ethyl acetate |
| ETH | Ethanol |
| FER | Ferulic Acid |
| FT-IR | Fourier Transform Infrared Spectroscopy |
| FT-Raman | Fourier Transform Raman Spectroscopy |
| GAL | Gallic Acid |
| GLY | Glycolic Acid |
| GRAS | Generally Recognized as Safe |
| GTR | Glutaric Acid |
| $H_2O$ | Water |
| Iidg | Inactive ingredients Database Guide |
| ITA | Itaconic Acid |
| KGL | α-Ketoglutaric Acid |
| KN | Kneading |
| LTA | L-Tartaric Acid |
| MEA | Maleic Acid |
| MET | Methanol |
| MOA | Malonic Acid |
| MPR | 2-Methyl-1-Propanol |
| NMR | Nuclear Magnetic Resonance |
| NP | New pattern |
| NS | Not sieved |
| 1PR | 1-Propanol |
| S | Sieved |
| SL | Slurry |
| ssSL | Slurry from Saturated Solution |
| TGA | Thermal Gravimetric Analysis |
| THF | Tetrahydrofuran |
| TRI | Trimesic Acid |
| VAN | Vanillic Acid |
| XRPD | X-Ray Powder Diffraction |

With regards to the cocrystal screening protocol, solid state kneading was tested as a first approach. The kneading methodology was found to be an extremely powerful technique to discover new derivatives. Moreover, the performed experiments confirmed the high tendency of Apixaban to form new derivatives with the selected coformers. Based on the collected results, and taking into account the solubility of the tested coformer in water, fifteen coformers such as MOA, KGL, GAL, MEA, GLY, LTA, CIA, GTR, DCBA, ITA, COU, DHB, FER, TRI and VAN were identified.

From the results collected from kneading experiments, the isolation of the observed derivatives was attempted through liquid-based methods such as slurry. Slurry in coformer saturated solutions were performed, the isolated species was characterized by means of thermal (DSC and TGA/EGA) and spectroscopic analyses (FT-IR, FTRaman and 1H-NMR).

The isolated derivatives are summarized below, and a brief description of each was reported.

API-KGL derivative NP02: it was synthesized from a slurry of API and 1 equivalent of KGL in ETA. The stoichiometry of the species could be quantified as API:KGL 1:1.

API-GAL derivative NP01b: it was synthesized by dissolution of API and 1 equivalent of GAL in $H_2O$ at 50° C. NMR spectrum disclosed the stoichiometry of the isolated species as API:GAL 1:0.35.

API-MEA derivative NP01: it was synthesized from a slurry of API and 3 equivalents of MEA in ETA. A complete characterization of the species was carried out. 1H-NMR spectrum showed the presence of both API and MEA in a stoichiometric ratio of API:MEA 1:0.5.

API-LTA derivative NP01: it was synthesized from a slurry of API and 1 equivalent of LTA in ACN. A complete characterization of the species was carried out. NMR spectrum showed the presence of both API and LTA in a stoichiometric ratio of API:LTA 1:0.5.

API-CIA derivative NP02: it was synthesized from a slurry of API and 1.1 equivalent of CIA in ETA. A complete characterization of the species was carried out. NMR spectrum showed the presence of both API and CIA in a stoichiometric ratio of API:CIA 1:0.5.

API-MOA derivative NP01: it was synthesized by ssSL reaction in $H_2O$. A complete characterization of the species was carried out. NMR spectrum showed the presence of both API and MOA in a stoichiometric ratio of API:MOA 1:0.25.

EXPERIMENTAL

Prescreening
Cocrystals Synthesis

Generally, cocrystals were prepared by solid and liquid based methods; the reactivity of the substrate was initially investigated by solid state reactions (Kneading) and then confirmed and explored by solution reactions: slurry maturation, crystallization from solution and solvent evaporation.

Solid State Kneading

As a first step of the Cocrystal synthesis, solid state Kneading was tested.

Apixaban (50 mg) and the chosen coformer (1.0 equivalent) were accurately weighed and transferred in a stainless jar equipped with stainless ball. The mixture was ground by ball milling in a Retsch MM 200 grinder for 15 minutes at a frequency of 30 Hz with a catalytic amount of $H_2O$ (10 µl). The recovered powders were analyzed by XRPD and the patterns compared with that of Apixaban and coformer.

Moreover, the performed experiments using the kneading methodology provided new derivatives of Apixaban with selected coformers, wherein the latter have been selected from the group consisting of MOA, KGL, GAL, MEA, GLY, LTA, CIA, GTR, DCBA, ITA, COU, DHB, FER, TRI and VAN.

Based on the collected results and taking into account the solubility of the tested coformer in water, a new more restricted group of six coformers was selected. These new derivatives were obtained using the following coformers: MOA, KGL, GAL, MEA, LTA and CIA, and their derivatives were in depth studied.

Figure 2:
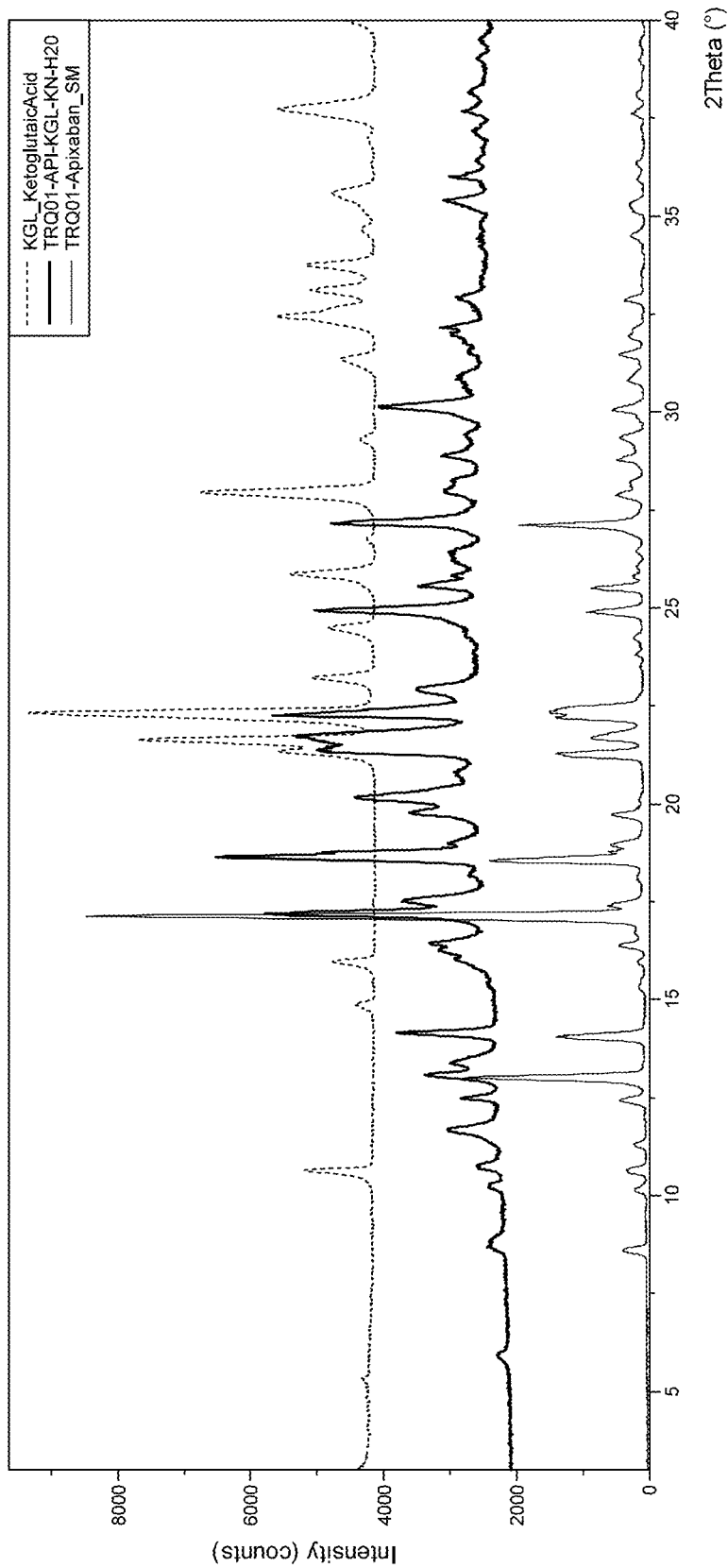
FIG. 2 is the XRPD pattern comparison between TRQ01-Apixaban (black line) and the solid isolated from KN experiment using KGL (red line). XRPD pattern of α-Ketoglutaric Acid (green line) is reported as reference.
Figure 3:
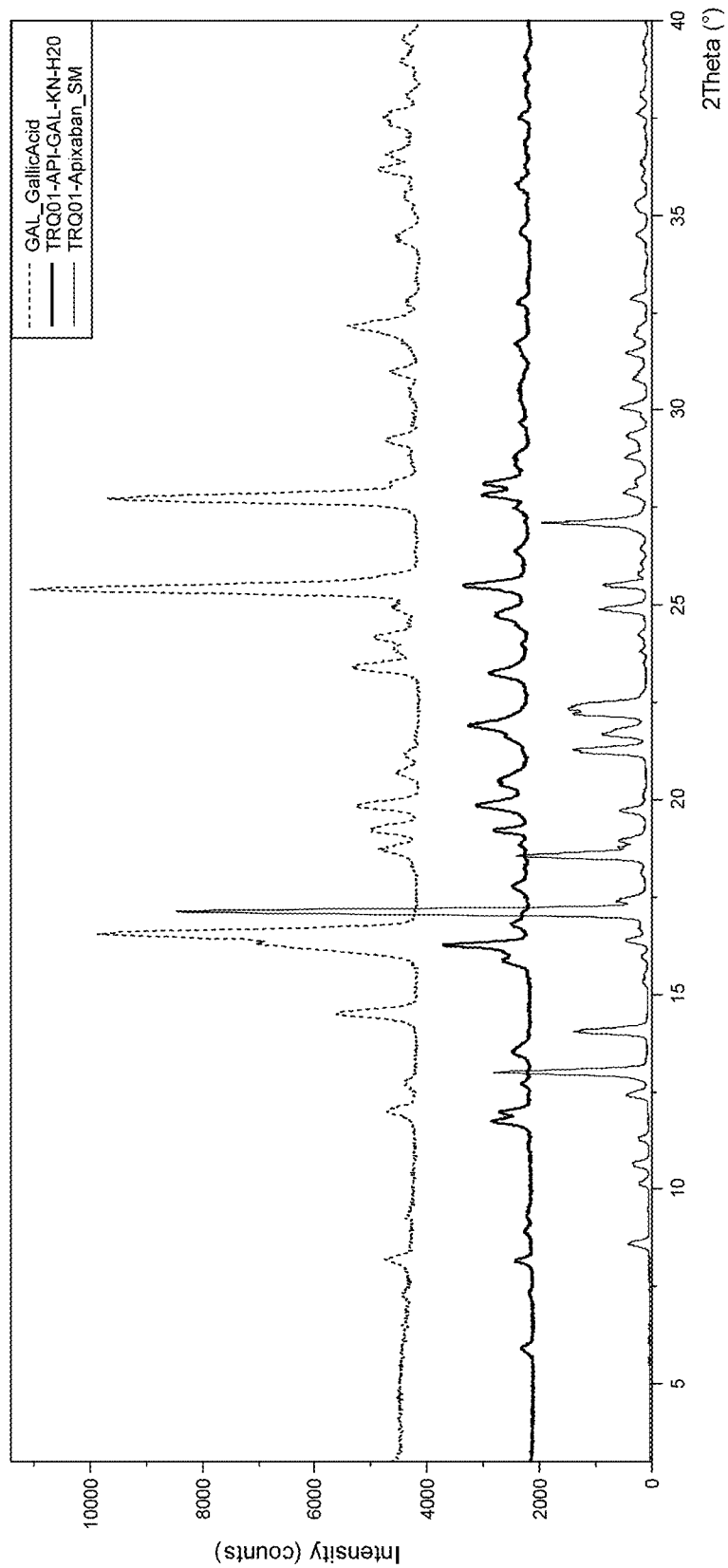
FIG. 3 is the XRPD pattern comparison between TRQ01-Apixaban (black line) and the solid isolated from KN experiment using GAL (red line). XRPD pattern of Gallic Acid (green line) is reported as reference.
Figure 4:
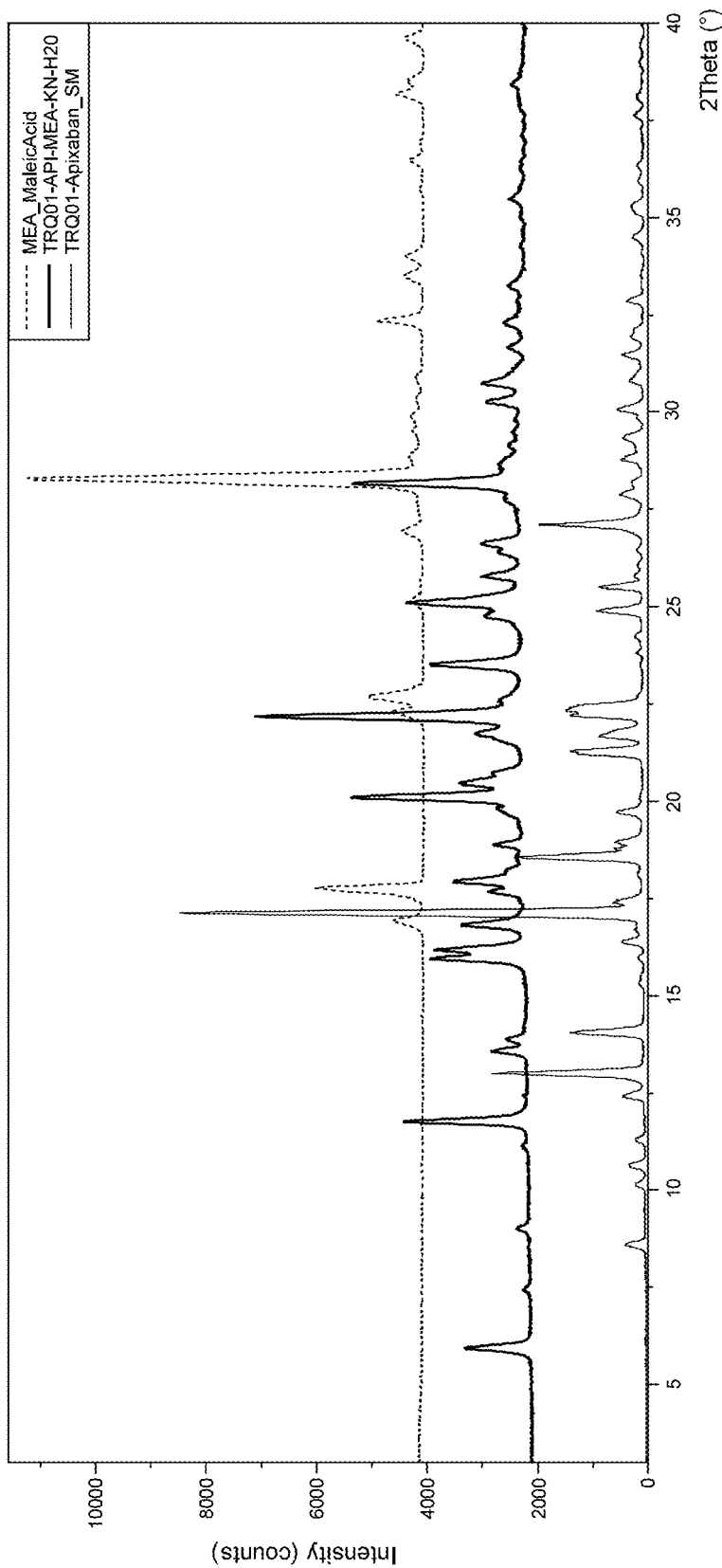
FIG. 4 is the XRPD pattern comparison between TRQ01-Apixaban (black line) and the solid isolated from KN experiment using MEA (red line). XRPD pattern of Maleic Acid (green line) is reported as reference.
Figure 6:
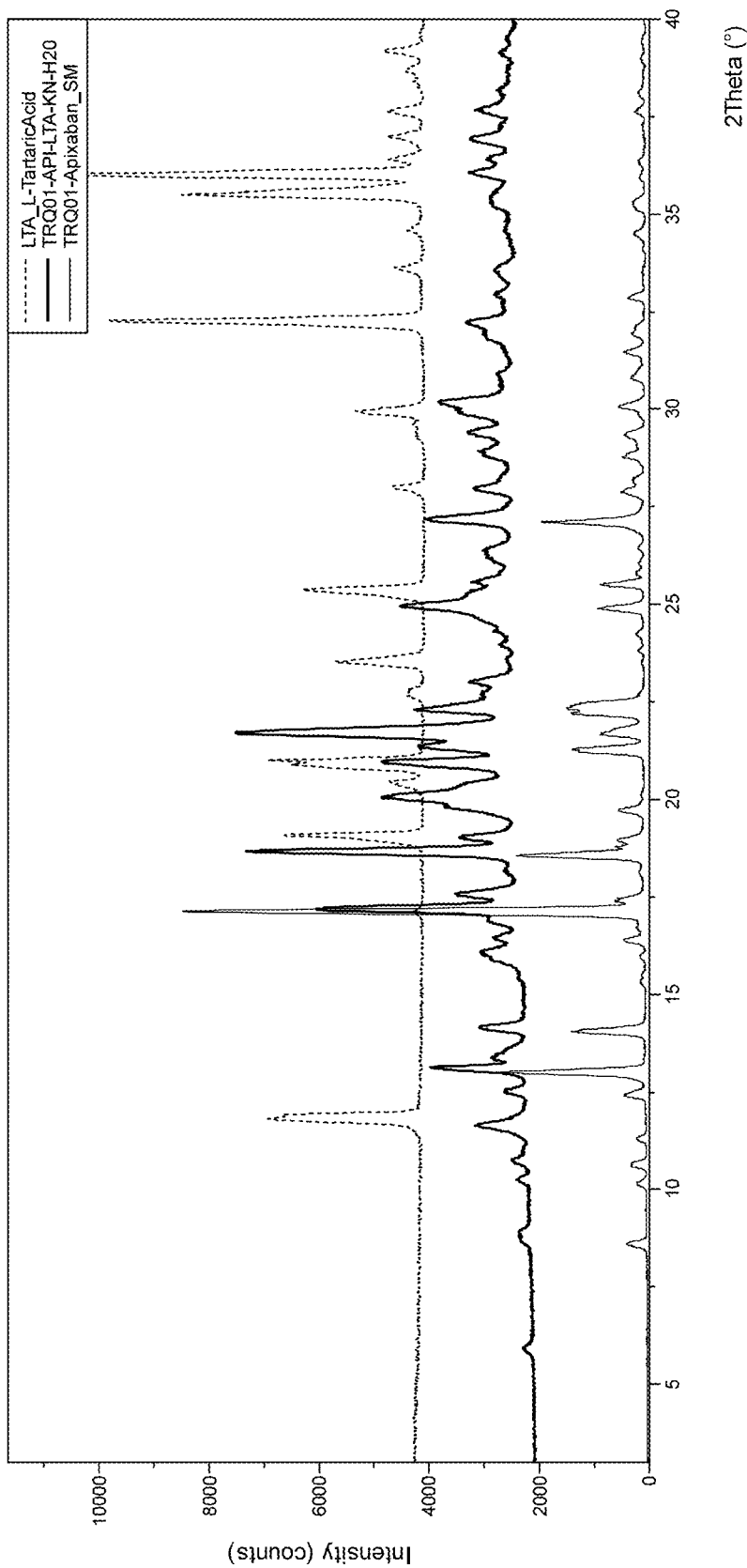
FIG. 6 is the XRPD pattern comparison between TRQ01-Apixaban (black line) and the solid isolated from KN experiment using LTA (red line). XRPD pattern of L-Tartaric Acid (green line) is reported as reference.
Figure 7:
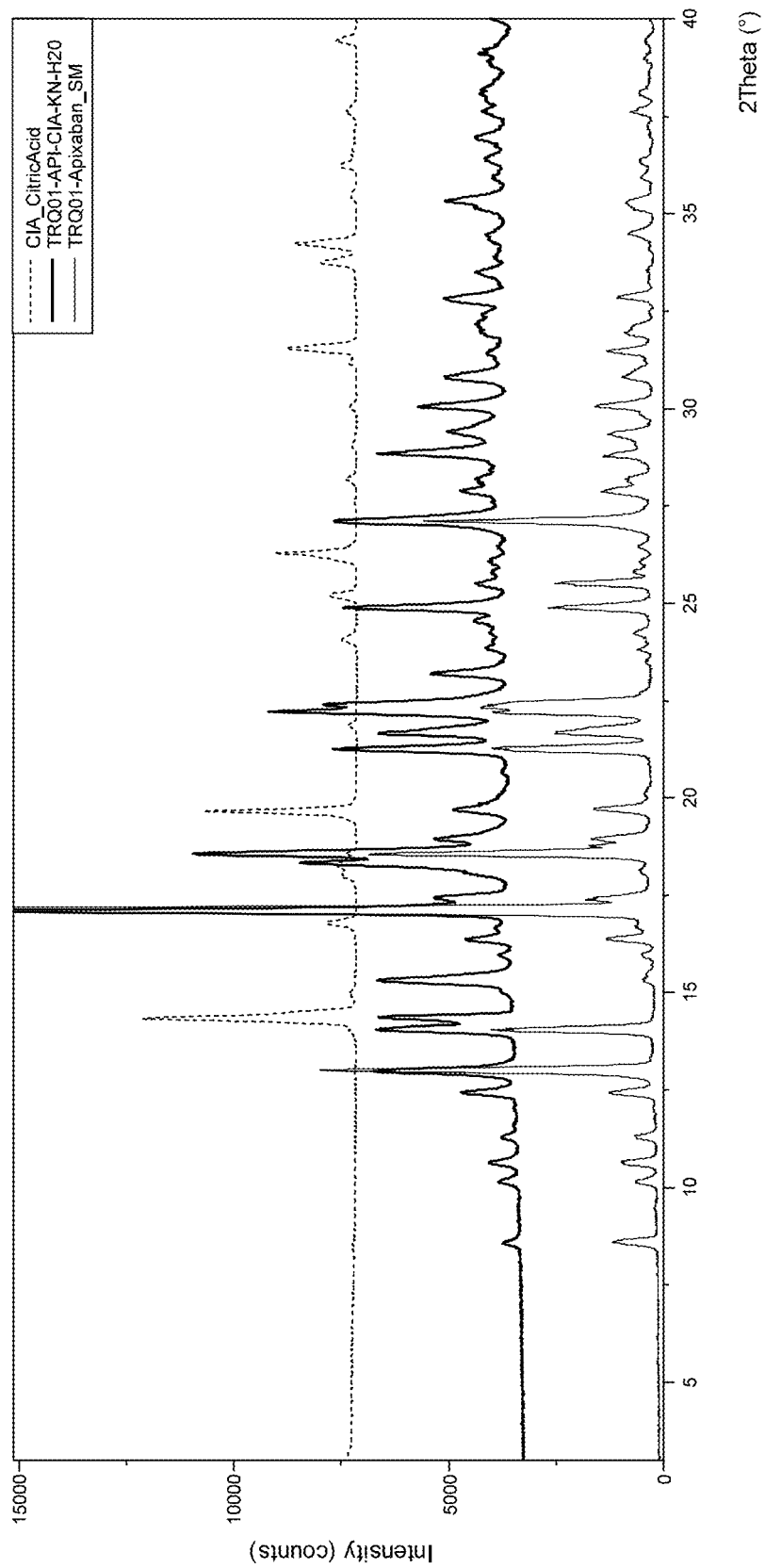
FIG. 7 is the XRPD pattern comparison between TRQ01-Apixaban (black line) and the solid isolated from KN experiment using CIA (red line). XRPD pattern of Citric acid (green line) is reported as reference.

As a first step, XRPD pattern comparisons between TRQ01-Apixaban (black line), the solid isolated from KN experiment using each coformer (red line), and the used coformer (green line) were performed, wherein these comparisons are shown as follows: MOA (FIG. 1), KGL (FIG. 2), GAL (FIG. 3), MEA (FIG. 4), LTA (FIG. 6) and CIA (FIG. 7).

In turn, probable new derivatives were observed from experiments carried out with the following coformers GLY, GTR, DCBA, ITA, COU, DHB, FER, TRI and VAN, but at the moment, only XRPD pattern comparisons between TRQ01-Apixaban (black line), the solid isolated from KN experiment using each coformer (red line), and the coformer (green line) were performed.

Figure 5:
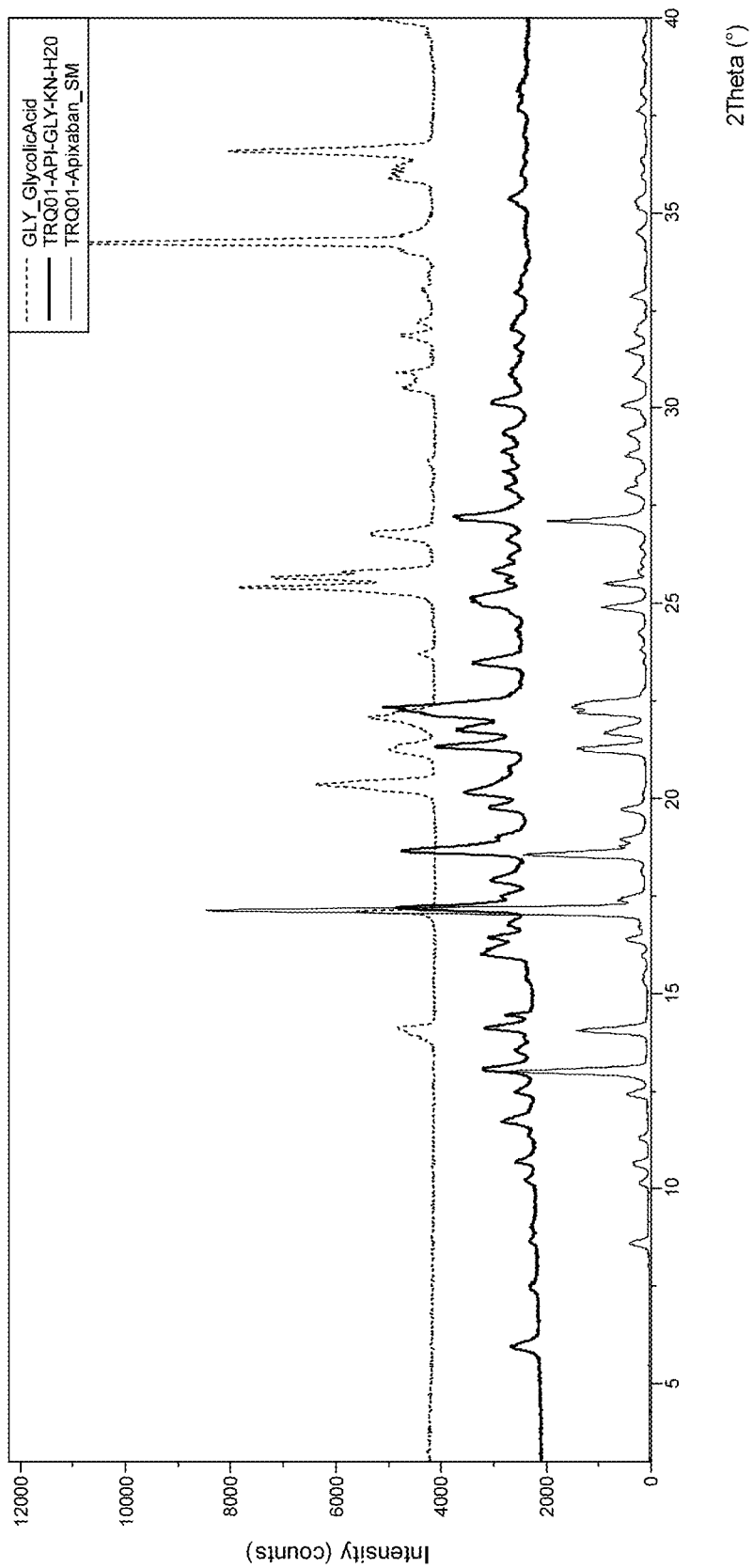
FIG. 5 is the XRPD pattern comparison between TRQ01-Apixaban (black line) and the solid isolated from KN experiment using GLY (red line). XRPD pattern of Glycolic Acid (green line) is reported as reference.
Figure 8:
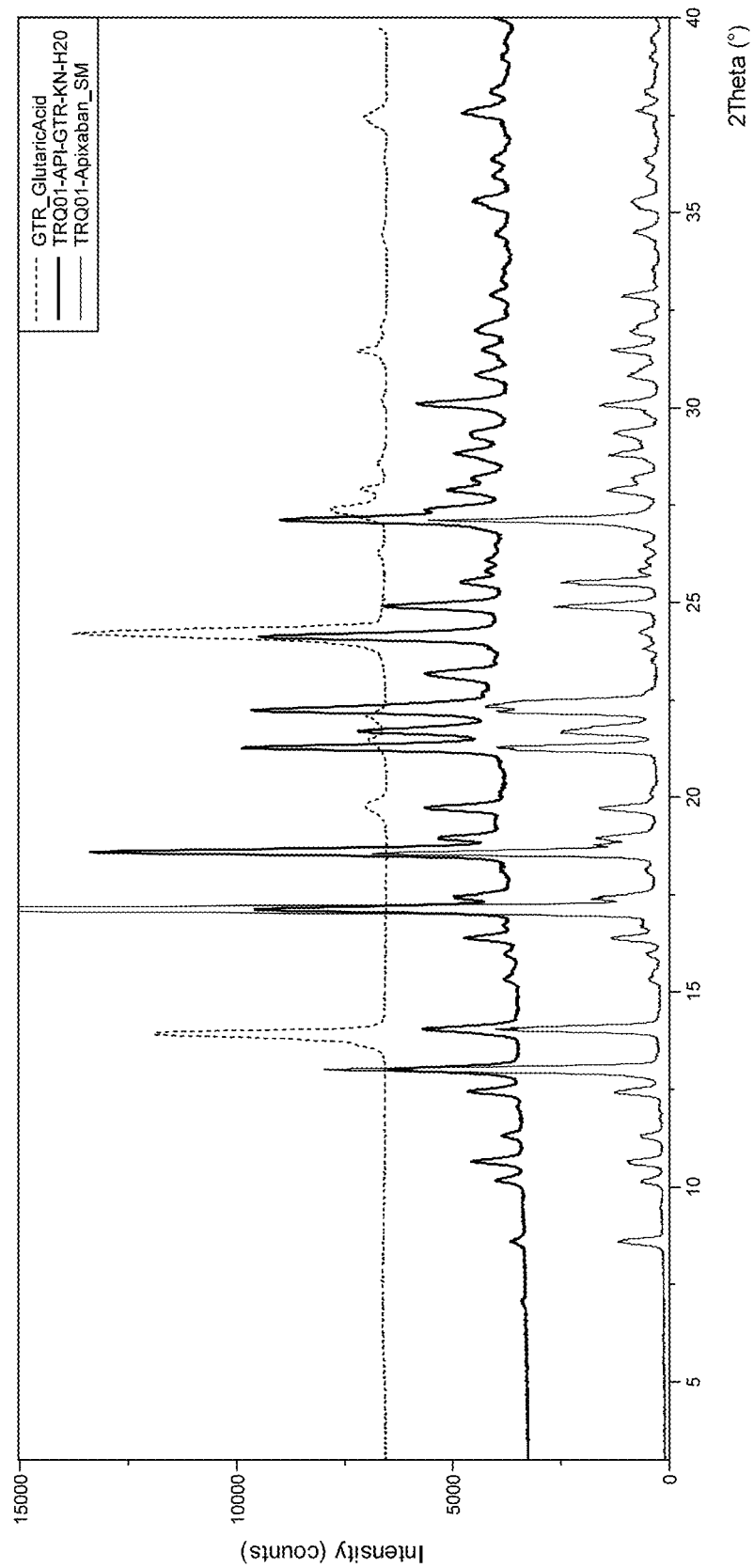
FIG. 8 is the XRPD pattern comparison between TRQ01-Apixaban (black line) and the solid isolated from KN experiment using GTR (red line). XRPD pattern of Glutaric acid (green line) is reported as reference.
Figure 9:
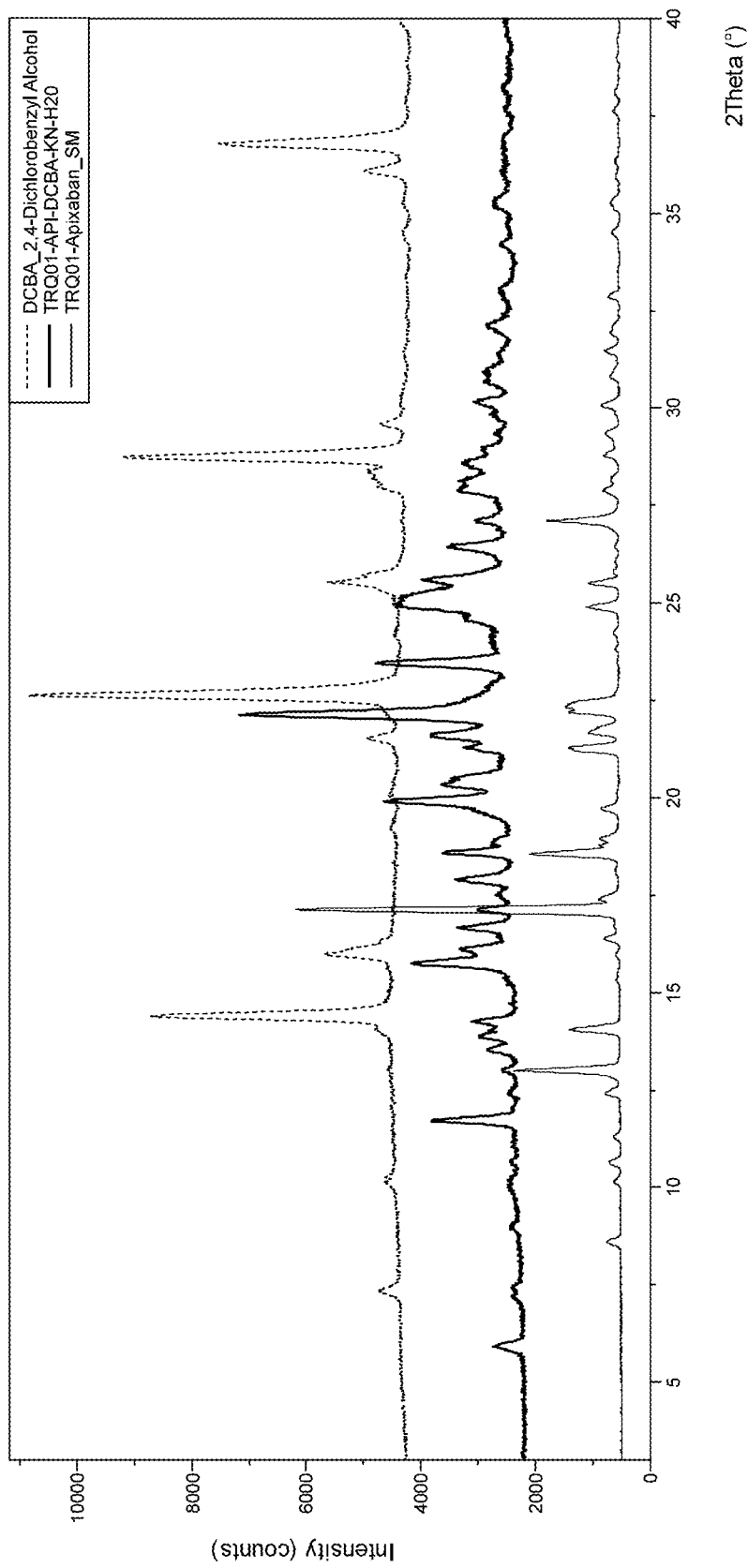
FIG. 9 is the XRPD pattern comparison between TRQ01-Apixaban (black line) and the solid isolated from KN experiment using DCBA (red line). XRPD pattern of 2,4-Dichlorobenzyl Alcohol (green line) is reported as reference.
Figure 10:
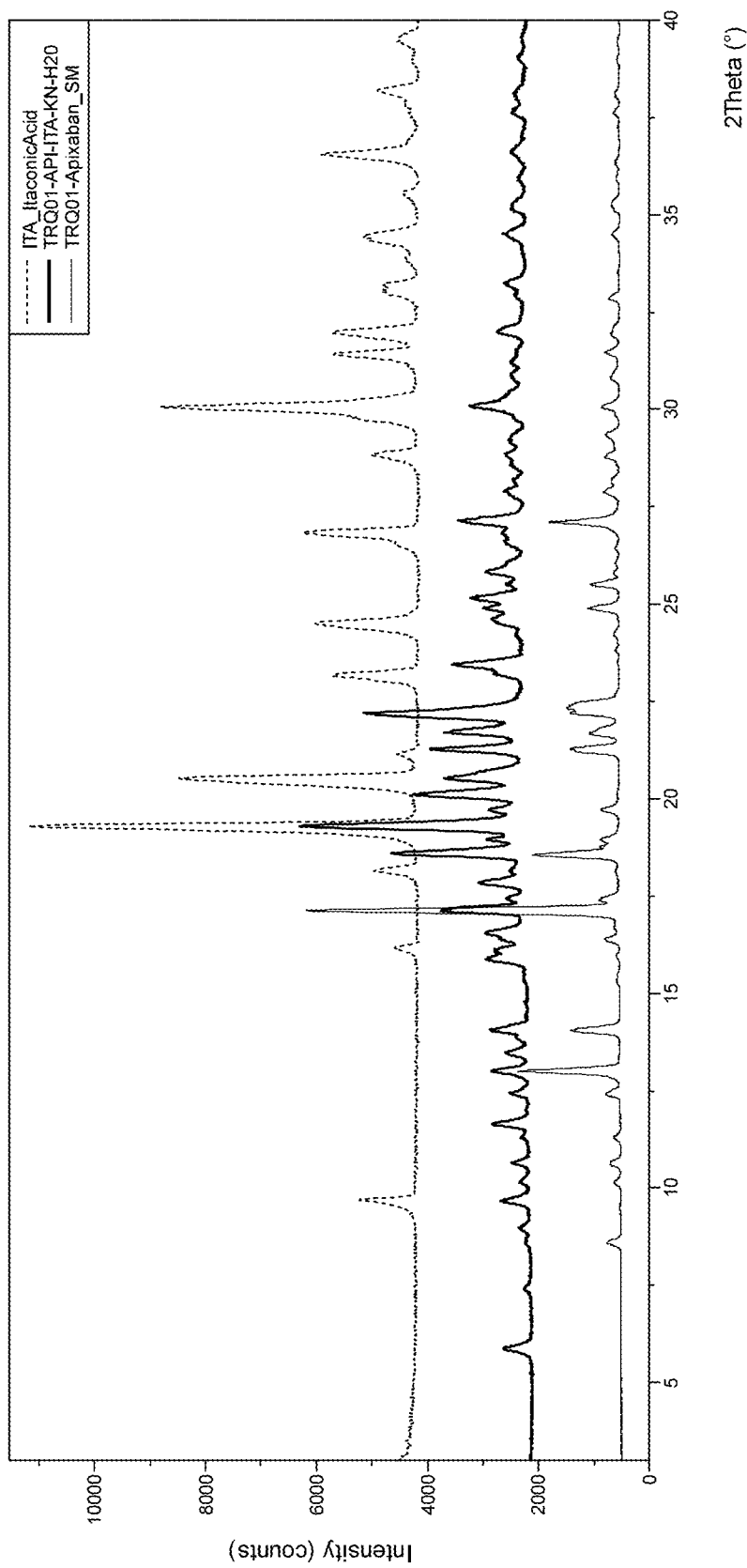
FIG. 10 is the XRPD pattern comparison between TRQ01-Apixaban (black line) and the solid isolated from KN experiment using ITA (red line). XRPD pattern of Itaconic acid (green line) is reported as reference.
Figure 11:
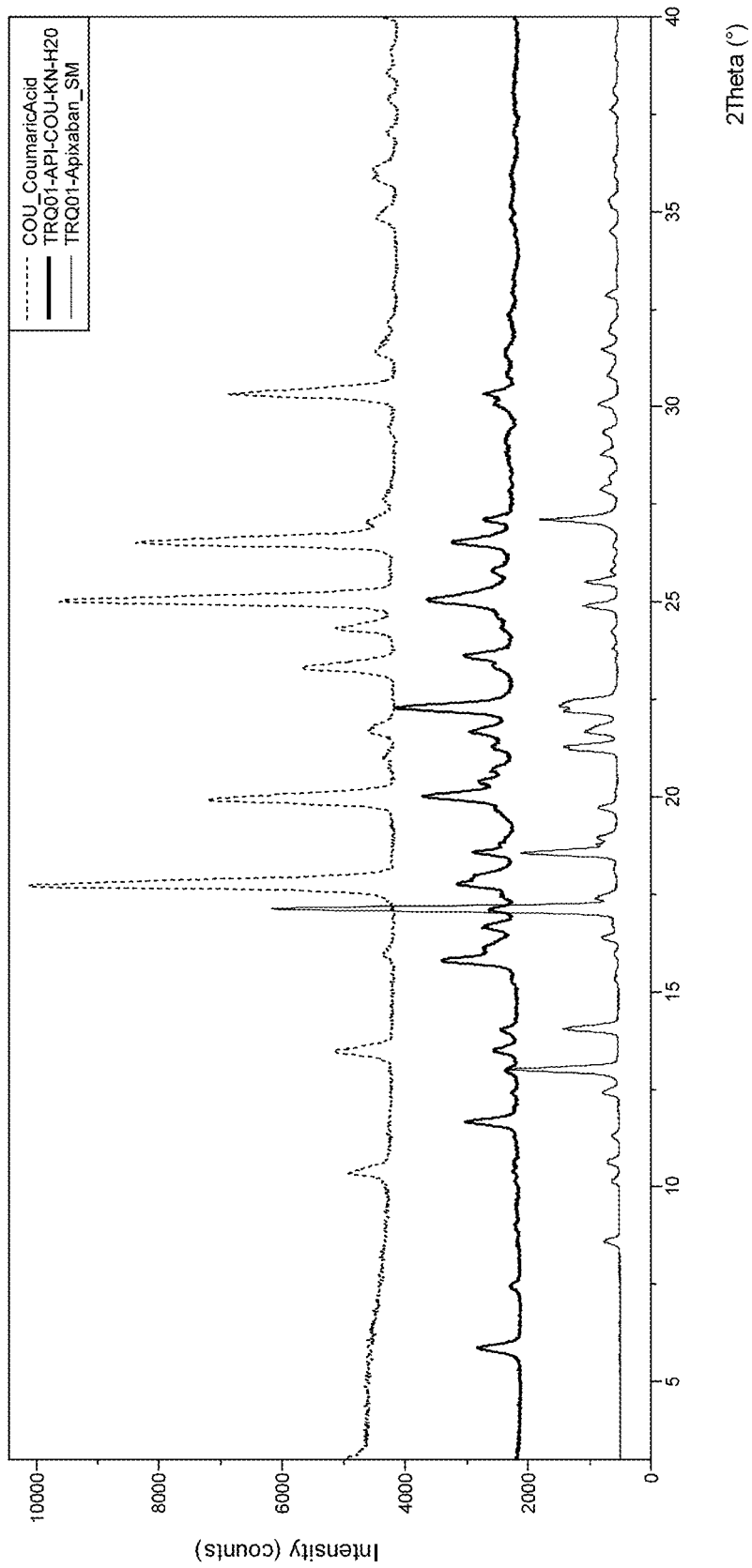
FIG. 11 is the XRPD pattern comparison between TRQ01-Apixaban (black line) and the solid isolated from KN experiment using COU (red line). XRPD pattern of Coumaric acid (green line) is reported as reference.
Figure 12:
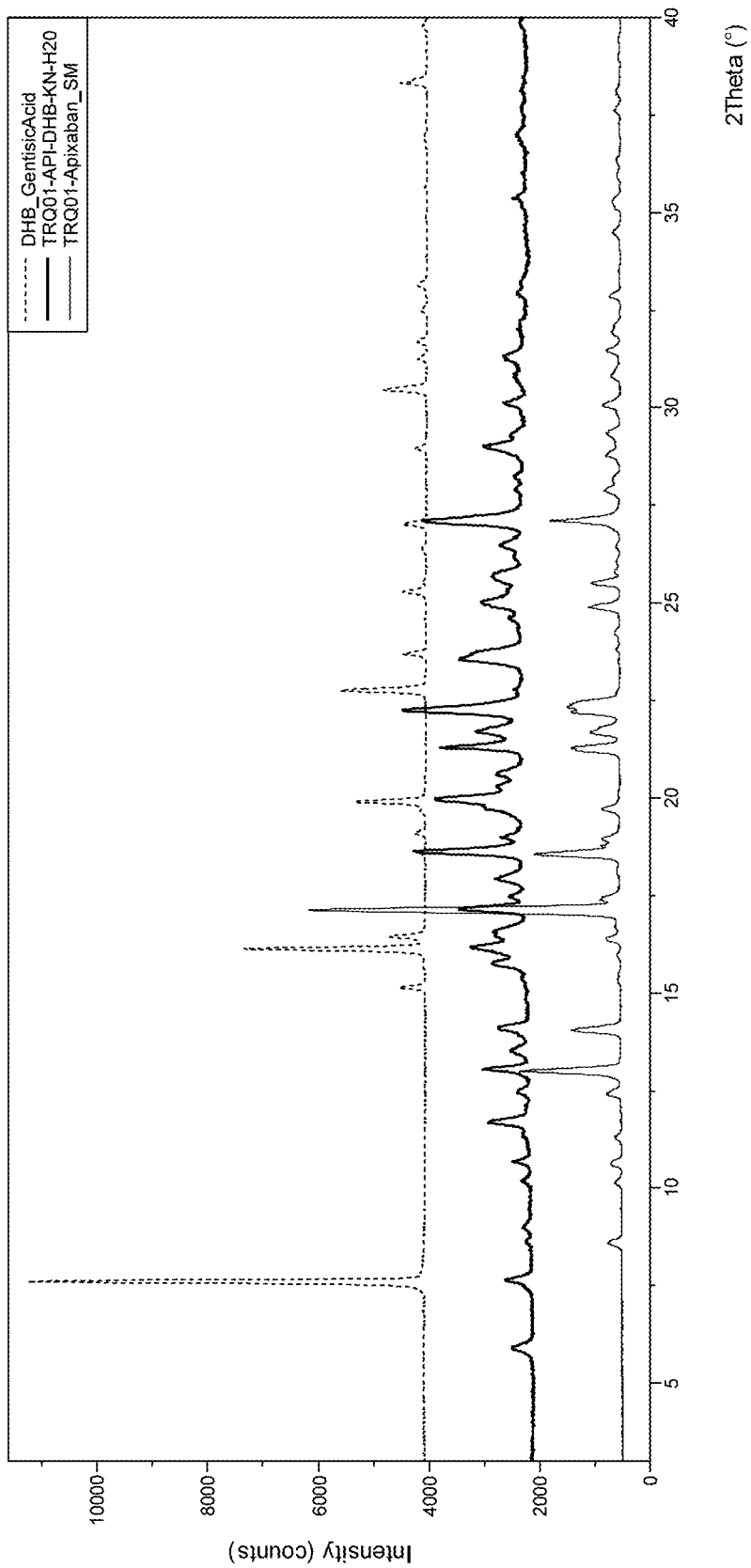
FIG. 12 is the XRPD pattern comparison between TRQ01-Apixaban (black line) and the solid isolated from KN experiment using DHB (red line). XRPD pattern of Gentisic acid (green line) is reported as reference.
Figure 13:
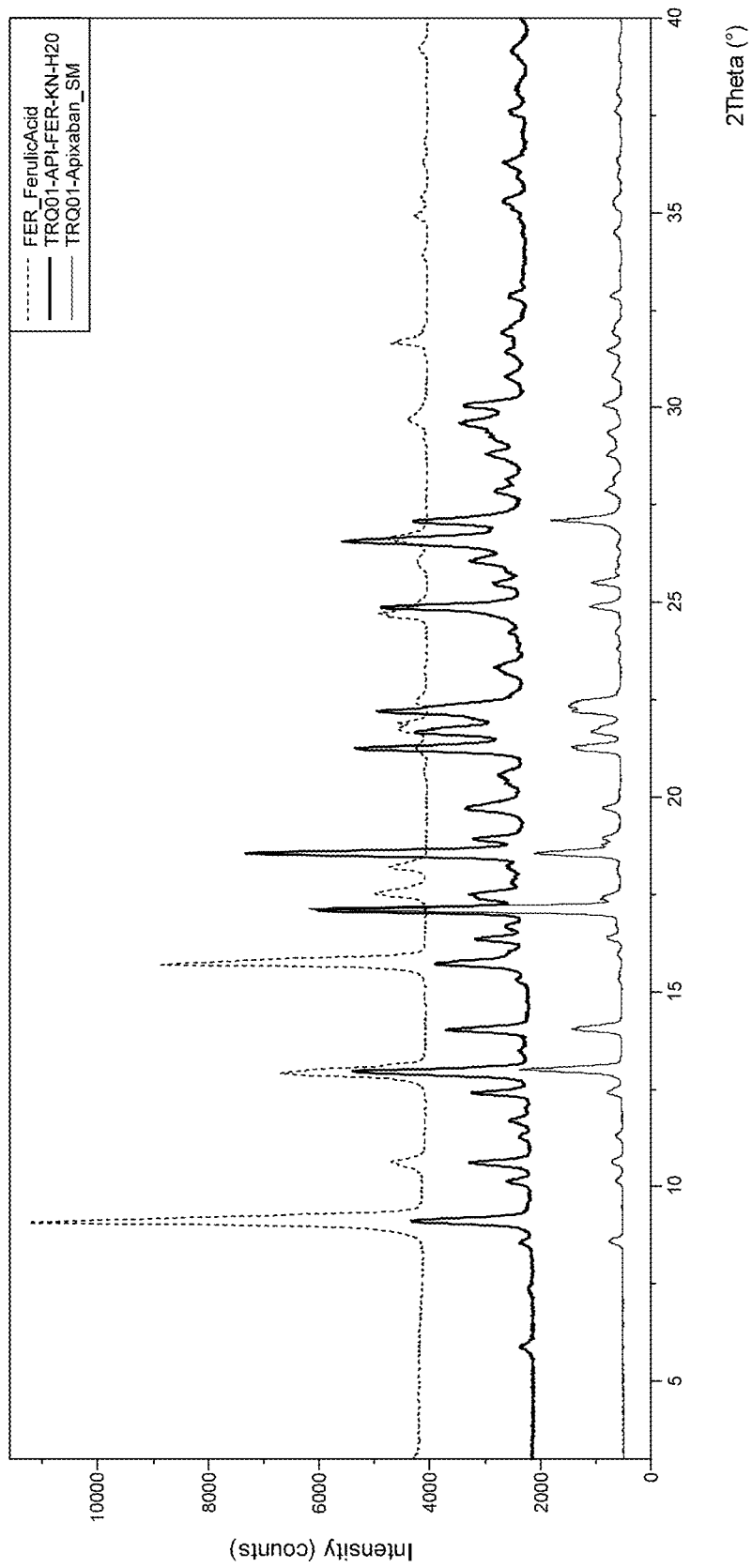
FIG. 13 is the XRPD pattern comparison between TRQ01-Apixaban (black line) and the solid isolated from KN experiment using FER (red line). XRPD pattern of Ferulic acid (green line) is reported as reference.
Figure 14:
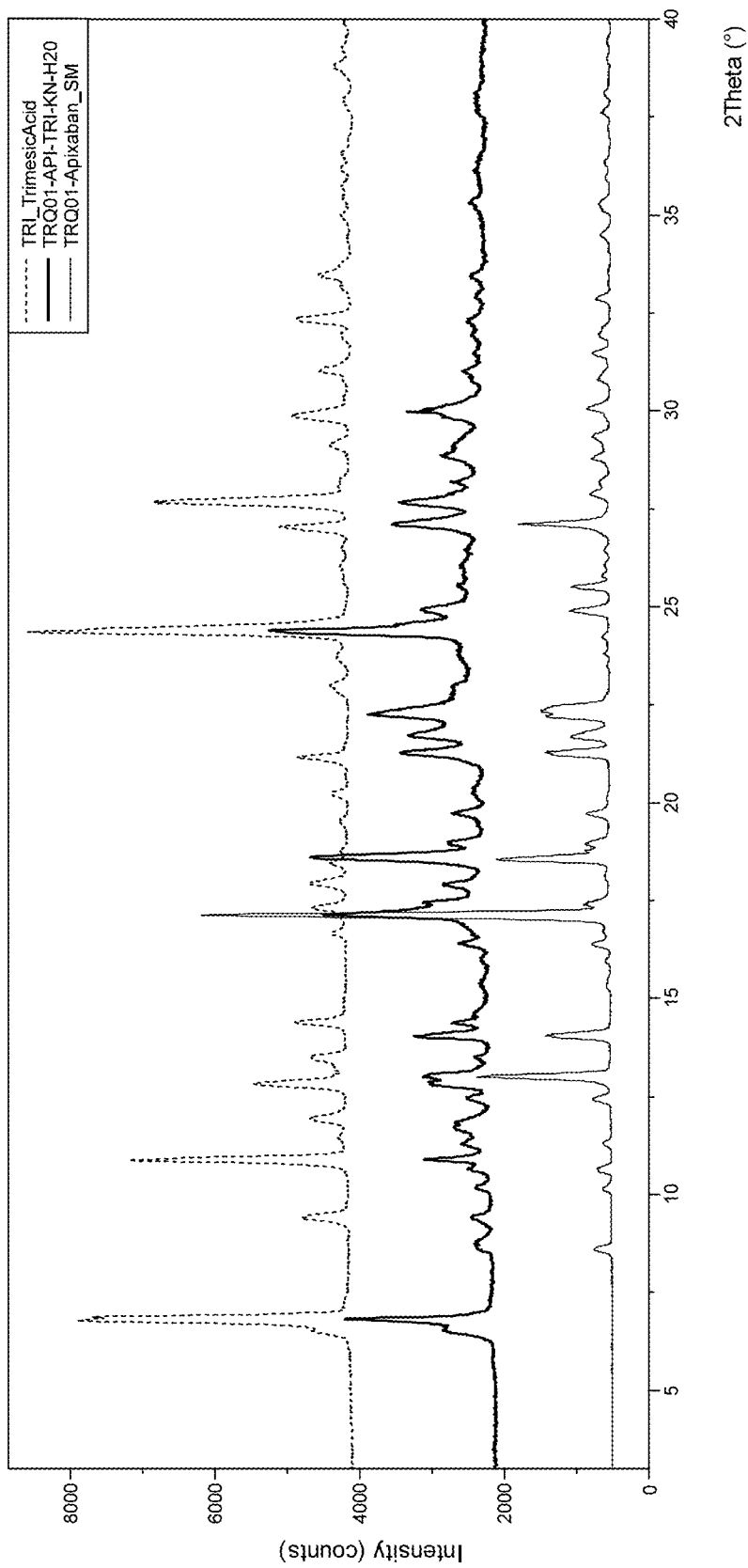
FIG. 14 is the XRPD pattern comparison between TRQ01-Apixaban (black line) and the solid isolated from KN experiment using TRI (red line). XRPD pattern of Trimesic acid (green line) is reported as reference.
Figure 15:
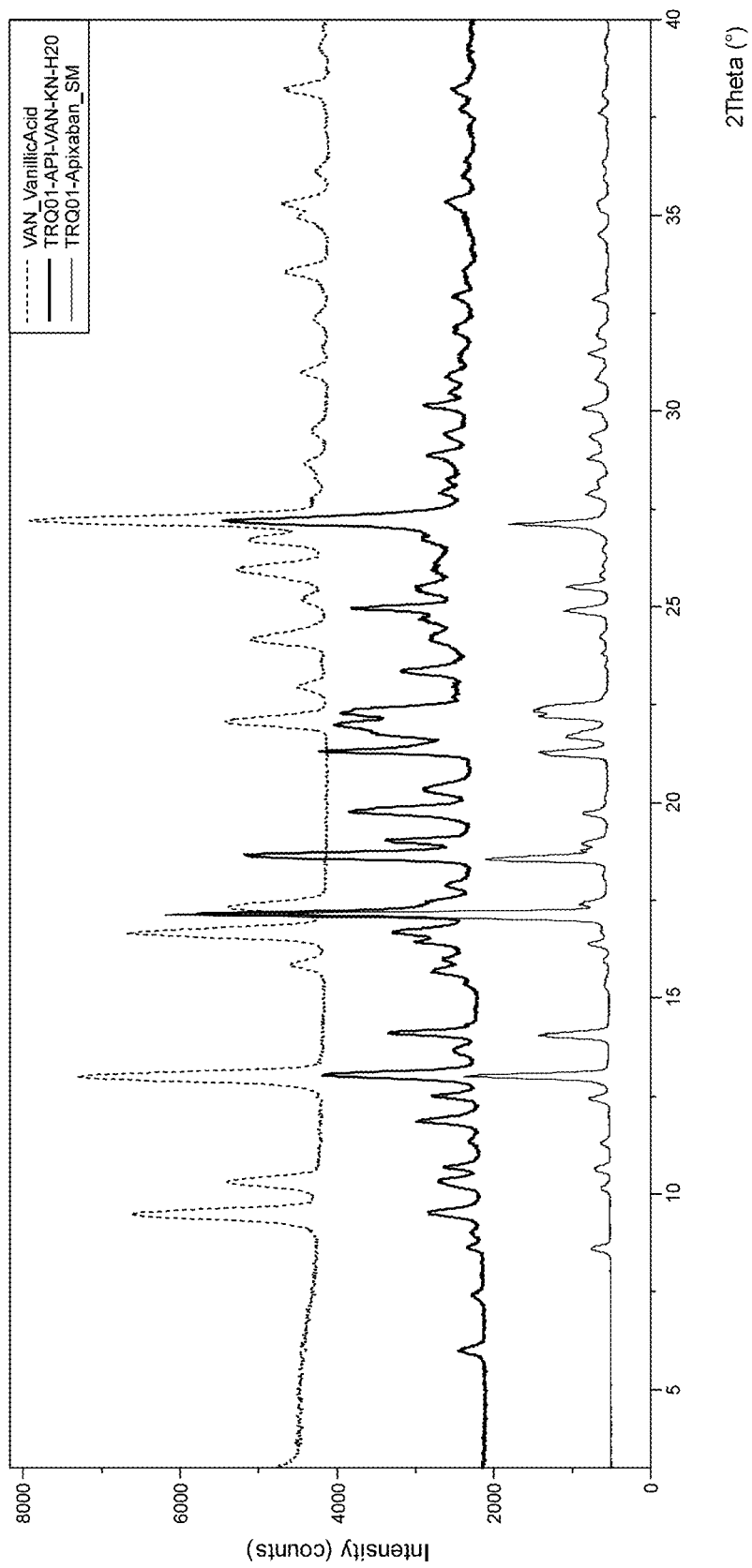
FIG. 15 is the XRPD pattern comparison between TRQ01-Apixaban (black line) and the solid isolated from KN experiment using VAN (red line). XRPD pattern of Vanillic acid (green line) is reported as reference.

These XRPD pattern comparisons are shown as follows: GLY (FIG. 5), GTR (FIG. 8), DCBA (FIG. 9), ITA (FIG. 10), COU (FIG. 11), DHB (FIG. 12), FER (FIG. 13), TRI (FIG. 14) and VAN (FIG. 15).

Hereafter, the studies performed on the six derivatives obtained with the coformers MOA, KGL, GAL, MEA, LTA and CIA are provided.

Apixaban—Malonic Acid Derivative

A new derivative of Apixaban and Malonic Acid was firstly observed from Kneading experiment. In detail, the recovered powder showed a new XRPD pattern, labeled as NP01.

Characterization of API-MOA Derivative NP01 (200 mg Scale)

A saturated solution of MOA was prepared by adding solid coformer to 4.0 ml of $H_2O$ until no further dissolution. The resulting solution was so filtered using a 0.45 mm syringe filter to remove any excess solid. The filtered solution was then added to Apixaban (200 mg) and the resulting mixture was stirred at room temperature for 24 hours.

After this time, the formed solid was isolated by vacuum filtration and washed with 1 ml of $H_2O$, analyzed by XRPD and dried at 40° C. and 30 mbar for 20 hours. After the drying step, XRPD analysis was performed again.

XRPD

Figure 16:
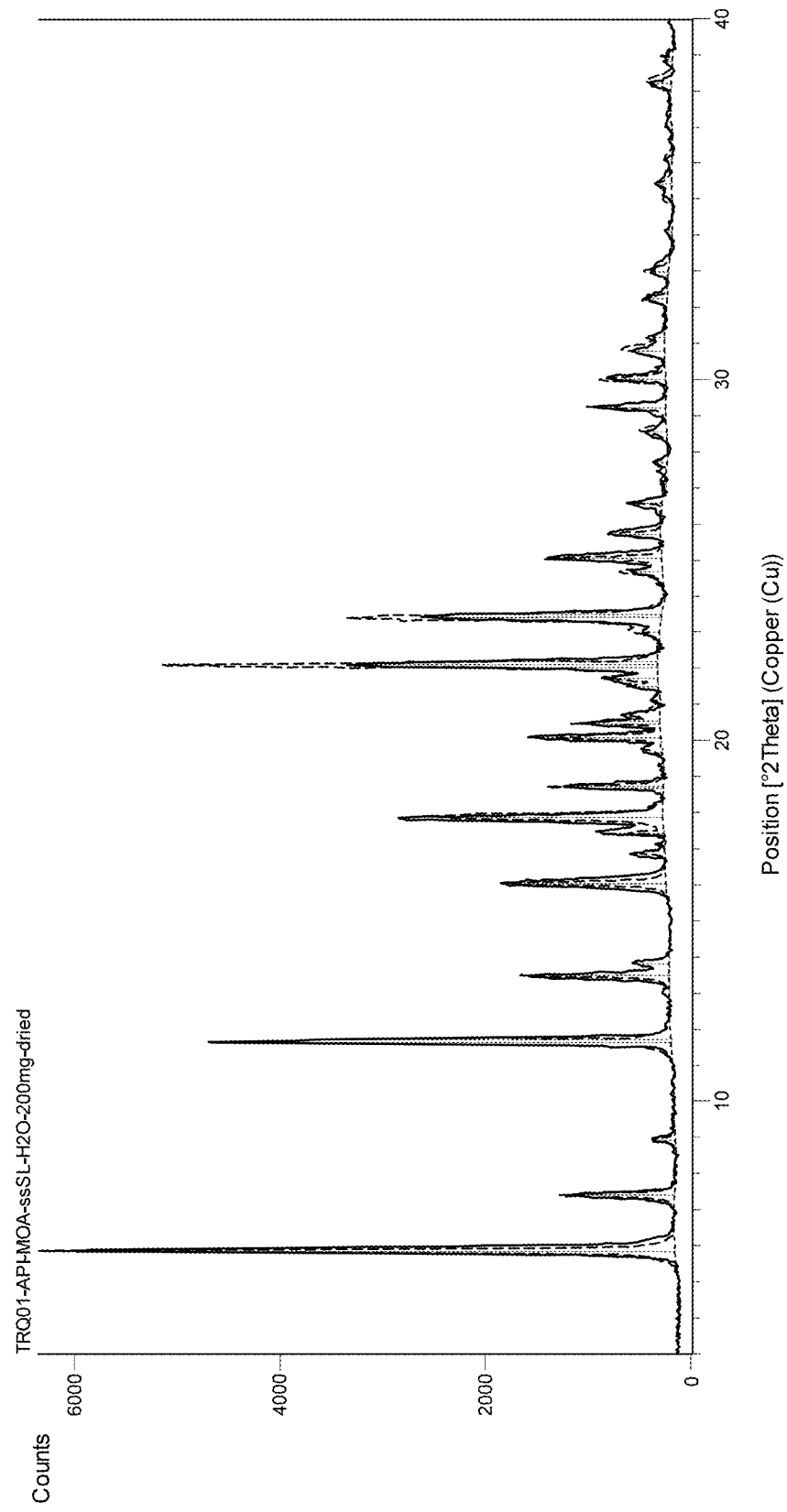
FIG. 16 is the XRPD pattern of sample TRQ01-API-MOA-ssSL-$H_2O$-200 mg-dried.

In FIG. 16 was reported the XRPD pattern and the peaks list of sample TRQ01-API-MOA-ssSL-$H_2O$-200 mg-dried was reported below.

TABLE 4

XRPD peak list of sample TRQ01-API-MOA-ssSL-$H_2O$-200 mg-dried.

| Pos. [°2Th.] | Height [cts] | FWHM [°2Th.] | d-spacing [Å] | Rel. Int. [%] |
|---|---|---|---|---|
| 5.8511 | 5657.28 | 0.0984 | 15.10497 | 100.00 |
| 7.3923 | 1011.77 | 0.1279 | 11.95894 | 17.88 |
| 8.9234 | 207.91 | 0.1378 | 9.91014 | 3.68 |
| 9.4742 | 22.94 | 0.2362 | 9.33523 | 0.41 |
| 11.6320 | 4342.78 | 0.0984 | 7.60786 | 76.76 |
| 11.6988 | 3437.19 | 0.0295 | 7.56457 | 60.76 |
| 13.0254 | 58.97 | 0.1181 | 6.79700 | 1.04 |
| 13.4915 | 1345.49 | 0.1181 | 6.56317 | 23.78 |
| 13.8324 | 345.83 | 0.1574 | 6.40219 | 6.11 |
| 16.0239 | 1571.88 | 0.1082 | 5.53121 | 27.79 |
| 16.8694 | 320.98 | 0.0689 | 5.25582 | 5.67 |
| 17.1156 | 94.19 | 0.0590 | 5.18079 | 1.66 |
| 17.4169 | 554.89 | 0.0394 | 5.09185 | 9.81 |
| 17.8718 | 2481.25 | 0.1476 | 4.96324 | 43.86 |
| 18.6649 | 666.28 | 0.0480 | 4.75017 | 11.78 |
| 18.7282 | 959.10 | 0.0689 | 4.73818 | 16.95 |
| 19.3150 | 30.91 | 0.1181 | 4.59551 | 0.55 |
| 19.7416 | 169.58 | 0.1574 | 4.49717 | 3.00 |
| 20.0703 | 1282.82 | 0.0984 | 4.42427 | 22.68 |
| 20.4507 | 760.68 | 0.0480 | 4.33922 | 13.45 |
| 20.5330 | 574.48 | 0.0590 | 4.32560 | 10.15 |
| 20.7370 | 327.45 | 0.1378 | 4.28350 | 5.79 |
| 21.1204 | 62.95 | 0.1181 | 4.20660 | 1.11 |
| 21.4909 | 261.50 | 0.0984 | 4.13491 | 4.62 |
| 21.7183 | 515.62 | 0.1181 | 4.09213 | 9.11 |
| 22.0213 | 2113.35 | 0.0840 | 4.03315 | 37.36 |
| 22.0907 | 2987.37 | 0.0720 | 4.02064 | 52.81 |
| 22.1738 | 2336.03 | 0.0480 | 4.01572 | 41.29 |
| 23.0031 | 148.22 | 0.1920 | 3.86320 | 2.62 |
| 23.3901 | 2203.82 | 0.1680 | 3.80014 | 38.96 |
| 23.4842 | 1963.19 | 0.0600 | 3.79453 | 34.70 |
| 24.6527 | 287.46 | 0.1680 | 3.60830 | 5.08 |
| 25.0185 | 973.66 | 0.0840 | 3.55637 | 17.21 |

TABLE 4-continued

XRPD peak list of sample TRQ01-API-MOA-ssSL-$H_2O$-200 mg-dried.

| Pos. [°2Th.] | Height [cts] | FWHM [°2Th.] | d-spacing [Å] | Rel. Int. [%] |
|---|---|---|---|---|
| 25.6952 | 433.00 | 0.0840 | 3.46421 | 7.65 |
| 26.5882 | 326.43 | 0.0600 | 3.34986 | 5.77 |
| 27.1361 | 30.98 | 0.2400 | 3.28346 | 0.55 |
| 27.7045 | 119.77 | 0.1200 | 3.21737 | 2.12 |
| 28.5968 | 191.18 | 0.1920 | 3.11897 | 3.38 |
| 29.2290 | 667.22 | 0.0960 | 3.05294 | 11.79 |
| 29.9914 | 502.86 | 0.1200 | 2.97704 | 8.89 |
| 30.8194 | 292.56 | 0.2160 | 2.89892 | 5.17 |
| 31.1427 | 128.03 | 0.1440 | 2.86956 | 2.26 |
| 31.7752 | 27.95 | 0.1440 | 2.81387 | 0.49 |
| 32.2029 | 199.36 | 0.1200 | 2.77747 | 3.52 |
| 32.9913 | 167.56 | 0.1680 | 2.71287 | 2.96 |
| 34.1007 | 40.84 | 0.2880 | 2.62711 | 0.72 |
| 35.0668 | 72.70 | 0.1200 | 2.55691 | 1.29 |
| 35.3827 | 134.26 | 0.1680 | 2.53480 | 2.37 |
| 36.1242 | 47.43 | 0.2160 | 2.48445 | 0.84 |
| 37.0876 | 38.64 | 0.2880 | 2.42210 | 0.68 |
| 38.2364 | 183.08 | 0.2160 | 2.35193 | 3.24 |
| 38.9506 | 97.20 | 0.0720 | 2.31043 | 1.72 |

DSC/TGA/EGA

Figure 17:
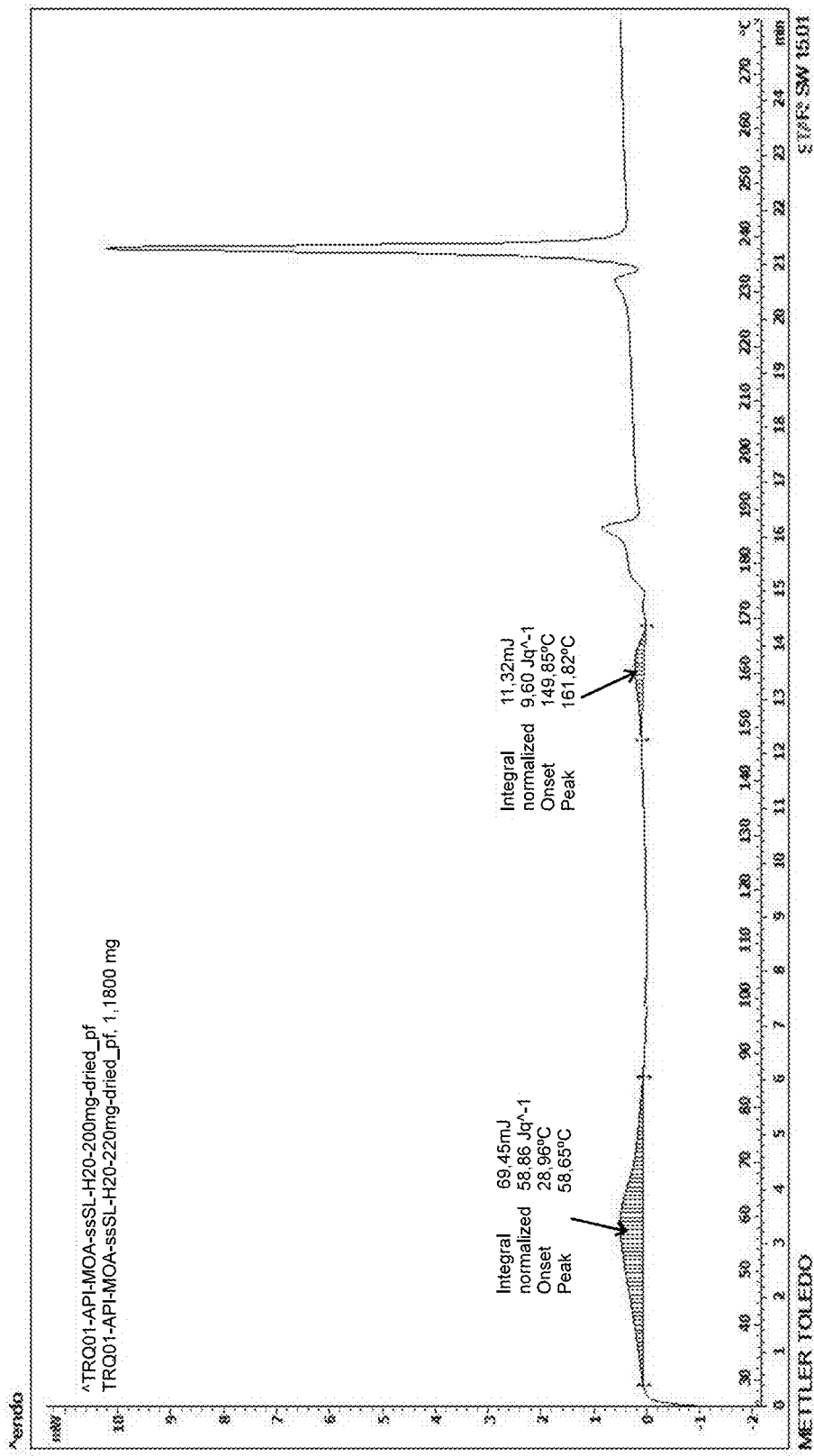
FIG. 17 shows the DSC profile of sample TRQ01-API-MOA-ssSL-H2O-200 mg-dried.
Figure 18:
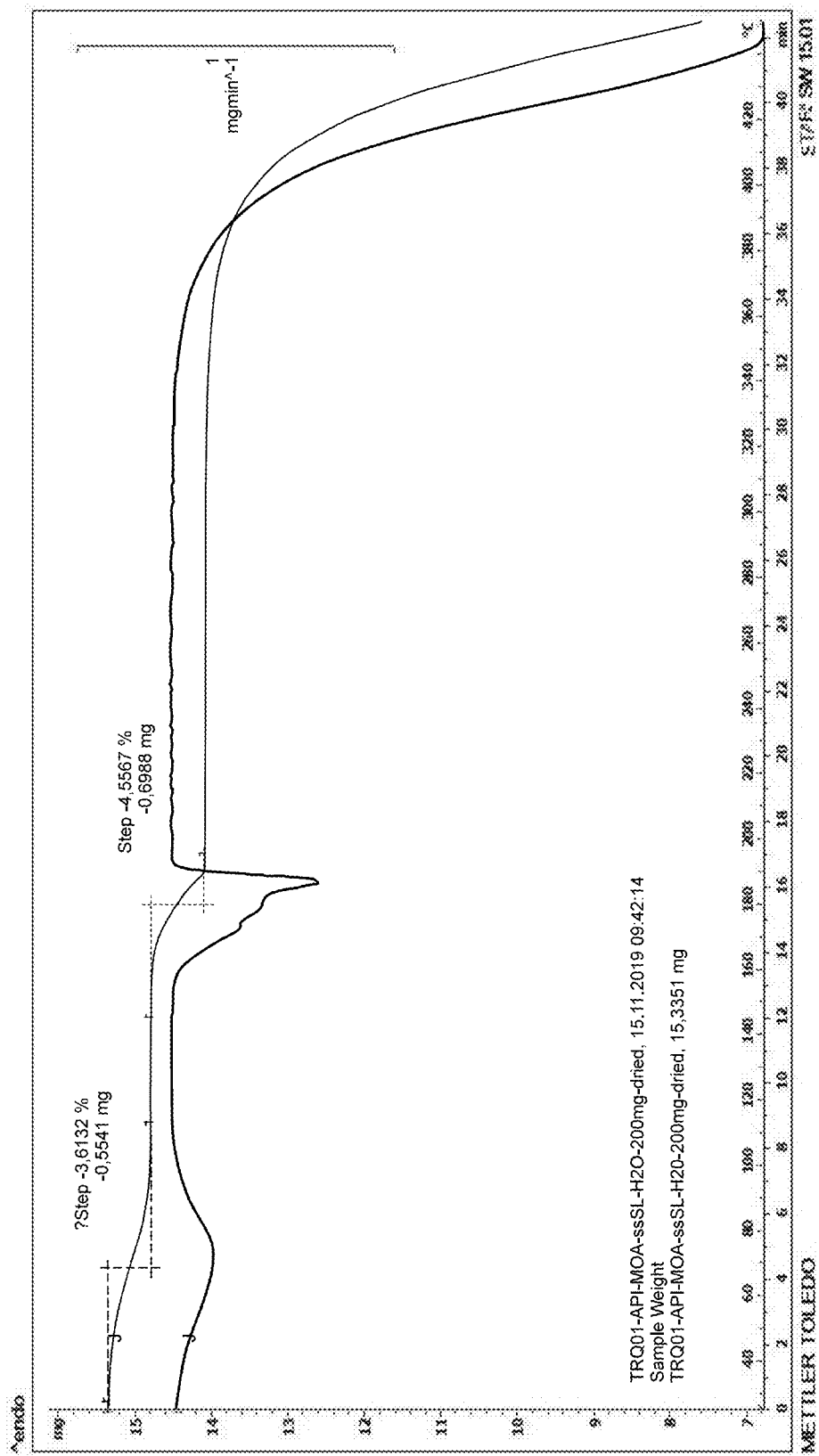
FIG. 18 shows the TG (black line) and dTG (red line) profiles of sample TRQ01-API-MOA-ssSL-H2O-200 mg-dried.
Figure 19:
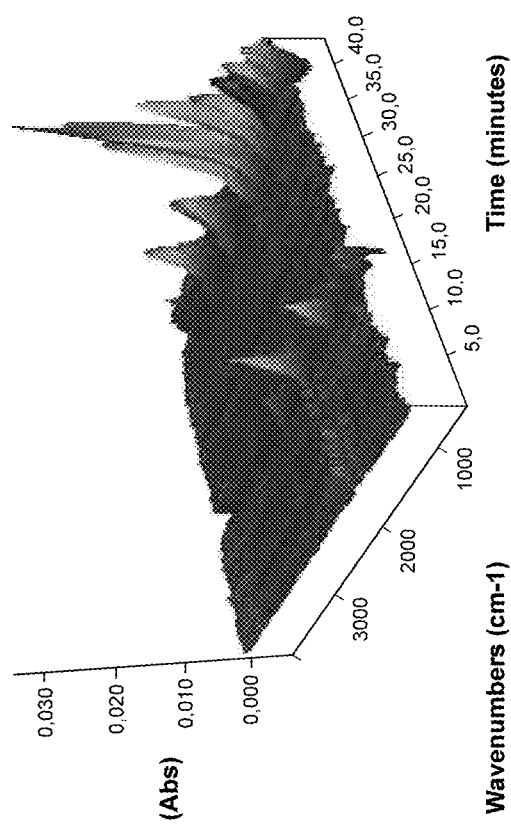
FIG. 19 shows the 3D-EGA profile of sample TRQ01-API-MOA-ssSL-H2O-200 mg-dried.

FIGS. 17, 18 and 19 correspond to DSC, TG and EGA analyses of sample TRQ01-API-MOA-ssSL-$H_2O$-200 mg-dried, respectively.

The DSC showed an endothermic event at 58.7° C. (Onset 29.0° C.) imputable to sample dehydration. A second complex endothermic event was observed at 161.8° C. (Onset 149.9° C.) and it could be tentatively assigned to multiple events partially overlapped ascribable to melting and degradation process (range 170-190° C.) of Malonic Acid.

The dehydration step was confirmed by TG/EG analysis, since a weight loss of 3.6% w/w was recorded in correspondence with this event. In addition, a second weight loss of 4.6% w/w was observed at follows. 150° C., confirming the nature of the second endothermic event in the DSC profile. The degradation was confirmed even by EG analysis, where the evolution of Acetic Acid was recorded after 15 minutes of analysis, revealing the presence of Malonic Acid in the sample.

Finally, as follows, 240° C., melting of Apixaban was observed, while its decomposition occurred above 340° C.

FT-IR

Figure 20:
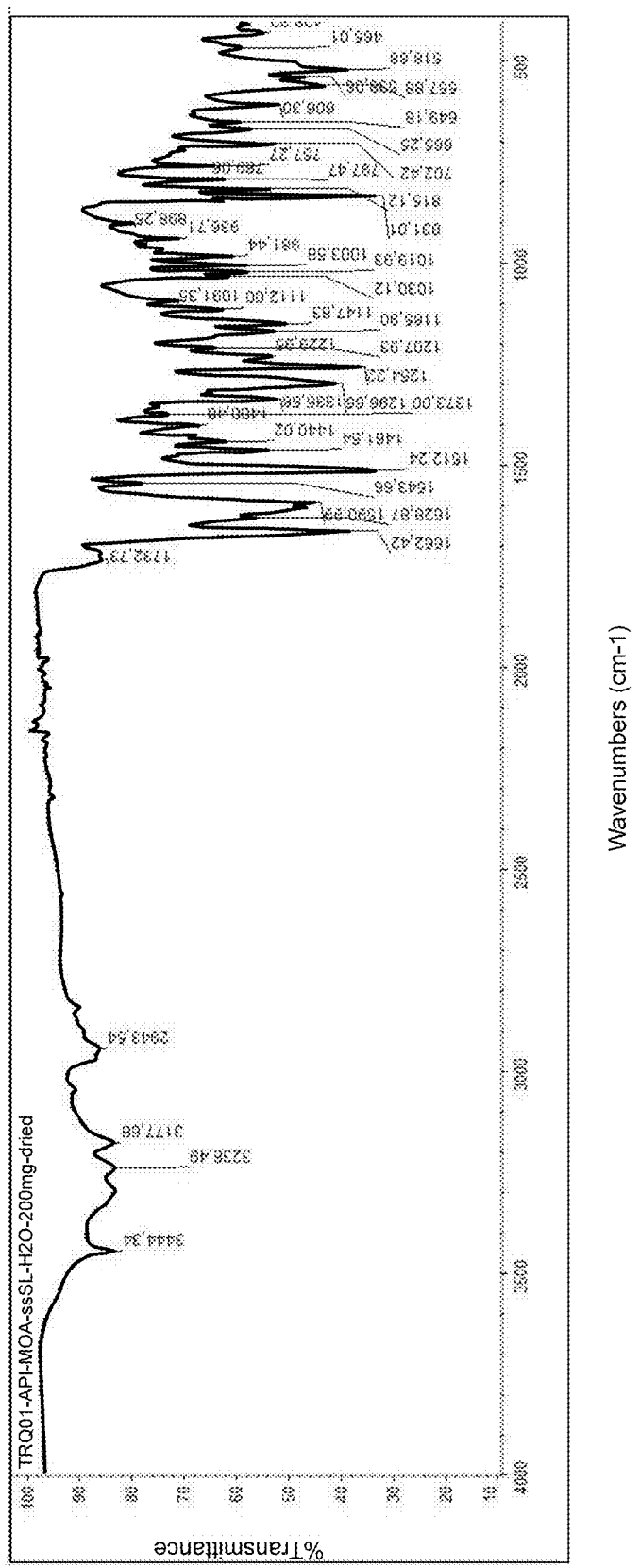
FIG. 20 is the FT-IR spectrum of sample TRQ01-API-MOA-ssSL-$H_2O$-200 mg-dried.

FIG. 20 reports the FT-IR spectrum of API-MOA derivative NP01 and its peak list is provided. A comparison with FT-IR spectrum of Apixaban suggested the formation of a new species. In detail, the band at 1733 $cm^{-1}$ could be associated to the presence of the coformer in the new derivative.

TABLE 5

FT-IR peak list of TRQ01-API-MOA-ssSL-$H_2O$-200 mg-dried.

| Position ($cm^{-1}$) | Intensity | Position ($cm^{-1}$) | Intensity |
|---|---|---|---|
| 428.30 | 54.721 | 1147.83 | 50.292 |
| 465.01 | 58.715 | 1165.90 | 52.569 |
| 518.68 | 38.557 | 1207.93 | 63.871 |
| 538.06 | 46.899 | 1229.95 | 53.088 |
| 557.88 | 43.071 | 1254.22 | 35.891 |
| 606.30 | 51.556 | 1296.66 | 40.725 |
| 649.18 | 59.281 | 1335.56 | 52.236 |
| 665.25 | 57.482 | 1373.00 | 73.148 |
| 702.42 | 53.192 | 1400.48 | 67.151 |
| 757.27 | 64.309 | 1440.02 | 61.786 |

TABLE 5-continued

FT-IR peak list of TRQ01-API-MOA-ssSL-H$_2$O-200 mg-dried.

| Position (cm$^{-1}$) | Intensity | Position (cm$^{-1}$) | Intensity |
|---|---|---|---|
| 789.06 | 62.222 | 1461.54 | 53.588 |
| 797.47 | 70.325 | 1512.24 | 33.177 |
| 815.12 | 53.583 | 1543.66 | 77.903 |
| 831.01 | 33.289 | 1590.99 | 44.893 |
| 898.25 | 79.813 | 1628.87 | 56.170 |
| 936.71 | 70.899 | 1662.42 | 38.302 |
| 981.44 | 60.612 | 1732.73 | 85.748 |
| 1003.58 | 57.832 | 2943.54 | 86.275 |
| 1019.93 | 57.548 | 3177.68 | 83.513 |
| 1030.12 | 61.473 | 3238.49 | 83.203 |
| 1091.35 | 71.522 | 3444.34 | 83.381 |
| 1112.00 | 62.437 | | |

FT-Raman

Figure 21:
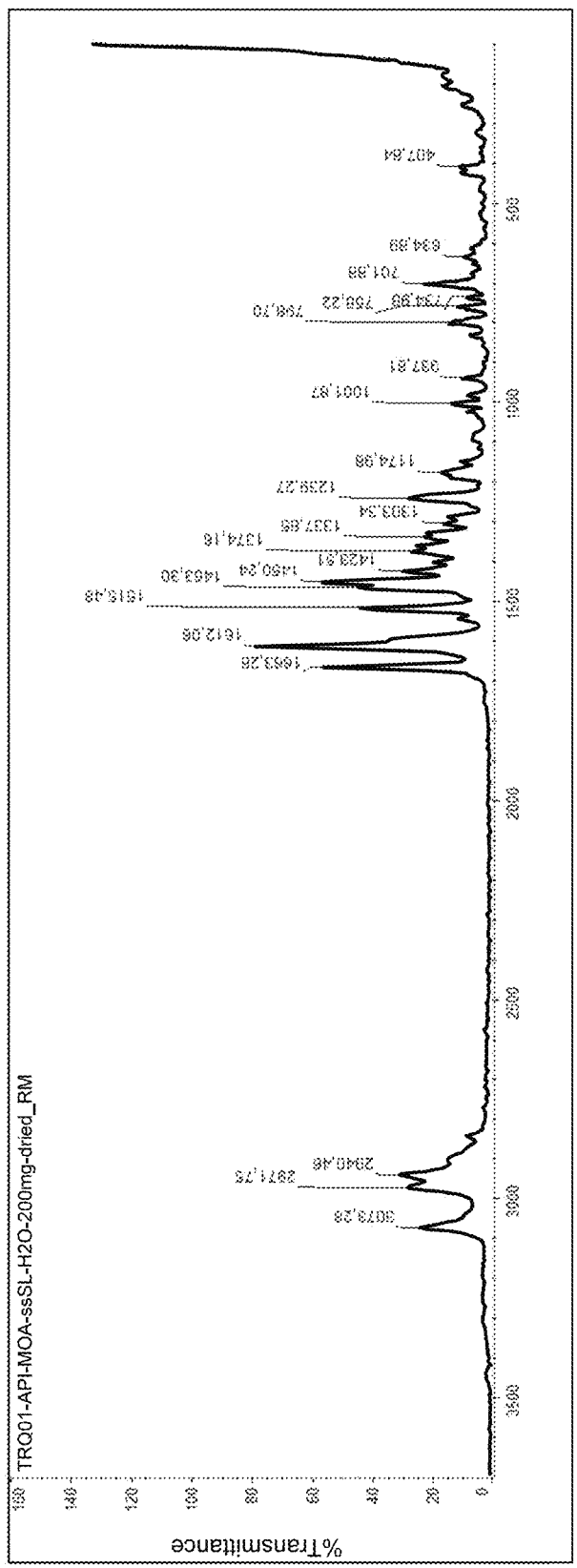
FIG. 21 is the FT-Raman spectrum of sample TRQ01-API-MOA-ssSL-$H_2O$-200 mg-dried.

In the FIG. 21 was reported the FT-Raman spectrum of API-MOA derivative NP01 which peak list was provided as follows.

TABLE 6

FT-Raman peak list of TRQ01-API-MOA-ssSL-H$_2$O-200 mg-dried

| Position (cm$^{-1}$) | Intensity | Position (cm$^{-1}$) | Intensity |
|---|---|---|---|
| 97.08 | 136.228 | 1337.85 | 22.031 |
| 407.84 | 10.329 | 1374.16 | 26.455 |
| 634.89 | 8.889 | 1423.51 | 29.397 |
| 701.88 | 21.953 | 1450.24 | 56.073 |
| 734.98 | 8.081 | 1463.30 | 44.531 |
| 758.22 | 11.109 | 1515.48 | 43.834 |
| 798.70 | 14.151 | 1612.06 | 78.667 |
| 937.81 | 10.152 | 1663.28 | 55.618 |
| 1001.87 | 12.970 | 2940.46 | 30.162 |
| 1174.98 | 16.531 | 2971.75 | 27.726 |
| 1239.27 | 27.192 | 3073.28 | 23.429 |
| 1303.34 | 15.498 | | |

1H-NMR

Figure 22:
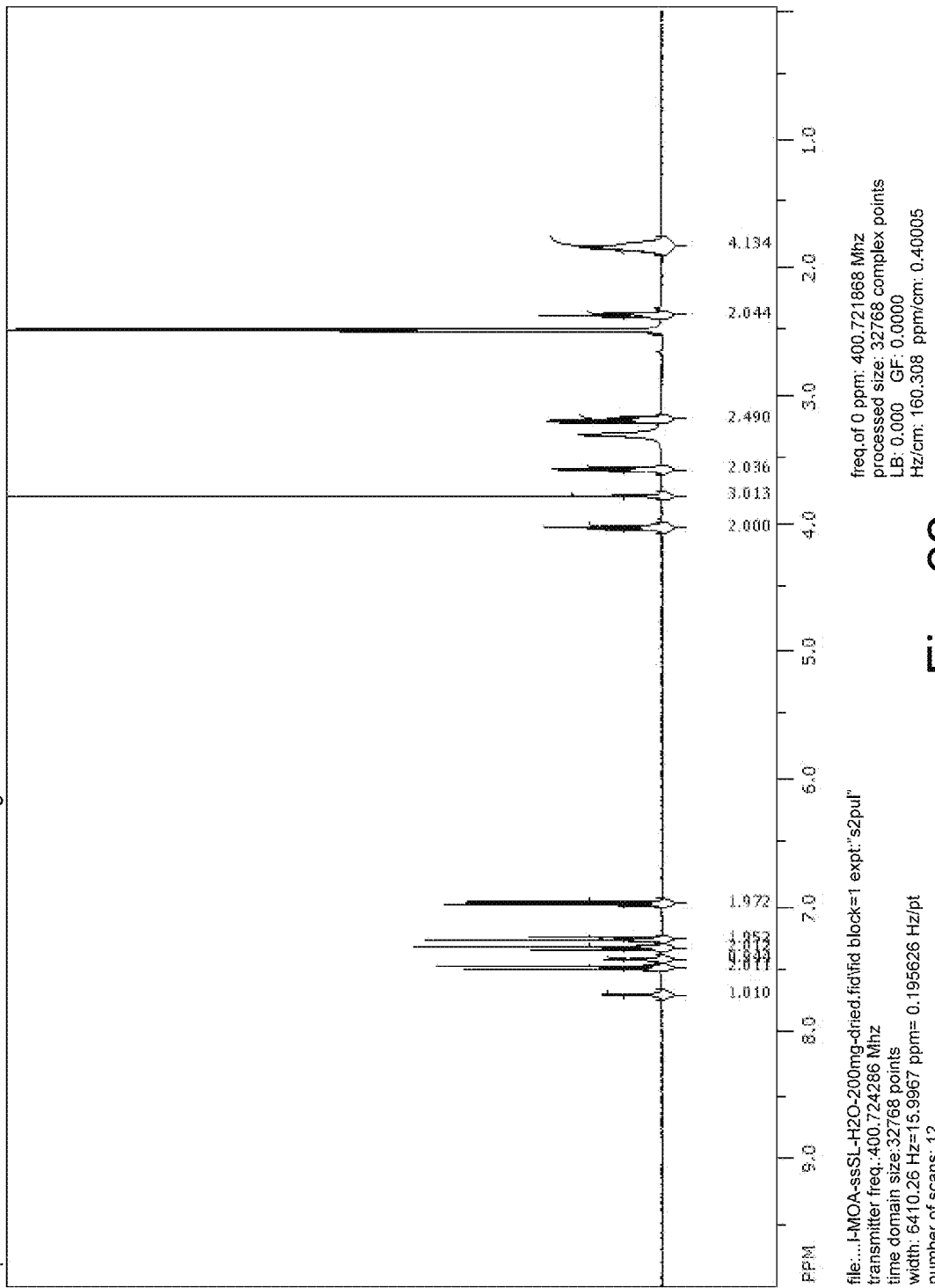
FIG. 22 is the 1H-NMR spectrum of sample TRQ01-API-MOA-ssSL-$H_2O$-200 mg-dried.

1H-NMR spectrum (FIG. 22) of sample TRQ01-Anin the stoichiometric ratio API:MOA approximately 1:0.25 (in agreement with TG analysis). PI-MOA-ssSL-H$_2$O-200 mg-dried showed the presence of Apixaban and Malonic Acid.

The characteristic peaks of the 1H-NMR spectrum are as follows: (400 MHz, DMSO-d6) δ: 7.71 (bs, 1H), 7.50 (d, J=8.8 Hz, 2H), 7.43 (bs, 1H), 7.35 (d, J=8.8 Hz, 2H), 7.27 (d, J=8.8 Hz, 2H), 7.00 (d, J=8.8 Hz, 2H), 4.05 (t, J=6.4 Hz, 2H), 3.80 (s, 3H), 3.59 (t, J=5.6 Hz, 2H), 3.22 (s, 0.25H), 3.20 (t, J=6.4 Hz, 2H), 2.38 (t, J=6.4 Hz, 2H), 1.90-1.78 (m, 4H).

Apixaban-α-Ketoglutaric Acid Derivative

A new derivative labeled as NP01 was recovered from kneading experiment between API and 1 equivalent of coformer.

A second derivative of Apixaban and α-Ketoglutaric Acid was isolated from ssSL experiments in ETA. This new derivative was labeled as NP02.

Characterization of API-KGL Derivative NP02 (200 mg Scale)

Synthesis 63.6 mg of α-Ketoglutaric Acid were accurately weighed in an 8 ml glass vial equipped with a magnetic stirring bar and dissolved in 4 ml of ETA. When the complete dissolution of the coformer occurred, 200 mg of Apixaban were added to the solution and the resulting mixture was stirred for 48 hours at room temperature. After this time, the formed solid was isolated by vacuum filtration and washed with 2 ml of ETA, analyzed by XRPD and dried at 40° C. and 30 mbar for 72 hours. After the drying step, XRPD analysis was performed again.

The so isolated derivative NP02 was fully characterized.

XRPD

Figure 23:
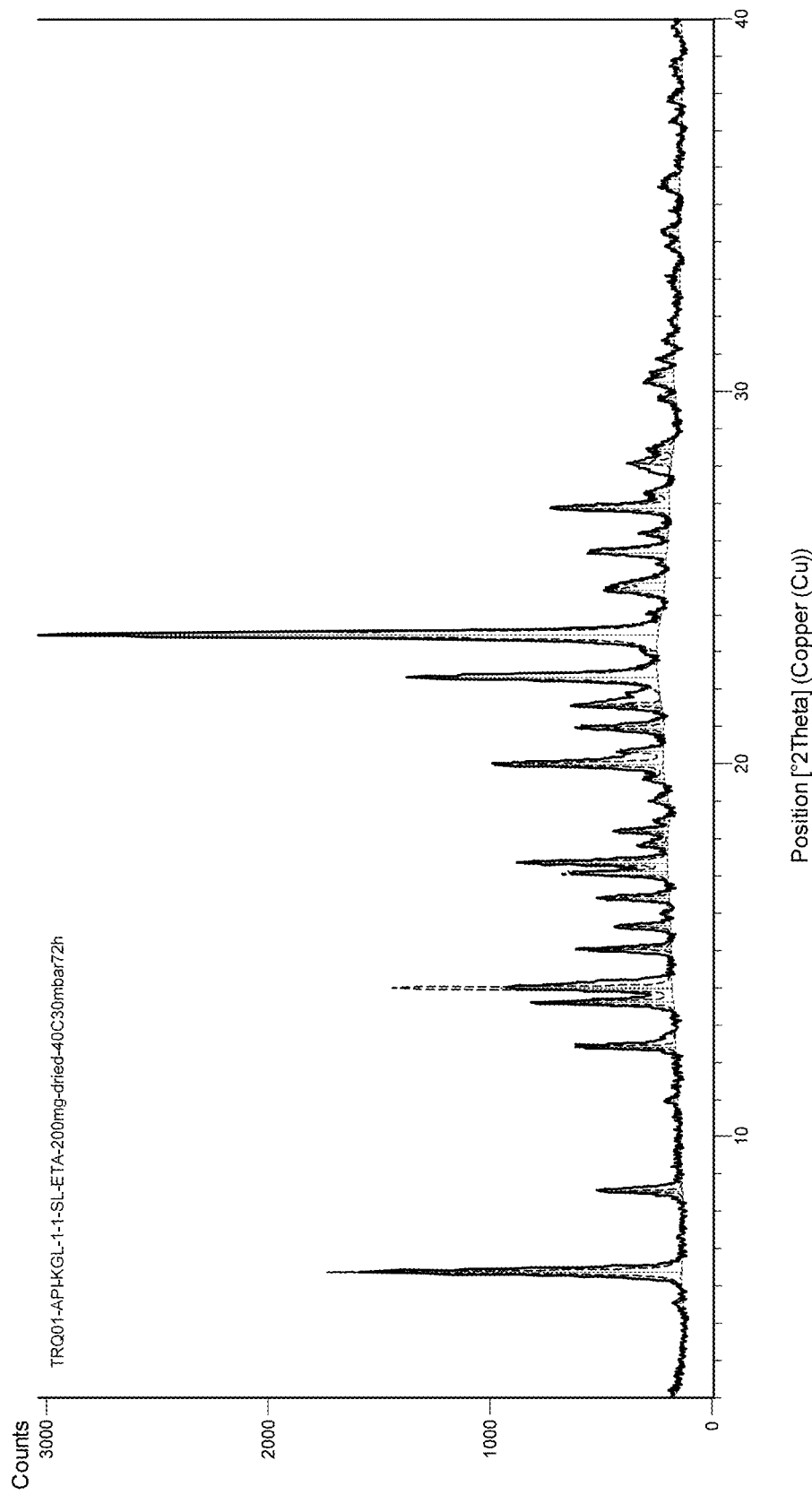
FIG. 23 is the XRPD pattern of sample TRQ01-API-KGL-1-1-SL-ETA-200 mg-dried.

XRPD pattern (FIG. 23) and peaks list of sample TRQ01-API-KGL-1-1-SL-ETA-200 mg-dried were reported below.

TABLE 7

XRPD peak list of sample TRQ01-API-KGL-1-1-SL-ETA-200 mg-dried.

| Pos. [°2Th.] | Height [cts] | FWHM [°2Th.] | d-spacing [Å] | Rel. Int. [%] |
|---|---|---|---|---|
| 3.2265 | 18.82 | 0.2362 | 27.38412 | 0.67 |
| 5.5285 | 37.32 | 0.1574 | 15.98567 | 1.34 |
| 6.3659 | 1448.05 | 0.0984 | 13.88457 | 51.91 |
| 8.5284 | 345.71 | 0.0394 | 10.36826 | 12.39 |
| 10.9701 | 48.68 | 0.1574 | 8.06539 | 1.74 |
| 12.4024 | 417.06 | 0.0492 | 7.13698 | 14.95 |
| 13.5989 | 646.45 | 0.0689 | 6.51159 | 23.17 |
| 13.9609 | 660.42 | 0.0600 | 6.33829 | 23.67 |
| 14.0013 | 781.77 | 0.0590 | 6.32534 | 28.02 |
| 15.0356 | 418.58 | 0.0394 | 5.89248 | 15.00 |
| 15.6675 | 238.04 | 0.0787 | 5.65623 | 8.53 |
| 15.9813 | 37.52 | 0.0984 | 5.54584 | 1.35 |
| 16.3741 | 293.88 | 0.0689 | 5.41367 | 10.53 |
| 17.0420 | 413.85 | 0.0480 | 5.19869 | 14.84 |
| 17.1107 | 369.93 | 0.0492 | 5.18225 | 13.26 |
| 17.3416 | 640.01 | 0.0787 | 5.11376 | 22.94 |
| 17.8078 | 126.84 | 0.0590 | 4.98092 | 4.55 |
| 18.1972 | 243.69 | 0.0689 | 4.87523 | 8.74 |
| 18.4765 | 65.12 | 0.1181 | 4.80216 | 2.33 |
| 19.0027 | 68.08 | 0.1574 | 4.67035 | 2.44 |
| 19.5763 | 80.73 | 0.1181 | 4.53478 | 2.89 |
| 19.9861 | 745.13 | 0.0689 | 4.44271 | 26.71 |
| 20.3443 | 197.83 | 0.0984 | 4.36529 | 7.09 |
| 20.9534 | 348.54 | 0.0590 | 4.23974 | 12.49 |
| 21.5680 | 393.25 | 0.0394 | 4.12030 | 14.10 |
| 22.3222 | 1123.84 | 0.1378 | 3.98277 | 40.29 |
| 23.4517 | 2789.71 | 0.1279 | 3.79343 | 100.00 |
| 24.0583 | 42.17 | 0.0984 | 3.69916 | 1.51 |
| 24.6482 | 263.89 | 0.1181 | 3.61193 | 9.46 |
| 24.8508 | 201.50 | 0.1181 | 3.58295 | 7.22 |
| 25.6615 | 335.51 | 0.1771 | 3.47157 | 12.03 |
| 26.1885 | 107.14 | 0.1181 | 3.40289 | 3.84 |
| 26.8581 | 533.74 | 0.0984 | 3.31955 | 19.13 |
| 27.2819 | 99.45 | 0.1378 | 3.26894 | 3.56 |
| 28.0618 | 196.45 | 0.0590 | 3.17985 | 7.04 |
| 28.4363 | 99.94 | 0.1181 | 3.13881 | 3.58 |
| 29.8395 | 74.72 | 0.1574 | 2.99433 | 2.68 |
| 30.2508 | 128.90 | 0.1378 | 2.95455 | 4.62 |
| 30.5052 | 93.31 | 0.0984 | 2.93048 | 3.34 |
| 30.8588 | 74.25 | 0.1181 | 2.89771 | 2.66 |
| 31.3648 | 44.90 | 0.1968 | 2.85210 | 1.61 |
| 32.9322 | 38.13 | 0.3936 | 2.71986 | 1.37 |
| 33.8768 | 53.11 | 0.1574 | 2.64614 | 1.90 |
| 34.2951 | 68.77 | 0.1968 | 2.61482 | 2.47 |
| 35.4351 | 68.02 | 0.1574 | 2.53327 | 2.44 |
| 35.6866 | 60.94 | 0.2362 | 2.51599 | 2.18 |
| 37.2404 | 34.78 | 0.1968 | 2.41451 | 1.25 |
| 37.8218 | 47.69 | 0.1968 | 2.37872 | 1.71 |
| 38.7662 | 39.48 | 0.2362 | 2.32292 | 1.42 |

DSC/TGA/EGA

Figure 24:
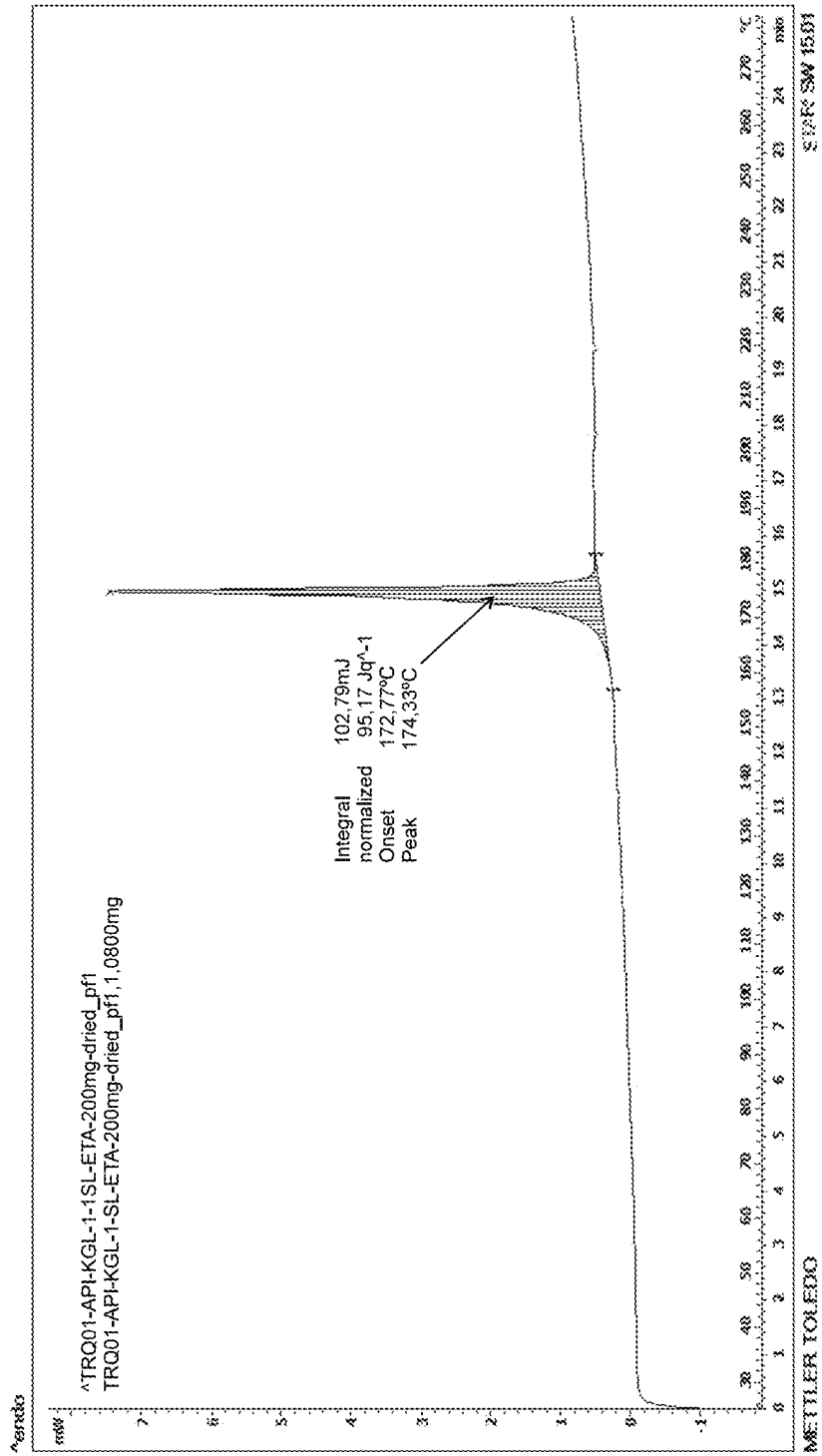
FIG. 24 shows the DSC profile of sample TRQ01-API-KGL-1-1-SL-ETA-200 mg-dried.
Figure 25:
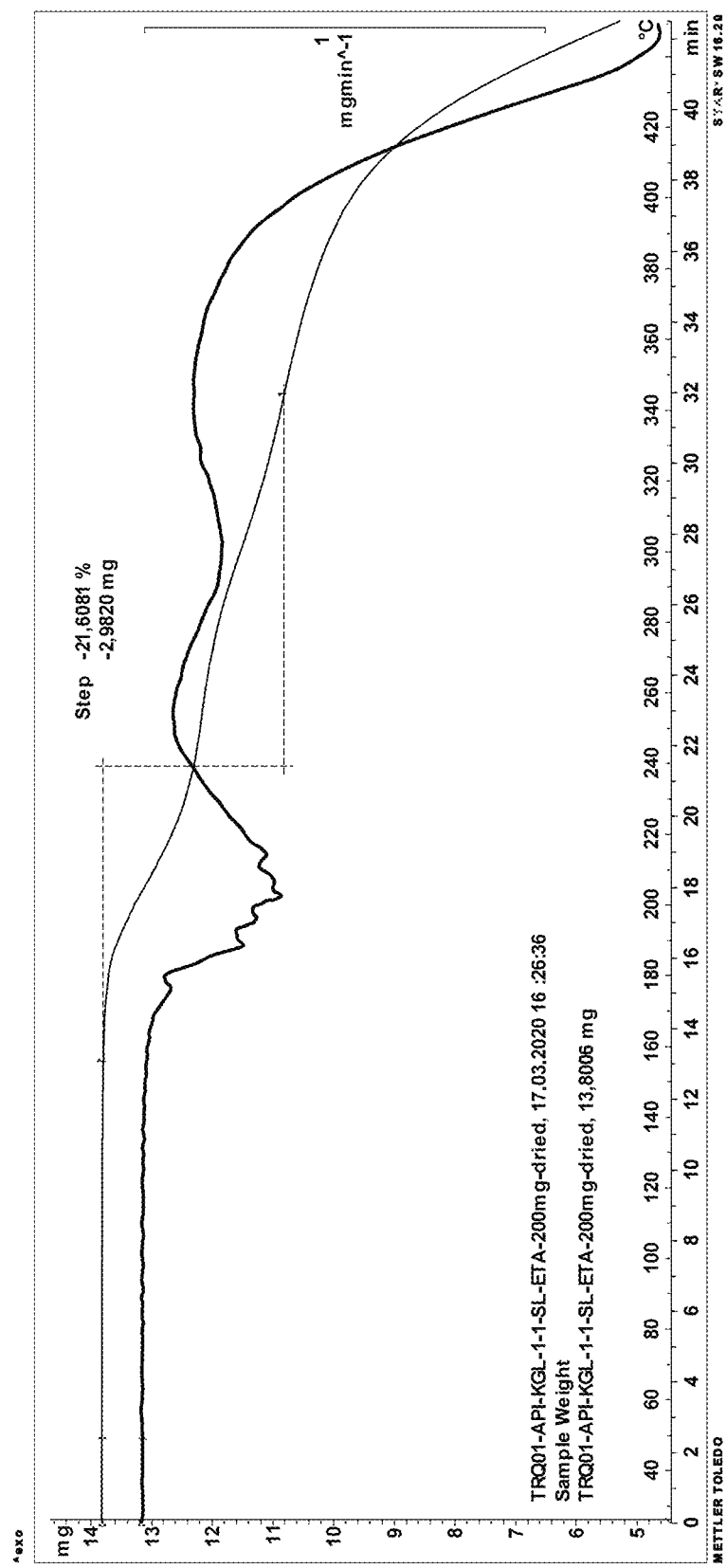
FIG. 25 shows the TG (black line) and dTG (red line) profiles of sample TRQ01-API-KGL-1-1-SL-ETA-200 mg-dried.
Figure 26:
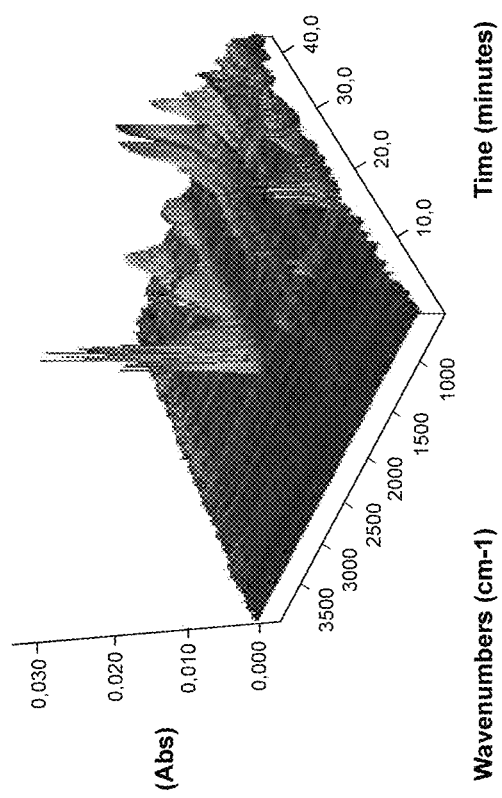
FIG. 26 shows the 3D-EGA profile of sample TRQ01-API-KGL-1-1-SL-ETA-200 mg-dried.

FIGS. 24, 25 and 26 correspond to DSC,TG and EGA analyses performed on sample TRQ01-API-KGL-1-1-SL-ETA-200 mg-dried, respectively.

The DSC profile showed an endothermic event at 174.3° C. (Onset 172.8° C.) imputable to sample melting and decomposition.

The melting/decomposition step was confirmed by TG/EG analysis, since a weight loss of 11.8% w/w was recorded in correspondence with this event. Combined TG/EG analysis even showed the presence of a small quantity of ETA trapped in the crystalline lattice of the new derivative. Indeed, this solvent was released immediately before the melting/decomposition of the sample. The amount of the solvent could not be unambiguously determined using this technique.

In addition, EGA confirmed the presence of KGL in the new derivative, since the massive CO2 evolution during the decomposition step, imputable to the α-Ketoglutaric Acid moiety.

FT-IR

Figure 27:
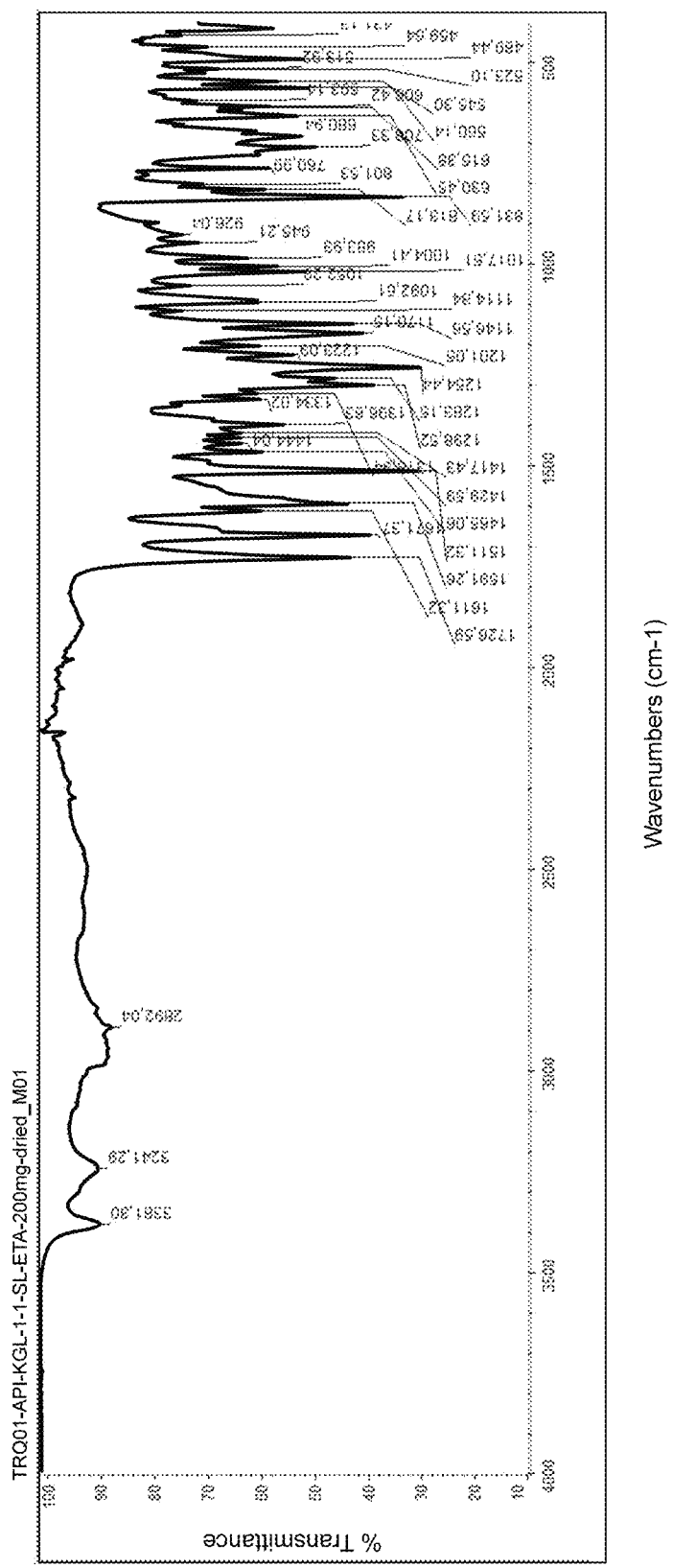
FIG. 27 is the FT-IR spectrum of sample TRQ01-API-KGL-1-1-SL-ETA-200 mg-dried.

In FIG. 27 was reported the FT-IR spectrum of API-KGL derivative NP02 along with its peak list in the table below. The comparison with FT-IR spectrum of Apixaban suggested the formation of a new species. In detail, the band at 1727 cm$^{-1}$ could be associated to the presence of the coformer in the new derivative.

TABLE 8

FT-IR peak list of TRQ01-API-KGL-1-1-SL-ETA-200 mg-dried.

| Position (cm$^{-1}$) | Intensity | Position (cm$^{-1}$) | Intensity |
|---|---|---|---|
| 414.10 | 57.872 | 1092.61 | 60.446 |
| 431.13 | 75.013 | 1114.84 | 74.669 |
| 459.64 | 69.854 | 1146.56 | 42.417 |
| 489.44 | 51.917 | 1170.15 | 40.671 |
| 513.92 | 67.845 | 1201.05 | 60.109 |
| 523.10 | 70.306 | 1223.09 | 53.537 |
| 545.30 | 56.641 | 1254.44 | 29.844 |
| 560.14 | 51.149 | 1283.15 | 46.228 |
| 593.14 | 71.971 | 1298.52 | 38.450 |
| 606.42 | 58.161 | 1318.94 | 60.773 |
| 615.38 | 63.322 | 1334.02 | 59.826 |
| 630.45 | 53.109 | 1396.63 | 55.785 |
| 680.94 | 52.539 | 1417.43 | 63.590 |
| 708.33 | 49.761 | 1429.59 | 63.784 |
| 760.99 | 58.516 | 1444.04 | 63.563 |
| 801.53 | 71.012 | 1465.06 | 59.570 |
| 813.17 | 59.162 | 1511.32 | 30.726 |
| 831.59 | 32.729 | 1591.26 | 43.785 |
| 926.04 | 74.704 | 1611.32 | 59.949 |
| 945.21 | 71.822 | 1671.37 | 39.205 |
| 983.93 | 62.417 | 1726.59 | 43.194 |
| 1004.41 | 56.681 | 2892.04 | 87.999 |
| 1017.51 | 51.583 | 3241.29 | 90.525 |
| 1052.29 | 73.051 | 3381.30 | 90.114 |

FT-Raman

Figure 28:
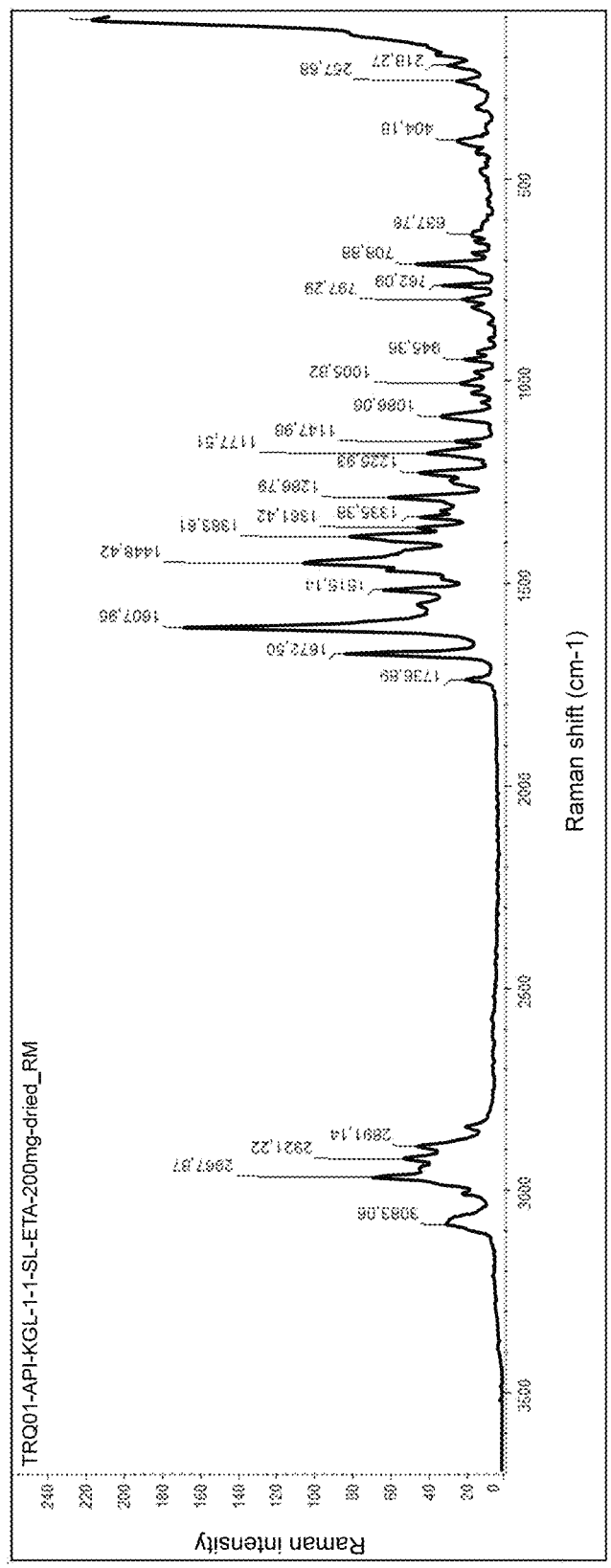
FIG. 28 is the FT-Raman spectrum of sample TRQ01-API-KGL-1-1-SL-ETA-200 mg-dried.

In FIG. 28 below was reported the FT-Raman spectrum of API-KGL derivative NP02 along with its peak list.

TABLE 9

FT-Raman peak list of TRQ01-API-KGL-1-1-SL-ETA-200 mg-dried.

| Position (cm$^{-1}$) | Intensity | Position (cm$^{-1}$) | Intensity |
|---|---|---|---|
| 106.57 | 216.689 | 1286.79 | 60.348 |
| 218.27 | 28.397 | 1335.38 | 43.432 |
| 257.68 | 23.743 | 1361.42 | 45.116 |
| 404.18 | 24.203 | 1383.61 | 80.404 |
| 637.76 | 16.910 | 1448.42 | 105.022 |
| 708.88 | 45.366 | 1515.14 | 63.409 |
| 762.09 | 31.139 | 1607.96 | 167.686 |
| 797.29 | 21.029 | 1672.50 | 82.915 |
| 945.36 | 19.812 | 1736.89 | 19.867 |
| 1005.82 | 22.576 | 2891.14 | 44.257 |
| 1086.06 | 32.451 | 2921.22 | 51.791 |
| 1147.98 | 24.916 | 2967.87 | 68.067 |
| 1177.51 | 39.878 | 3083.06 | 30.101 |
| 1225.93 | 43.981 | | |

1H-NMR

Figure 29:
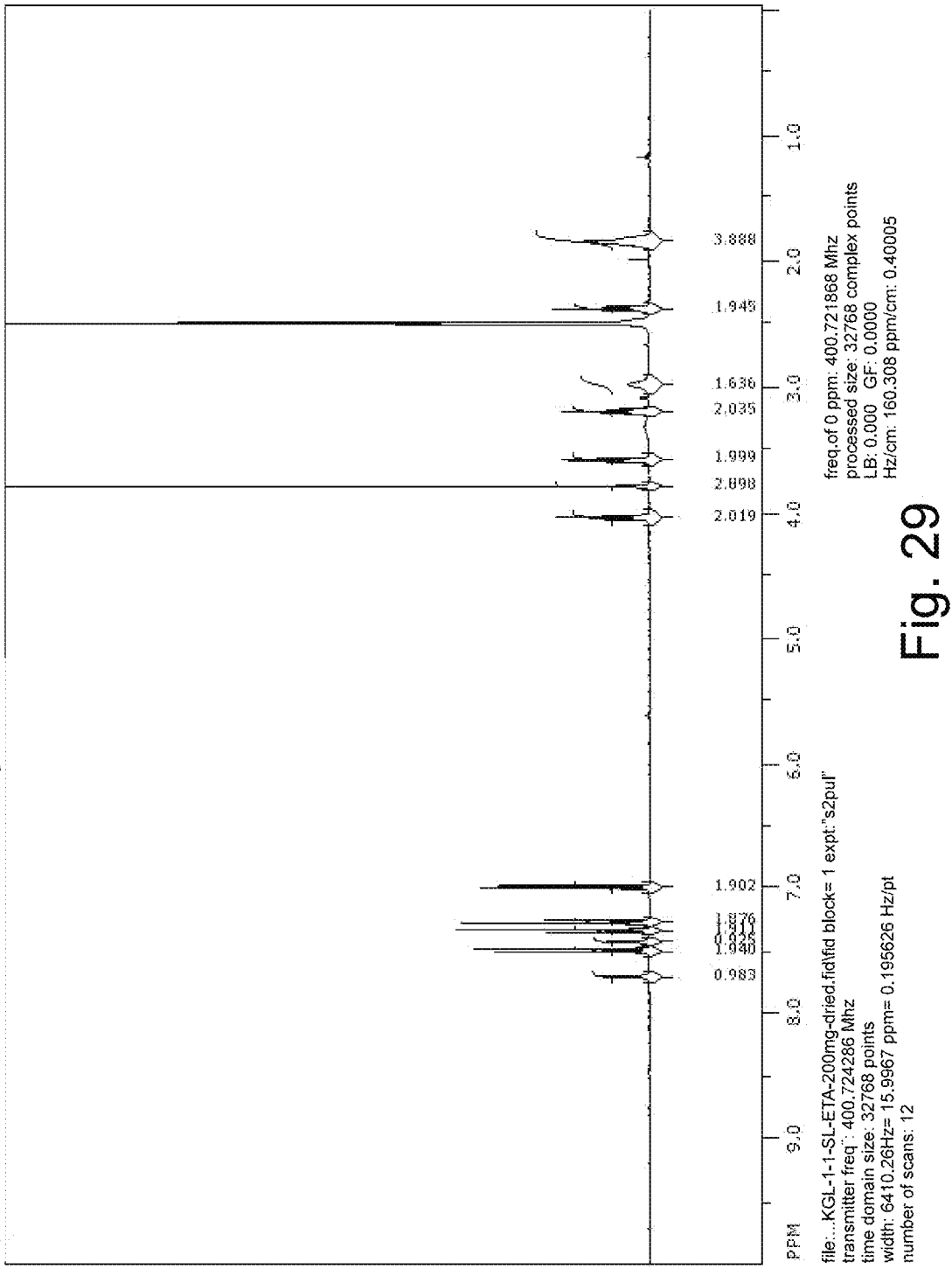
FIG. 29 is the 1H-NMR spectrum of sample TRQ01-API-KGL-1-1-SL-ETA-200 mg-dried.

The 1H-NMR spectrum (FIG. 29) of TRQ01-API-KGL-1-1-SL-ETA-200 mg-dried revealed the presence of both Apixaban and α-Ketoglutaric Acid. Since the observed integrals, the stoichiometric ratio could be calculated as API:KGL approx. 1:0.8. Only one peak related to KGL was clearly visible in the spectrum, while the second peak could be observed very close to the signal of DMSO, so an unambiguously integration could not be done.

The structural integrity of the molecule was confirmed. Small traces of ETA were observed, as already seen in TG/EG analysis; the amount of ETA could be quantified as 0.02 mol/mol.

The 1H-NMR spectrum particulars are as follows: (400 MHz, DMSO-d6) δ: 7.71 (bs, 1H), 7.50 (d, J=8.8 Hz, 2H), 7.43 (bs, 1H), 7.35 (d, J=8.8 Hz, 2H), 7.27 (d, J=8.8 Hz, 2H), 7.00 (d, J=8.8 Hz, 2H), 4.05 (t, J=6.4 Hz, 2H), 3.80 (s, 3H), 3.59 (t, J=5.6 Hz, 2H), 3.20 (t, J=6.4 Hz, 2H), 2.99 (bs, 1.6H), 2.38 (t, J=6.4 Hz, 2H), 1.90-1.78 (m, 4H).

Apixaban—Gallic Acid Derivative

A new derivative was isolated from Kneading experiment using Apixaban and 1, 2 or 3 equivalents of Gallic Acid coformer. This derivative was recovered in mixture with Apixaban Form I and free coformer using, H2O, Characterization of API-GAL Derivative NP01b (1 g Scale)

Synthesis 370.2 mg of Gallic Acid were accurately weighed in a 100 mL glass reactor equipped with a magnetic stirring bar and dissolved in 20 mL of H$_2$O at 50° C. When the complete dissolution of the coformer occurred, 1 g of Apixaban was added to the solution and the resulting mixture was stirred for 72 hours.

After this time, the formed solid was isolated by vacuum filtration and washed with 4 mL of H$_2$O, analyzed by XRPD and dried at 40° C. and 30 mbar for 20 hours. After the drying step, XRPD analysis was performed again. 1.0544 g of the desired derivative were isolated (Y=93.4%).

The solid recovered from slurry experiment in H$_2$O at 50° C. with 1 equivalent of Gallic Acid was characterized as reported below. The new isolated pattern was labeled as NP01b.

XRPD

Figure 30:
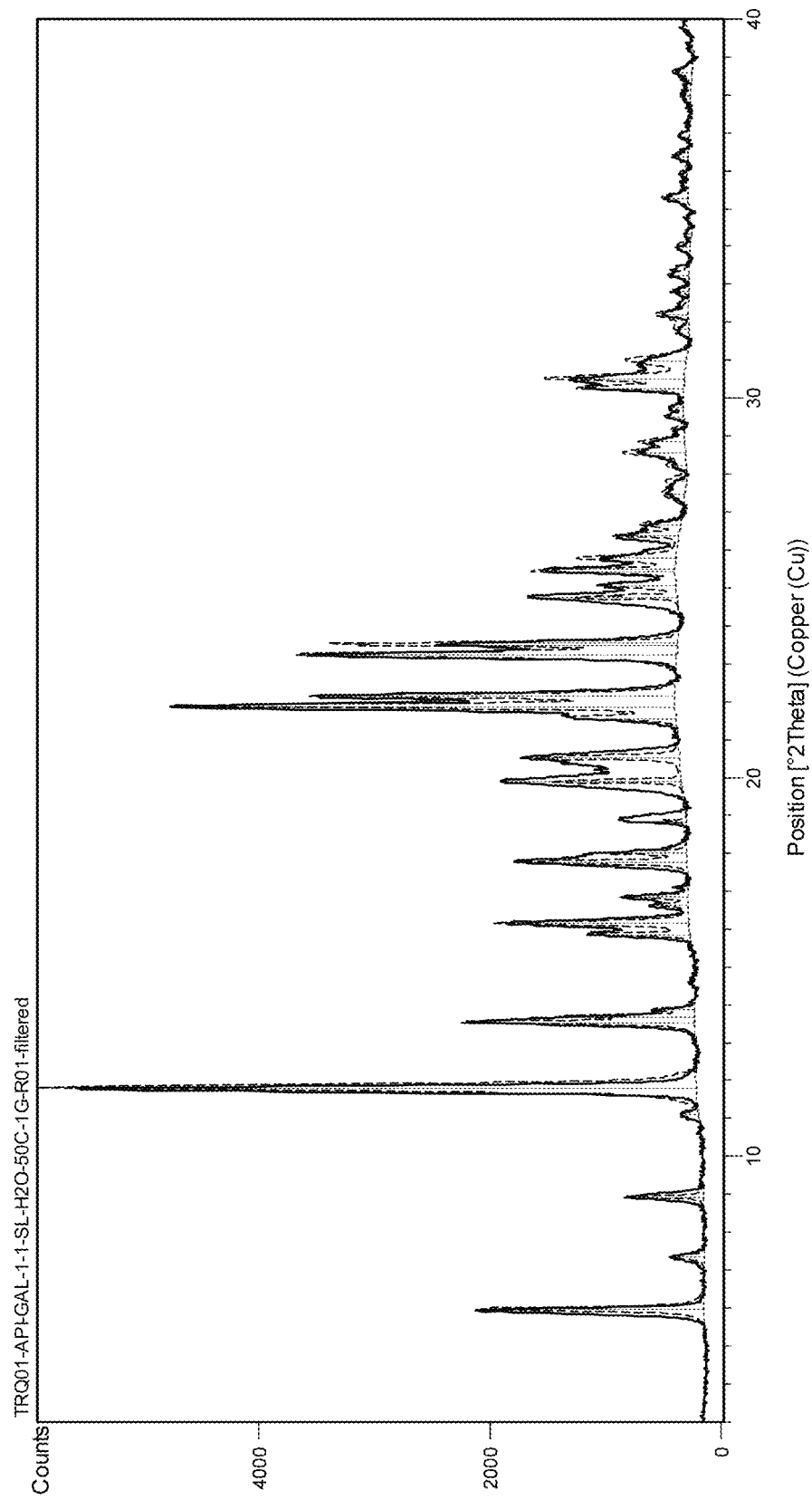
FIG. 30 is the XRPD pattern of sample TRQ01-API-GAL-1-1-SL-H2O-50C-R01-filtered.

The XRPD spectrum pattern is shown in FIG. 30 and the list of peaks of sample TRQ01-API-GAL-1-1-SL-H2O-500-1G-R01-filtered was reported in the table below.

TABLE 10

XRPD peak list of sample TRQ01-API-GAL-1-1-SL-H2O-50C-R01-filtered.

| Pos. [°2Th.] | Height [cts] | FWHM [°2Th.] | d-spacing [Å] | Rel. Int. [%] |
|---|---|---|---|---|
| 5.9749 | 1769.86 | 0.1279 | 14.79230 | 34.04 |
| 7.3416 | 279.13 | 0.1181 | 12.04144 | 5.37 |
| 8.9285 | 668.18 | 0.0689 | 9.90445 | 12.85 |
| 10.6140 | 27.44 | 0.1181 | 8.33516 | 0.53 |
| 11.1048 | 146.52 | 0.1968 | 7.96787 | 2.82 |
| 11.8026 | 5198.59 | 0.1771 | 7.49827 | 100.00 |
| 13.5195 | 1895.36 | 0.1082 | 6.54965 | 36.46 |
| 13.6781 | 1009.06 | 0.0787 | 6.47406 | 19.41 |
| 13.8554 | 322.05 | 0.0787 | 6.39162 | 6.19 |
| 15.8383 | 880.39 | 0.0787 | 5.59559 | 16.94 |
| 16.1363 | 1639.20 | 0.1181 | 5.49291 | 31.53 |
| 16.6162 | 318.35 | 0.0787 | 5.33535 | 6.12 |
| 16.8321 | 583.66 | 0.0787 | 5.26739 | 11.23 |
| 17.0836 | 108.72 | 0.0590 | 5.19042 | 2.09 |
| 17.7424 | 1428.56 | 0.0984 | 4.99914 | 27.48 |
| 17.9839 | 818.75 | 0.0689 | 4.93257 | 15.75 |
| 18.8133 | 487.95 | 0.0295 | 4.71693 | 9.39 |
| 19.8963 | 1552.98 | 0.0492 | 4.46256 | 29.87 |
| 20.5276 | 1294.39 | 0.0984 | 4.32673 | 24.90 |
| 21.5745 | 859.97 | 0.1181 | 4.11907 | 16.54 |

TABLE 10-continued

XRPD peak list of sample TRQ01-API-GAL-1-1-SL-H2O-50C-R01-filtered.

| Pos. [°2Th.] | Height [cts] | FWHM [°2Th.] | d-spacing [Å] | Rel. Int. [%] |
|---|---|---|---|---|
| 21.8798 | 4371.56 | 0.1082 | 4.06229 | 84.09 |
| 22.1464 | 3153.68 | 0.1181 | 4.01398 | 60.66 |
| 23.2397 | 3180.87 | 0.1673 | 3.82756 | 61.19 |
| 23.4956 | 2076.09 | 0.0600 | 3.78332 | 39.94 |
| 23.5487 | 1876.75 | 0.0590 | 3.77802 | 36.10 |
| 24.7497 | 1246.05 | 0.0492 | 3.59735 | 23.97 |
| 25.0601 | 662.24 | 0.1378 | 3.55350 | 12.74 |
| 25.4391 | 1024.03 | 0.0960 | 3.49851 | 19.70 |
| 25.5055 | 1143.87 | 0.0600 | 3.49823 | 22.00 |
| 25.7702 | 646.07 | 0.1440 | 3.45431 | 12.43 |
| 26.3869 | 495.47 | 0.0840 | 3.37495 | 9.53 |
| 26.6722 | 265.56 | 0.1440 | 3.33950 | 5.11 |
| 27.4787 | 129.44 | 0.3360 | 3.24329 | 2.49 |
| 27.8067 | 99.91 | 0.2400 | 3.20578 | 1.92 |
| 28.2145 | 120.45 | 0.1680 | 3.16036 | 2.32 |
| 28.5579 | 396.07 | 0.1680 | 3.12313 | 7.62 |
| 28.8364 | 286.66 | 0.1440 | 3.09360 | 5.51 |
| 29.1536 | 86.97 | 0.1440 | 3.06065 | 1.67 |
| 29.5143 | 154.17 | 0.0840 | 3.02407 | 2.97 |
| 29.7622 | 110.69 | 0.0960 | 2.99944 | 2.13 |
| 30.2691 | 813.92 | 0.0840 | 2.95036 | 15.66 |
| 30.5186 | 984.99 | 0.1200 | 2.92680 | 18.95 |
| 30.9882 | 376.82 | 0.2400 | 2.88351 | 7.25 |
| 31.8213 | 87.58 | 0.2880 | 2.80990 | 1.68 |
| 32.1956 | 203.76 | 0.2160 | 2.77807 | 3.92 |
| 32.8198 | 128.70 | 0.0960 | 2.72665 | 2.48 |
| 33.2383 | 147.29 | 0.1440 | 2.69327 | 2.83 |
| 33.9793 | 108.86 | 0.1680 | 2.63622 | 2.09 |
| 34.3316 | 50.43 | 0.1440 | 2.60997 | 0.97 |
| 34.7398 | 24.48 | 0.1440 | 2.58023 | 0.47 |
| 35.2696 | 180.75 | 0.1680 | 2.54267 | 3.48 |
| 35.8821 | 59.87 | 0.1440 | 2.50066 | 1.15 |
| 36.3703 | 131.30 | 0.1200 | 2.46821 | 2.53 |
| 36.8791 | 81.09 | 0.1440 | 2.43531 | 1.56 |
| 37.9636 | 60.39 | 0.3840 | 2.36820 | 1.16 |
| 38.5792 | 141.74 | 0.1680 | 2.33182 | 2.73 |
| 39.2389 | 35.80 | 0.1920 | 2.29412 | 0.69 |

DSC/TGA/EGA

DSC and TG/EG analyses of sample TRQ01-API-GAL-1-1-SL-H2O-50C-1G-R01-filtered were reported below.

Figure 31:
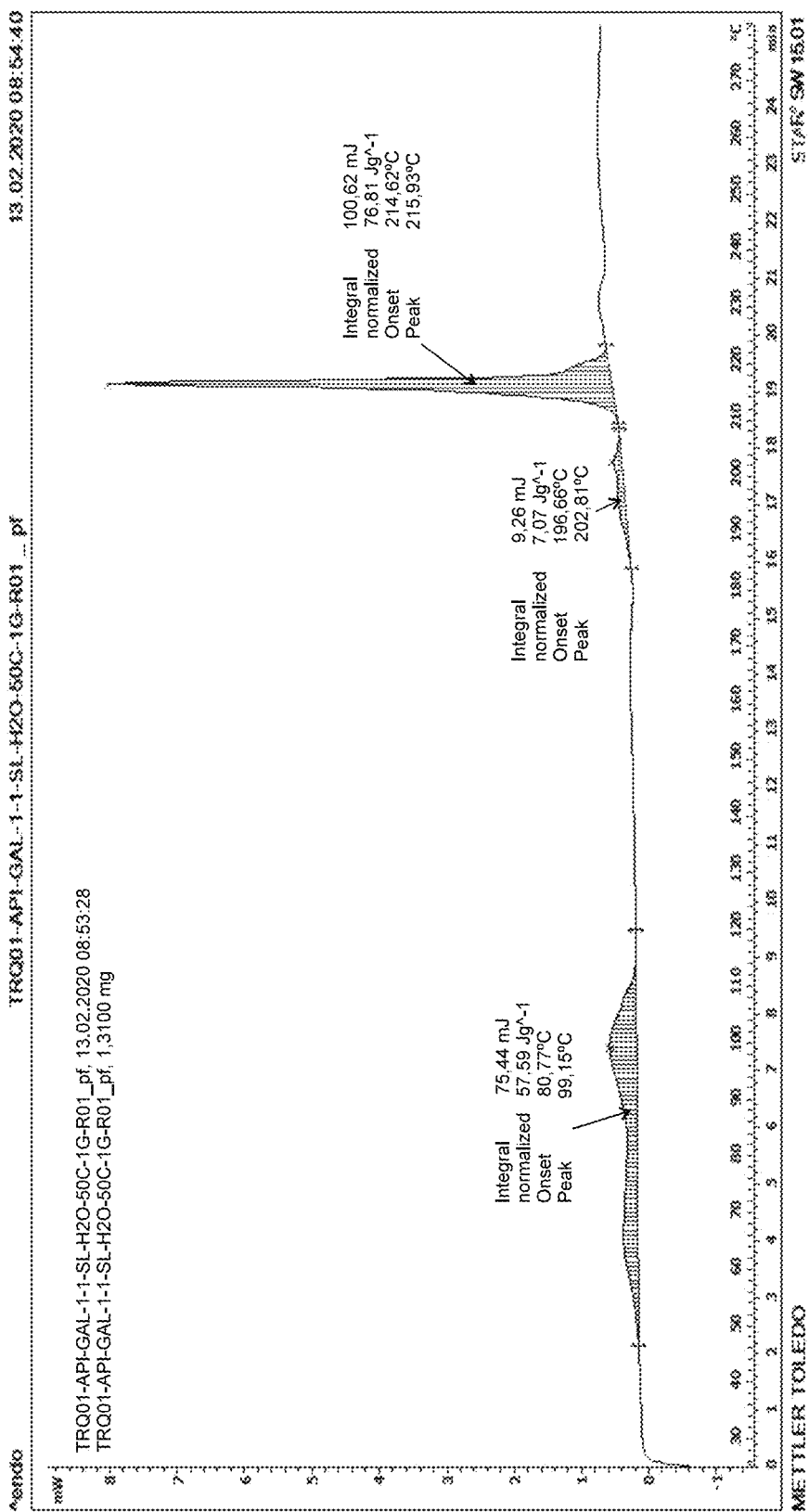
FIG. 31 shows the DSC profile of sample TRQ01-API-GAL-NP01b.

The DSC profile showed a first complex endothermic event at 99.2° C. (Onset 80.8° C.-57.6 J/g), ascribable to dehydration of the sample. A second weak broad endothermic event was recorded immediately before the melting of the sample. This event, observed at 202.8° C. (Onset 196.7° C.-7.1 J/g) could be tentatively explained by the presence of some impurities in the analyzed sample and eutectic trace. The third sharp endothermic peak at 215.9° C. (Onset 214.6° C.-76.8 J/g) was indeed imputable to congruent melting of anhydrous derivative (FIG. 31).

Figure 32:
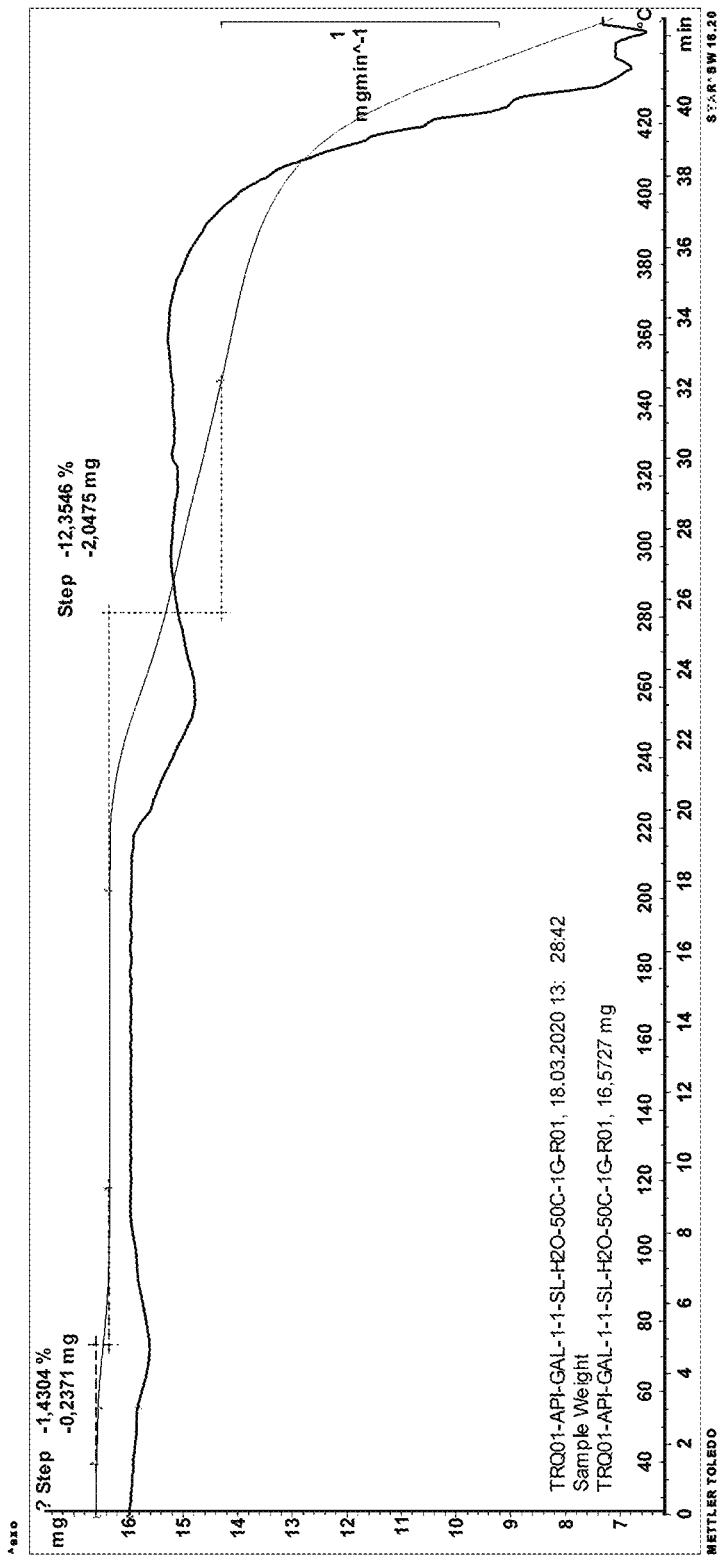
FIG. 32 shows the TG (black line) and dTG (red line) profiles of sample TRQ01-API-GAL-NP01b.
Figure 33:
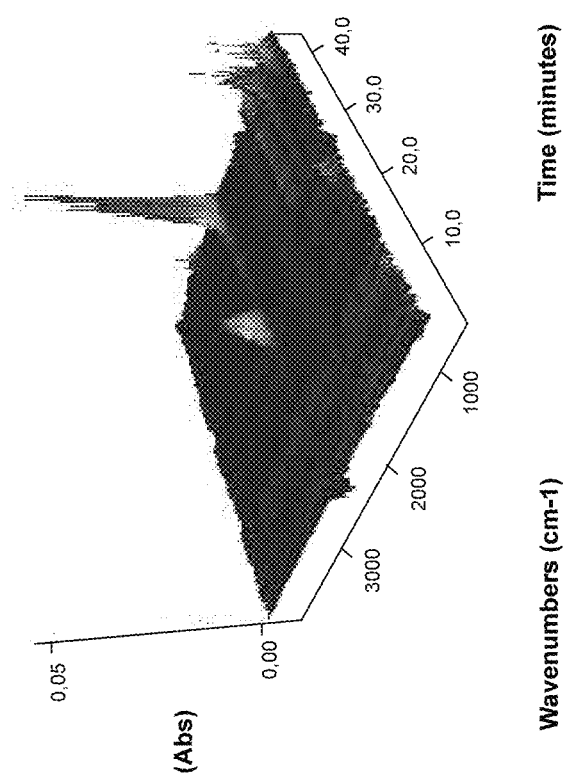
FIG. 33 shows the 3D-EGA profile of sample TRQ01-API-GAL-NP01b.

Combined TG/EG analysis confirmed the nature of the first event: in fact, between approx. 40 and 110° C., a weight loss of 1.4% w/w was registered (approx. 0.4 water molecule each API molecule (FIG. 32). EGA did not recorded any solvent evolution, so the presence of Water in the sample was supposed (FIG. 33). In addition, a second weight loss of 12.4% w/w was recorded in the range approx. 200÷340° C. Since the evolution of Carbon Dioxide highlighted by EG analysis, this event could be assigned to the decomposition of Gallic acid. Moreover, TGA highlighted the starting of decomposition of the Apixaban moiety above approx. 340° C. (FIG. 32).

FT-IR

Figure 34:
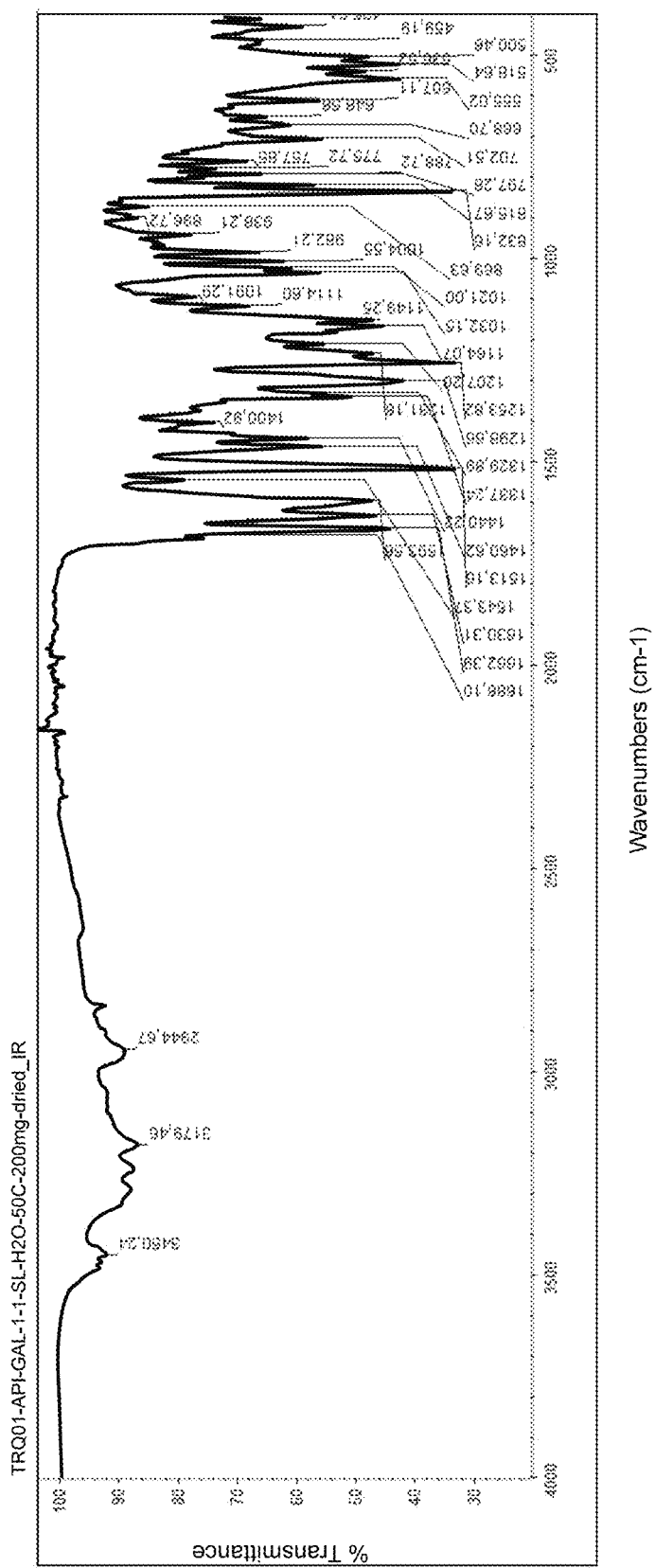
FIG. 34 is the FT-IR spectrum of sample TRQ01-API-GAL-NP01b.

The FT-IR spectrum pattern of API-GAL derivative NP01 b is shown in FIG. 34 and the list of peaks was reported in the table below.

TABLE 11

FT-IR peak list of sample TRQ01-API-GAL-NP01b-dried.

| Position (cm$^{-1}$) | Intensity | Position (cm$^{-1}$) | Intensity |
|---|---|---|---|
| 407.34 | 65.792 | 1032.15 | 55.691 |
| 425.61 | 58.790 | 1091.29 | 76.902 |
| 459.19 | 65.478 | 1114.60 | 67.670 |
| 500.46 | 47.674 | 1149.25 | 46.653 |
| 518.64 | 42.383 | 1164.07 | 45.046 |
| 536.52 | 48.111 | 1207.20 | 55.288 |
| 555.02 | 42.379 | 1231.16 | 46.678 |
| 607.11 | 55.245 | 1253.82 | 33.029 |
| 648.58 | 64.619 | 1298.66 | 41.639 |
| 668.70 | 60.748 | 1329.89 | 54.496 |
| 702.51 | 55.327 | 1337.24 | 50.294 |
| 757.85 | 68.126 | 1400.92 | 73.808 |
| 775.72 | 73.283 | 1440.22 | 57.792 |
| 788.72 | 65.726 | 1460.62 | 55.503 |
| 797.28 | 75.377 | 1513.16 | 32.875 |
| 815.67 | 56.653 | 1543.37 | 78.448 |
| 832.16 | 33.598 | 1593.56 | 46.993 |
| 869.63 | 84.712 | 1630.31 | 46.196 |
| 896.72 | 86.493 | 1662.39 | 43.837 |
| 938.21 | 77.542 | 1686.10 | 75.407 |
| 982.21 | 66.000 | 2944.67 | 88.649 |
| 1004.55 | 61.832 | 3179.46 | 86.705 |
| 1021.00 | 60.585 | 3450.24 | 91.895 |

FT-Raman

Figure 35:
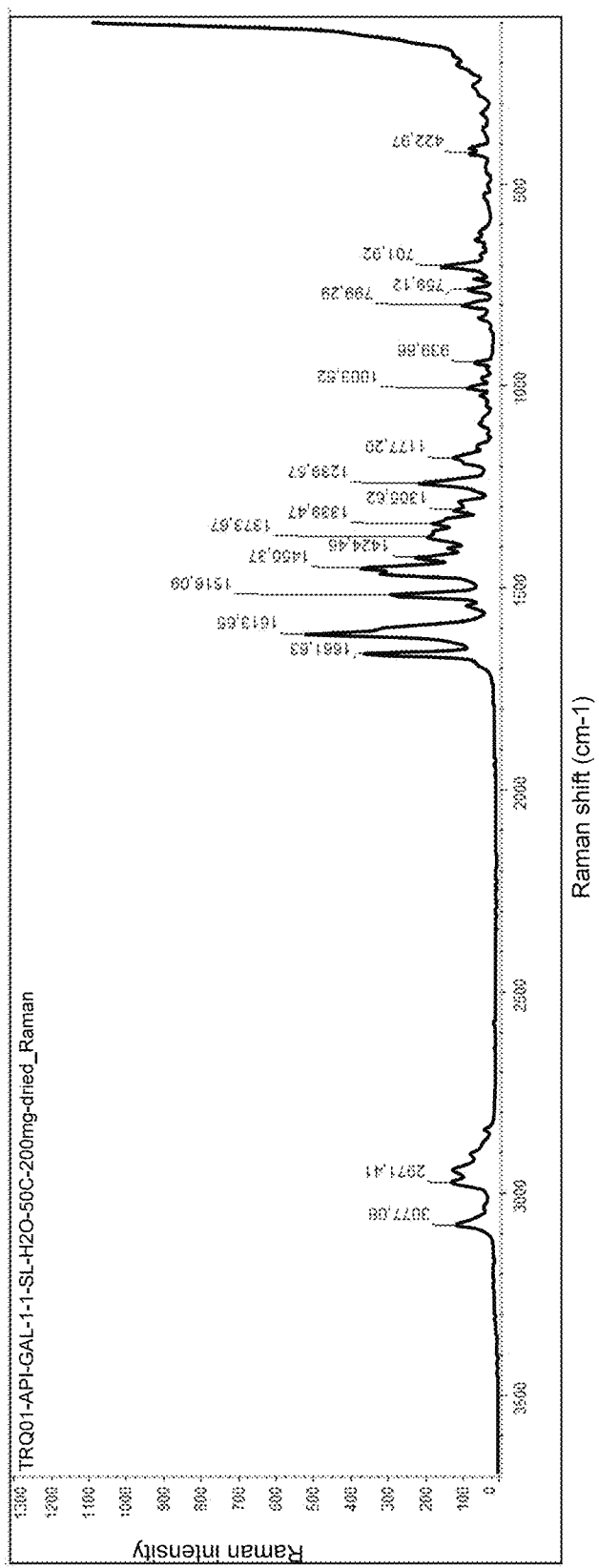
FIG. 35 is the FT-Raman spectrum of sample TRQ01-API-GAL-NP01b.

In FIG. 35 was reported the FT-Raman spectrum of API-GAL derivative NP01b along with its peak list in the following table.

TABLE 12

FT-Raman peak list of sample TRQ01-API-GAL-NP01b dried.

| Position (cm$^{-1}$) | Intensity | Position (cm$^{-1}$) | Intensity |
|---|---|---|---|
| 97.08 | 1107.265 | 1339.47 | 174.626 |
| 422.97 | 78.852 | 1373.67 | 187.169 |
| 701.92 | 154.781 | 1424.46 | 226.803 |
| 759.12 | 85.058 | 1450.37 | 369.905 |
| 799.29 | 98.137 | 1516.09 | 289.631 |
| 939.86 | 65.807 | 1613.65 | 520.486 |
| 1003.52 | 79.785 | 1661.63 | 358.883 |
| 1177.20 | 123.127 | 2971.41 | 127.522 |
| 1239.57 | 215.047 | 3077.08 | 113.567 |
| 1305.62 | 120.165 | | |

1H-NMR

Figure 36:
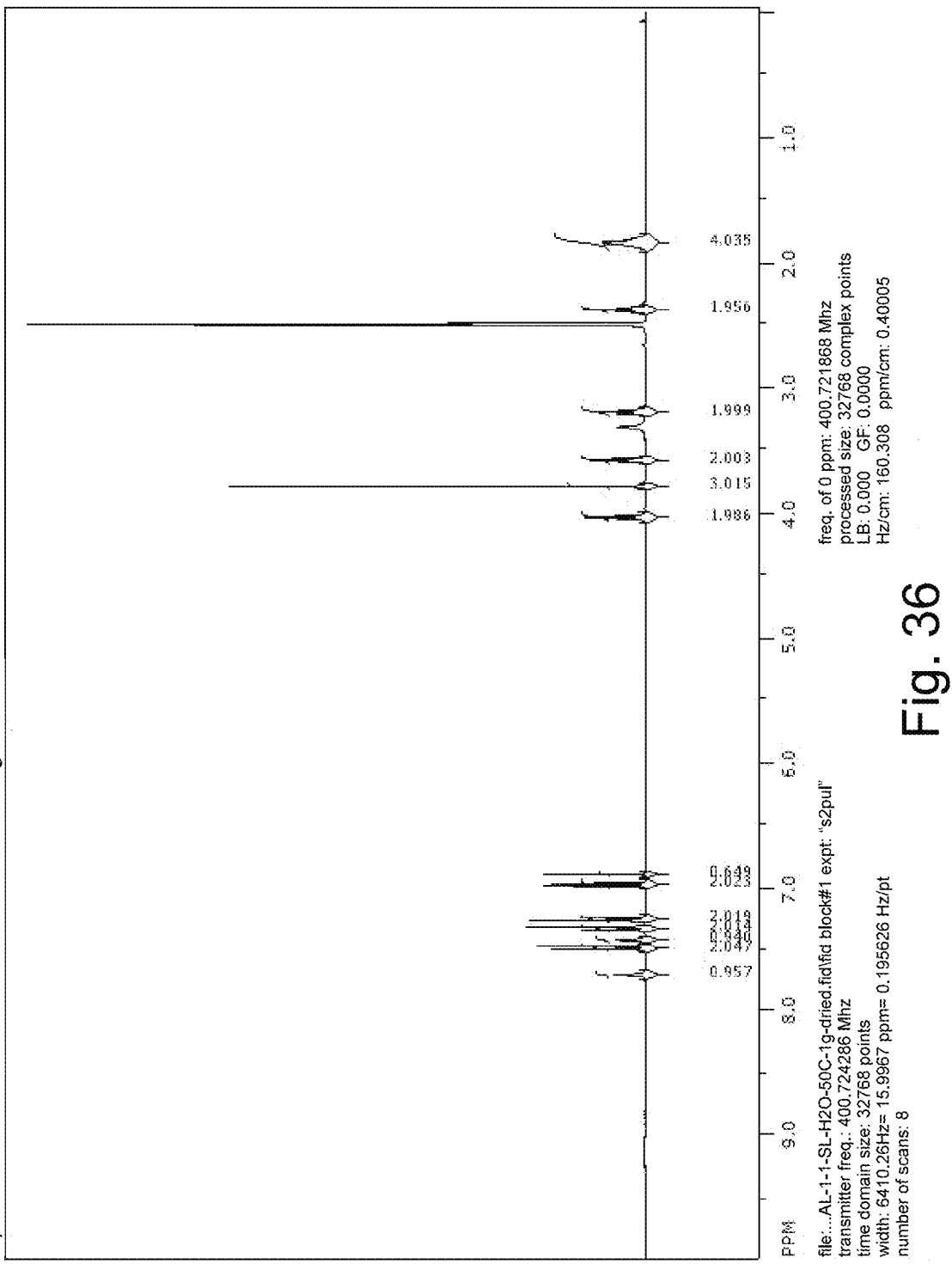
FIG. 36 is the 1H-NMR spectrum of sample TRQ01-API-GAL-NP01b.

The 1H-NMR spectrum (FIG. 36) of TRQ01-API-GAL-NP01b dried confirmed the presence of Apixaban and Gallic Acid in the stoichiometric ratio API:GAL approx. 1:0.35 (in agreement with TG analysis). The structural integrity of the molecule was even confirmed.

The spectrum 1H-NMR data are as follows: (400 MHz, DMSO-d6) δ: 7.71 (bs, 1H), 7.50 (d, J=8.8 Hz, 2H), 7.43 (bs, 1H), 7.35 (d, J=8.8 Hz, 2H), 7.27 (d, J=8.8 Hz, 2H), 7.00 (d, J=8.8 Hz, 2H), 6.90 (s, 0.7H), 4.05 (t, J=6.4 Hz, 2H), 3.80 (s, 3H), 3.59 (t, J=5.6 Hz, 2H), 3.20 (t, J=6.4 Hz, 2H), 2.99 (bs, 1.6H), 2.38 (t, J=6.4 Hz, 2H), 1.90-1.78 (m, 4H).

Apixaban-Maleic Acid Derivative

A new derivative of Apixaban and Maleic Acid was firstly observed from Kneading experiment. In detail, the recovered powder showed a new XRPD pattern, labeled as NP01. Characterization of API-MEA Derivative NP01

Synthesis 151.6 mg of Maleic Acid were accurately weighed in an 8 ml glass vial equipped with a magnetic stirring bar and 4 ml of ETA were added. After complete dissolution of the coformer, 200 mg of Apixaban were added and the resulting mixture was stirred for 48 hours at room temperature.

After this time, the formed solid was isolated by vacuum filtration and washed with 2 ml of ETA, analyzed by XRPD and dried at 40° C. and 30 mbar for 20 hours. After the drying step, XRPD analysis was performed again.

The desired derivative API-MEA-NP01 was successfully recovered and it was fully characterized.

XRPD

Figure 37:
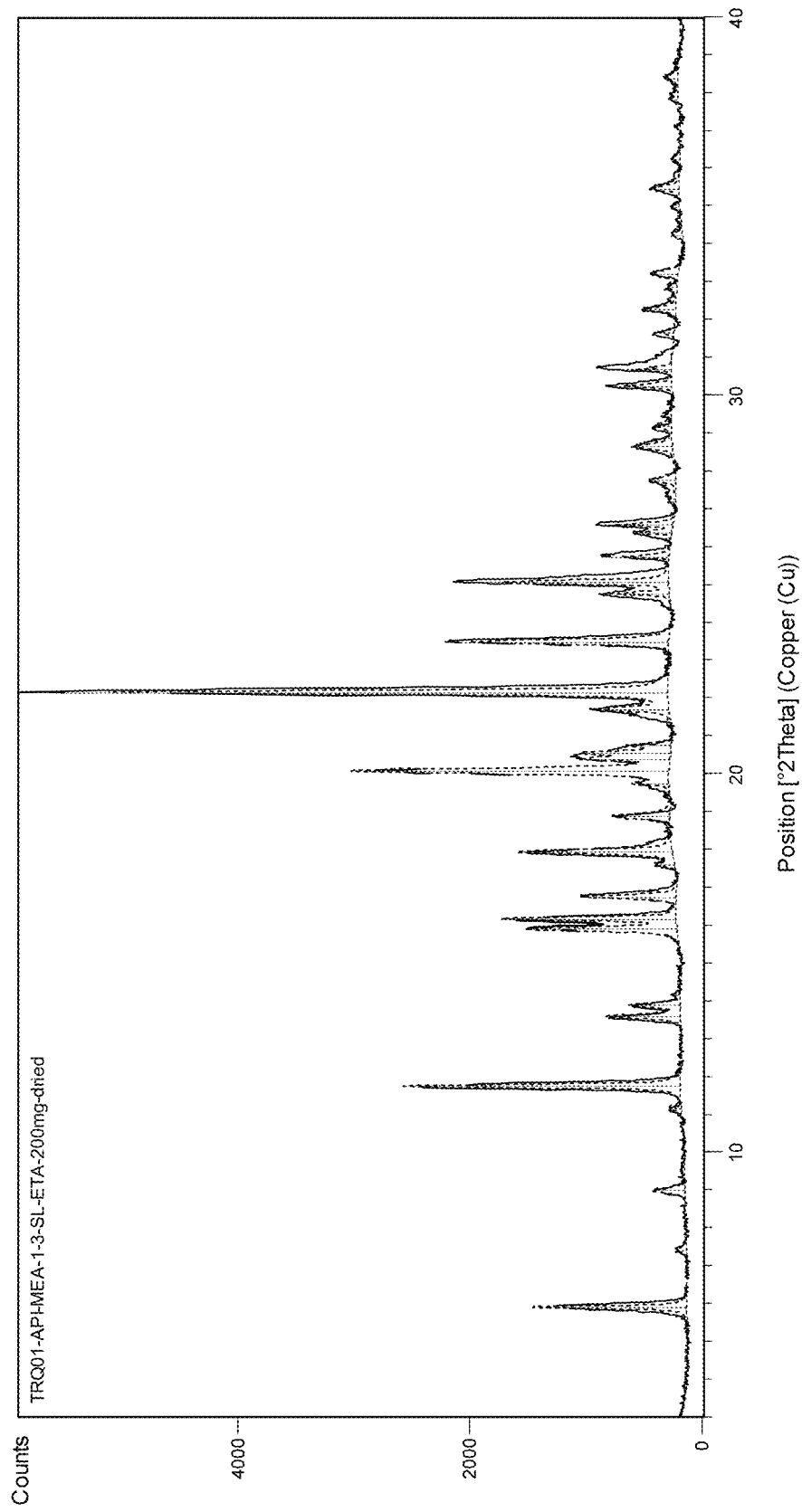
FIG. 37 is the XRPD pattern of sample TRQ01-API-MEA-1-3-SL-ETA-200 mg-dried.

The XRPD spectrum pattern is shown in FIG. 37 and the list of peaks of sample TRQ01-API-MEA-1-3-SL-ETA-200 mg-dried was reported in the table below.

TABLE 13

XRPD peak list of sample TRQ01-API-MEA-1-3-SL-ETA-200 mg-dried.

| Pos. [°2Th.] | Height [cts] | FWHM [°2Th.] | d-spacing [Å] | Rel. Int. [%] |
|---|---|---|---|---|
| 5.8998 | 1213.66 | 0.0886 | 14.98057 | 23.30 |
| 7.4007 | 78.73 | 0.1574 | 11.94547 | 1.51 |
| 8.9837 | 262.73 | 0.1574 | 9.84372 | 5.04 |
| 11.1559 | 91.84 | 0.1378 | 7.93143 | 1.76 |
| 11.7367 | 2279.27 | 0.0984 | 7.54022 | 43.75 |
| 13.5746 | 588.46 | 0.1279 | 6.52321 | 11.30 |
| 13.8724 | 397.51 | 0.1082 | 6.38385 | 7.63 |
| 15.8783 | 1229.81 | 0.1279 | 5.58159 | 23.61 |
| 16.1507 | 1503.92 | 0.0886 | 5.48805 | 28.87 |
| 16.7330 | 757.45 | 0.1082 | 5.29838 | 14.54 |
| 17.5935 | 145.85 | 0.1181 | 5.04112 | 2.80 |
| 17.9244 | 1317.13 | 0.1181 | 4.94879 | 25.28 |
| 18.8560 | 468.23 | 0.1574 | 4.70635 | 8.99 |
| 19.7301 | 264.22 | 0.0984 | 4.49976 | 5.07 |
| 20.0562 | 2632.42 | 0.1476 | 4.42734 | 50.53 |
| 20.3800 | 728.03 | 0.0886 | 4.35772 | 13.97 |
| 20.5308 | 766.61 | 0.0984 | 4.32606 | 14.72 |
| 20.7282 | 366.70 | 0.0984 | 4.28530 | 7.04 |
| 21.6841 | 616.78 | 0.1181 | 4.09850 | 11.84 |
| 22.1329 | 5209.72 | 0.0984 | 4.01640 | 100.00 |
| 23.4653 | 1795.83 | 0.1181 | 3.79127 | 34.47 |
| 24.7378 | 600.84 | 0.0590 | 3.59906 | 11.53 |
| 25.0424 | 1680.48 | 0.0886 | 3.55598 | 32.26 |
| 25.7246 | 521.96 | 0.0590 | 3.46320 | 10.02 |
| 26.3569 | 323.17 | 0.0689 | 3.38153 | 6.20 |
| 26.5691 | 635.97 | 0.0590 | 3.35500 | 12.21 |
| 27.2507 | 58.88 | 0.1574 | 3.27262 | 1.13 |
| 27.7423 | 219.34 | 0.1378 | 3.21573 | 4.21 |
| 28.6235 | 320.25 | 0.1378 | 3.11871 | 6.15 |
| 29.1758 | 139.79 | 0.1378 | 3.06091 | 2.68 |
| 29.4759 | 50.72 | 0.1574 | 3.03043 | 0.97 |
| 30.2284 | 532.79 | 0.0689 | 2.95668 | 10.23 |
| 30.6680 | 504.47 | 0.0492 | 2.91530 | 9.68 |
| 31.6419 | 162.79 | 0.0689 | 2.82775 | 3.12 |
| 32.2493 | 277.95 | 0.1181 | 2.77587 | 5.34 |
| 32.8438 | 82.60 | 0.1574 | 2.72697 | 1.59 |
| 33.1759 | 216.44 | 0.1771 | 2.70043 | 4.15 |
| 34.2036 | 83.66 | 0.1181 | 2.62161 | 1.61 |
| 34.9640 | 63.78 | 0.1574 | 2.56632 | 1.22 |
| 35.4362 | 241.33 | 0.1181 | 2.53320 | 4.63 |
| 36.2119 | 66.23 | 0.1181 | 2.48069 | 1.27 |
| 36.7192 | 5.39 | 0.1181 | 2.44758 | 0.10 |
| 37.1149 | 35.52 | 0.1181 | 2.42239 | 0.68 |
| 37.4936 | 3.94 | 0.1181 | 2.39878 | 0.08 |
| 37.8032 | 67.42 | 0.1968 | 2.37985 | 1.29 |
| 38.3632 | 102.90 | 0.1378 | 2.34639 | 1.98 |

DSC/TGA/EGA

Figure 38:
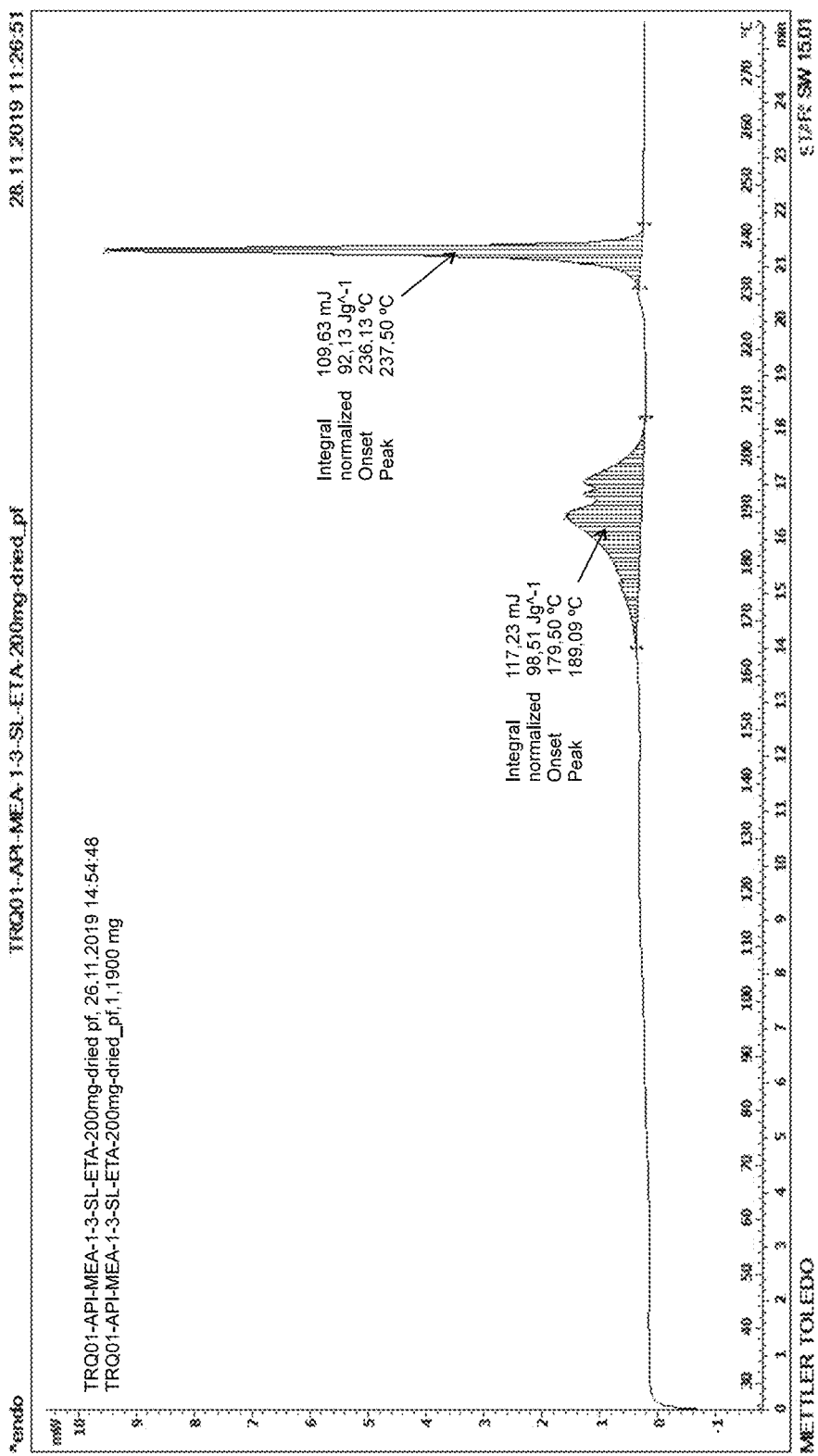
FIG. 38 shows the DSC profile of sample TRQ01-API-MEA-1-3-SL-ETA-200 mg-dried.
Figure 39:
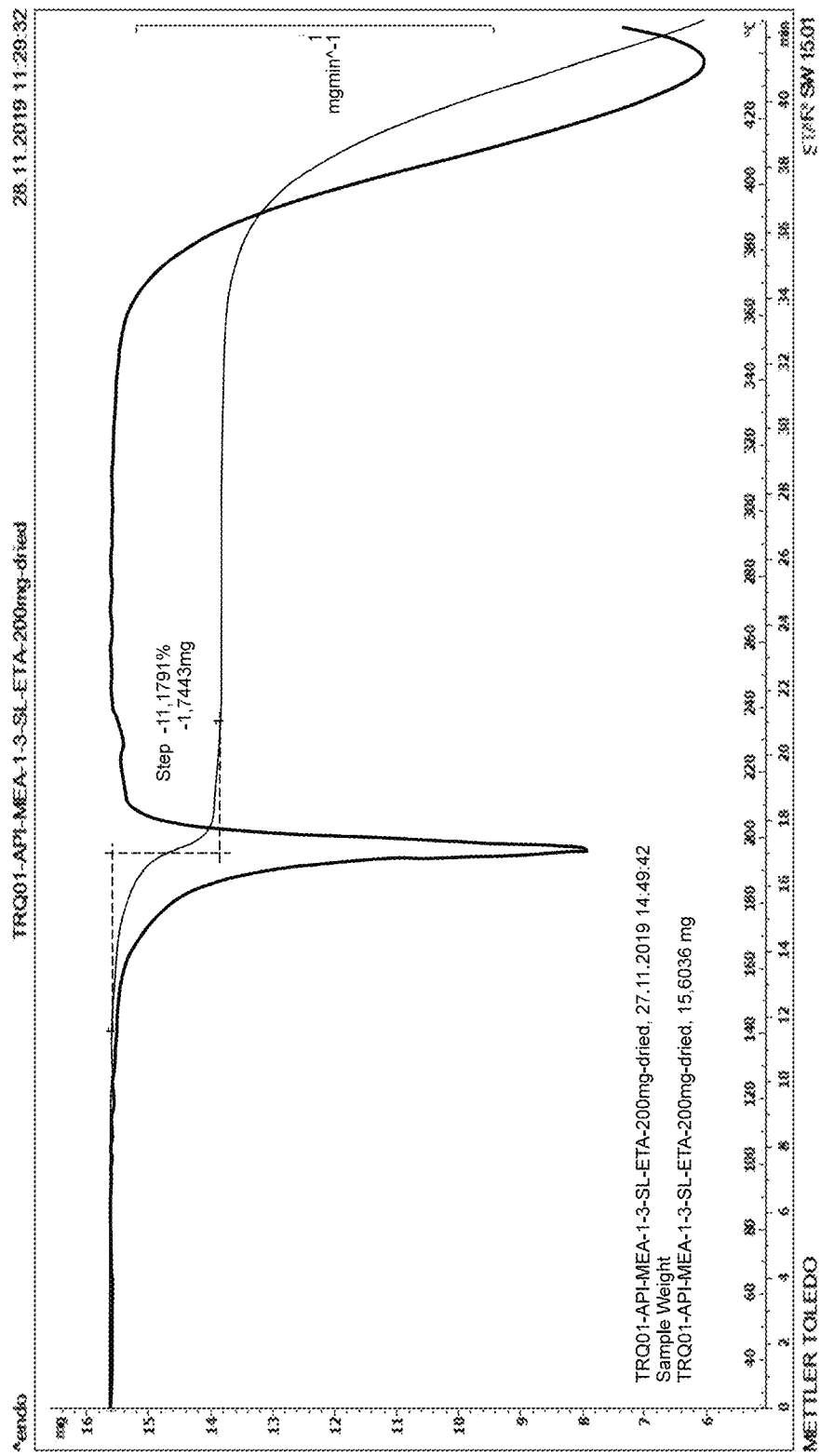
FIG. 39 shows the TG (black line) and dTG (red line) profiles of sample TRQ01-API-MEA-1-3-SL-ETA-200 mg-dried.
Figure 40:
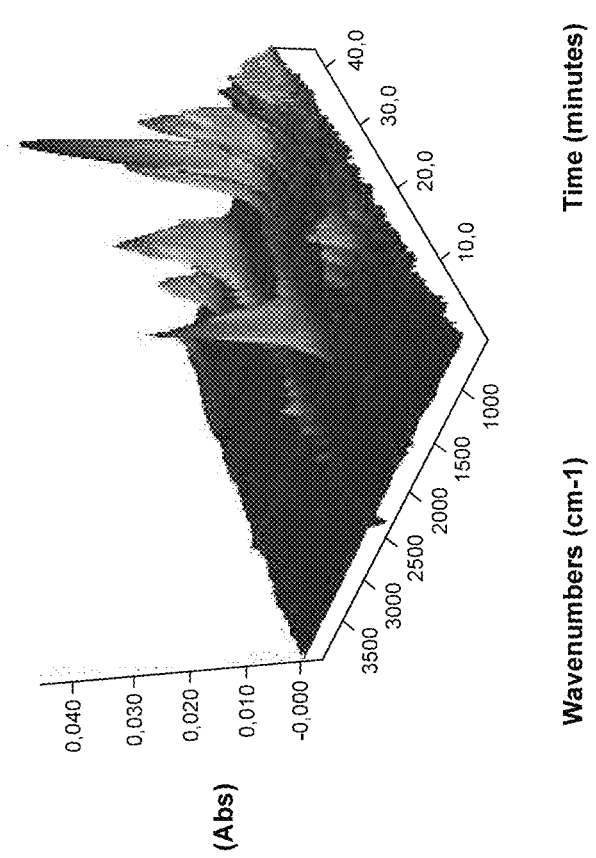
FIG. 40 shows the 3D-EGA profile of sample TRQ01-API-MEA-1-3-SL-ETA-200 mg-dried.

FIGS. 38, 39 and 40 correspond to DSC, TG and EGA analyses performed on sample TRQ01-API-MEA-1-3-SL-ETA-200 mg-dried were performed, respectively.

The DSC profile showed two endothermic events: the first broad endothermic event at 189.1° C. (Onset 179.5° C.) could be imputable to melting/degradation of the sample. A second sharp endothermic peak was recorded at 237.5° C. (Onset 236.1° C.), ascribable to the melting of Apixaban.

The nature of the first event was disclosed by combined TG/EG analysis. In fact, TG highlights a significant weight loss (11.2% w/w) starting from approx. 150° C., in correspondence with the broad endothermic event recorded in DSC. In addition, EGA confirmed the evolution of Maleic Anhydride in correspondence with the recorded weight loss. The evolution of Maleic Anhydride also unambiguously confirms the presence of the coformer in the isolated species.

In addition, TGA highlights the recovery of an anhydrous derivative and the degradation of the Apixaban moiety above approx. 340° C.

FT-IR

Figure 41:
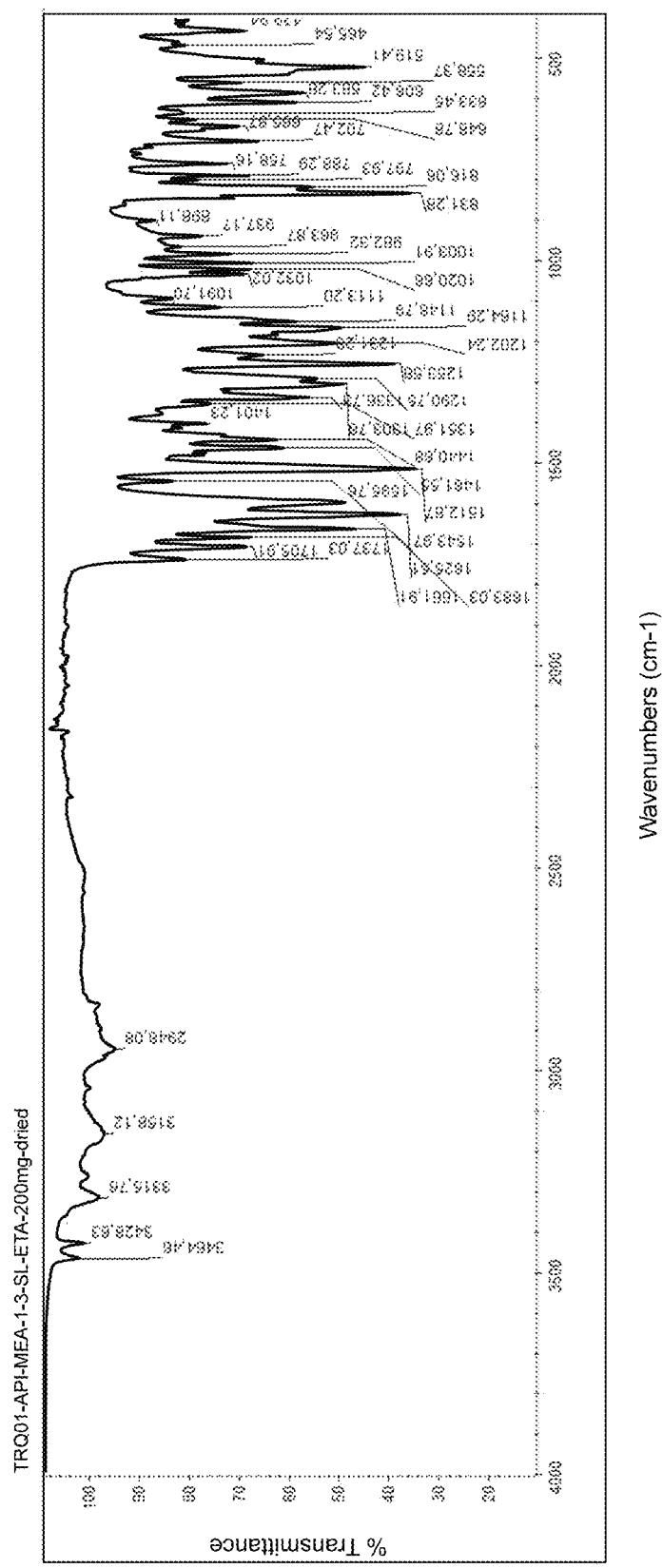
FIG. 41 is the FT-IR spectrum of sample TRQ01-API-MEA-1-3-SL-ETA-200 mg-dried.

The FT-IR spectrum pattern of API-MEA derivative NP01 is shown in FIG. 41 and the list of peaks was reported in the table below. The comparison with FT-IR spectrum of Apixaban suggested the formation of a new species. In detail, the two bands at 1737 cm$^{-1}$ and 1706 cm$^{-1}$ could be associated to the presence of the coformer in the new derivative.

TABLE 14

FT-IR peak list of sample TRQ01-API-MEA-1-3-SL-ETA-200 mg-dried.

| Position (cm$^{-1}$) | Intensity | Position (cm$^{-1}$) | Intensity |
|---|---|---|---|
| 429.94 | 68.782 | 1164.29 | 49.428 |
| 465.54 | 80.585 | 1202.24 | 50.132 |
| 519.41 | 44.310 | 1231.28 | 64.984 |
| 558.37 | 69.585 | 1253.58 | 38.537 |
| 583.28 | 56.819 | 1290.75 | 53.947 |
| 606.42 | 58.561 | 1303.76 | 48.732 |
| 633.45 | 80.962 | 1336.73 | 55.380 |
| 648.78 | 78.606 | 1351.97 | 75.437 |
| 665.87 | 69.818 | 1401.23 | 76.848 |
| 702.47 | 65.680 | 1440.68 | 62.960 |
| 758.16 | 72.176 | 1461.55 | 61.018 |
| 788.29 | 67.606 | 1512.87 | 34.419 |
| 797.93 | 78.365 | 1543.97 | 83.101 |
| 816.06 | 55.110 | 1595.76 | 48.822 |
| 831.28 | 35.348 | 1625.51 | 37.348 |
| 898.11 | 86.364 | 1661.91 | 46.126 |
| 937.17 | 77.191 | 1683.03 | 67.345 |
| 963.87 | 81.560 | 1705.91 | 68.435 |
| 982.32 | 71.575 | 1737.03 | 80.729 |
| 1003.91 | 66.820 | 2948.08 | 94.638 |
| 1020.66 | 67.637 | 3158.12 | 96.931 |
| 1032.02 | 69.135 | 3315.76 | 97.919 |
| 1091.70 | 83.284 | 3428.63 | 100.947 |
| 1113.20 | 73.640 | 3464.46 | 102.116 |
| 1148.79 | 58.386 | | |

FT-Raman

Figure 42:
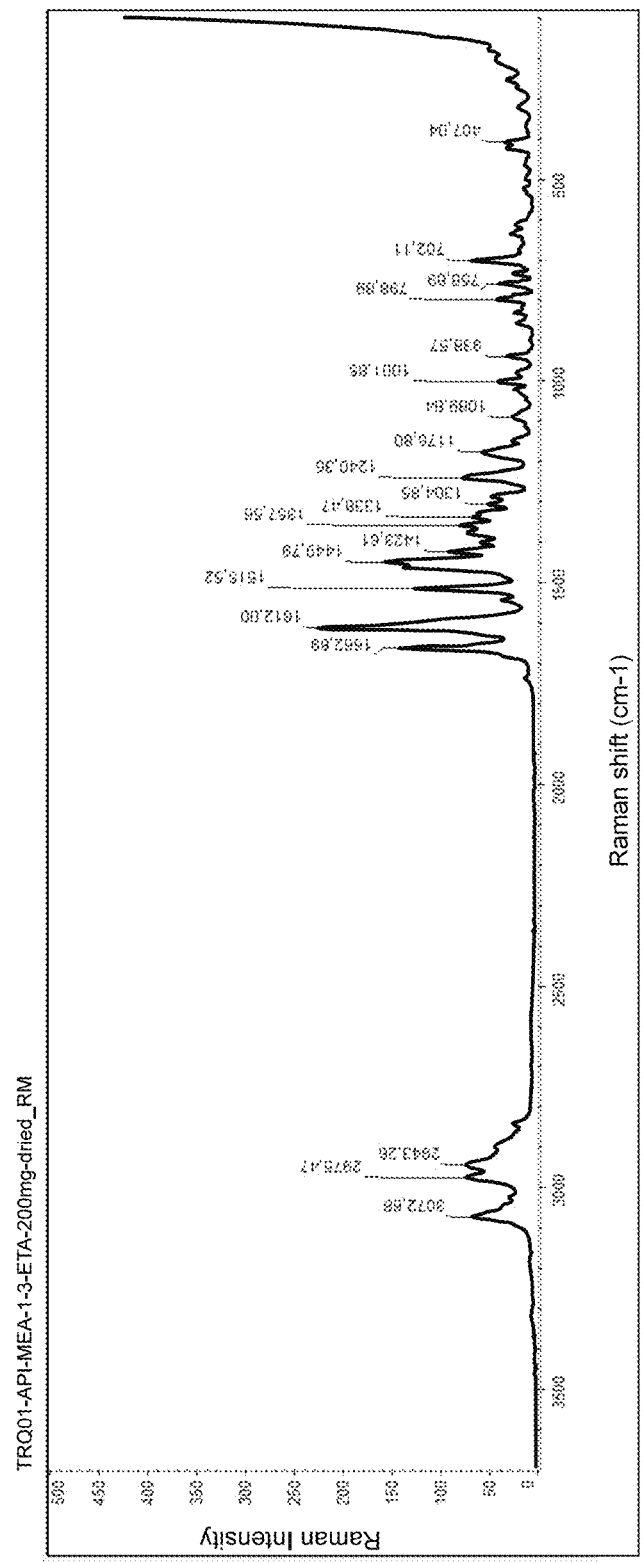
FIG. 42 is the FT-Raman spectrum of sample TRQ01-API-MEA-1-3-SL-ETA-200 mg-dried.

In FIG. 42 was reported the FT-Raman spectrum of API-MEA derivative NP01 along with its peak list in the following table.

TABLE 15

FT-Raman peak list of sample TRQ01-API-MEA-1-3-SL-ETA-200 mg-dried.

| Position (cm$^{-1}$) | Intensity | Position (cm$^{-1}$) | Intensity |
|---|---|---|---|
| 97.08 | 426.006 | 1338.47 | 65.286 |
| 407.04 | 32.605 | 1357.56 | 78.820 |
| 702.11 | 66.381 | 1423.61 | 91.169 |
| 758.89 | 36.028 | 1449.79 | 156.931 |
| 798.89 | 41.076 | 1515.52 | 124.922 |
| 938.57 | 29.679 | 1612.00 | 224.792 |
| 1001.85 | 39.490 | 1662.69 | 141.645 |
| 1089.84 | 25.079 | 2943.26 | 72.372 |
| 1176.80 | 56.555 | 2975.47 | 71.638 |
| 1240.36 | 76.326 | 3072.68 | 66.023 |
| 1304.85 | 49.818 | | |

1H-NMR

Figure 43:
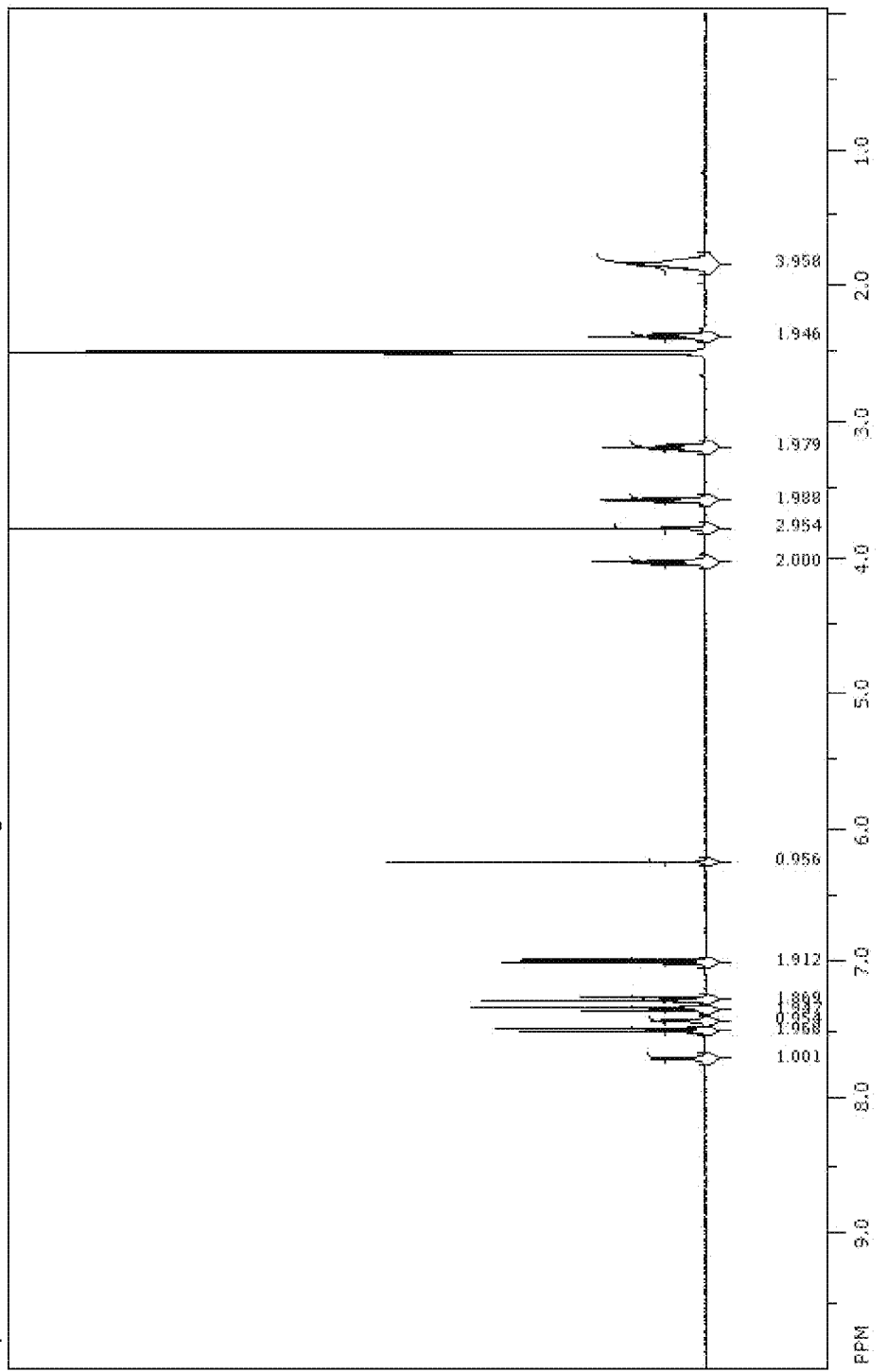
FIG. 43 is the 1H-NMR spectrum of sample TRQ01-API-MEA-1-3-SL-ETA-200 mg-dried.

The 1H-NMR spectrum (FIG. 43) of TRQ01-API-MEA-1-3-SL-ETA-200 mg-dried revealed the presence of Apixaban and Maleic Acid in the stoichiometric ratio API:MEA of approx. 1:0.5. The structural integrity of the molecule was confirmed.

The spectrum 1H-NMR data are as follows: (400 MHz, DMSO-d6) δ: 7.71 (bs, 1H), 7.50 (d, J=8.8 Hz, 2H), 7.43 (bs, 1H), 7.35 (d, J=8.8 Hz, 2H), 7.27 (d, J=8.8 Hz, 2H), 7.00 (d, J=8.8 Hz, 2H), 6.26 (s, 1H), 4.05 (t, J=6.4 Hz, 2H), 3.80 (s, 3H), 3.59 (t, J=5.6 Hz, 2H), 3.20 (t, J=6.4 Hz, 2H), 2.38 (t, J=6.4 Hz, 2H), 1.90-1.78 (m, 4H).

Apixaban-L-Tartaric Acid Derivative

A new derivative of Apixaban and L-Tartaric Acid was firstly observed from kneading experiment in Water. This new derivative was labeled as NP01.

Characterization of API-LTA Derivative NP01 (200 mg Scale)

Synthesis 65.3 mg of L-Tartaric Acid were accurately weighed in a 20 ml glass vial equipped with a magnetic stirring bar and 18 ml of ACN were added. After complete dissolution of the coformer, 200 mg of Apixaban were added and the resulting mixture was stirred for 24 hours at room temperature.

After this time, the formed solid was isolated by vacuum filtration and washed with 2 ml of ACN, analyzed by XRPD and dried at 40° C. and 30 mbar for 20 hours. After the drying step, XRPD analysis was performed again.

The desired derivative API-LTA-NP01 was successfully isolated and it was fully characterized.

XRPD

Figure 44:
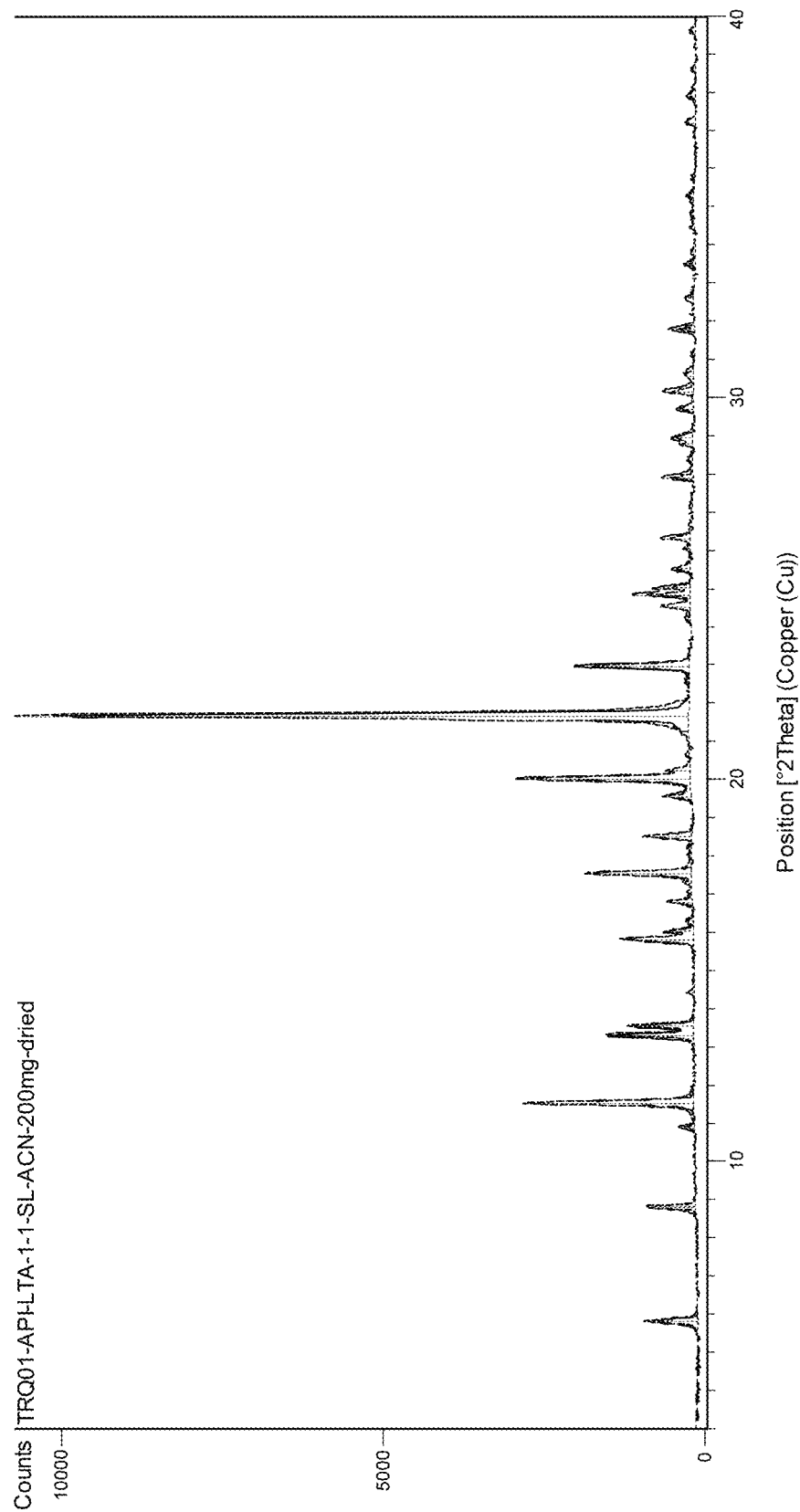
FIG. 44 is the XRPD pattern of sample TRQ01-API-LTA-1-1-SL-ACN-200 mg-dried.

The XRPD spectrum pattern is shown in FIG. 44 and the list of peaks of sample TRQ01-API-LTA-1-1-SL-ACN-200 mg-dried was reported in the table below.

TABLE 16

XRPD peak list of sample TRQ01-API-LTA-1-1-SL-ACN-200 mg-dried.

| Pos. [°2Th.] | Height [cts] | FWHM [°2Th.] | d-spacing [Å] | Rel. Int. [%] |
|---|---|---|---|---|
| 5.8131 | 752.45 | 0.1082 | 15.20373 | 7.24 |
| 8.7755 | 664.66 | 0.0590 | 10.07687 | 6.39 |
| 8.8260 | 600.22 | 0.0394 | 10.01931 | 5.77 |
| 10.8696 | 220.01 | 0.0492 | 8.13969 | 2.12 |
| 11.5197 | 2480.87 | 0.1082 | 7.68179 | 23.87 |
| 13.3065 | 1298.04 | 0.0984 | 6.65403 | 12.49 |
| 13.5494 | 974.75 | 0.0886 | 6.53528 | 9.38 |
| 14.4069 | 90.73 | 0.0984 | 6.14817 | 0.87 |
| 15.8124 | 1117.04 | 0.1082 | 5.60469 | 10.75 |
| 16.0214 | 463.43 | 0.0492 | 5.53204 | 4.46 |
| 16.2975 | 103.84 | 0.1181 | 5.43897 | 1.00 |
| 16.7908 | 378.16 | 0.0689 | 5.28027 | 3.64 |
| 17.0372 | 74.96 | 0.0590 | 5.20445 | 0.72 |
| 17.2872 | 92.47 | 0.0787 | 5.12974 | 0.89 |
| 17.5279 | 1622.08 | 0.1082 | 5.05984 | 15.60 |
| 18.0021 | 62.60 | 0.0984 | 4.92762 | 0.60 |
| 18.2033 | 72.21 | 0.0787 | 4.87360 | 0.69 |
| 18.5016 | 763.26 | 0.0886 | 4.79570 | 7.34 |
| 19.5465 | 401.86 | 0.0787 | 4.54162 | 3.87 |
| 20.0038 | 2517.43 | 0.1181 | 4.43882 | 24.22 |
| 20.2332 | 321.64 | 0.0590 | 4.38900 | 3.09 |
| 20.6511 | 56.15 | 0.0787 | 4.30112 | 0.54 |
| 21.6550 | 10395.27 | 0.1378 | 4.10394 | 100.00 |
| 22.5771 | 56.96 | 0.1181 | 3.93837 | 0.55 |
| 22.9515 | 1691.87 | 0.0984 | 3.87497 | 16.28 |
| 24.2245 | 74.54 | 0.1378 | 3.67414 | 0.72 |
| 24.5250 | 450.43 | 0.1082 | 3.62981 | 4.33 |
| 24.8308 | 879.54 | 0.0492 | 3.58579 | 8.46 |
| 25.0061 | 589.88 | 0.0492 | 3.56105 | 5.67 |
| 25.5117 | 276.54 | 0.0886 | 3.49161 | 2.66 |

TABLE 16-continued

XRPD peak list of sample TRQ01-API-LTA-1-1-SL-ACN-200 mg-dried.

| Pos. [°2Th.] | Height [cts] | FWHM [°2Th.] | d-spacing [Å] | Rel. Int. [%] |
|---|---|---|---|---|
| 26.0350 | 101.16 | 0.0787 | 3.42261 | 0.97 |
| 26.2977 | 394.07 | 0.0787 | 3.38900 | 3.79 |
| 26.6413 | 30.81 | 0.1181 | 3.34607 | 0.30 |
| 27.1736 | 35.13 | 0.1378 | 3.28172 | 0.34 |
| 27.8987 | 478.01 | 0.0492 | 3.19806 | 4.60 |
| 28.3776 | 69.95 | 0.1181 | 3.14517 | 0.67 |
| 28.7663 | 180.85 | 0.0590 | 3.10355 | 1.74 |
| 28.9528 | 317.10 | 0.1181 | 3.08398 | 3.05 |
| 29.6991 | 251.58 | 0.0787 | 3.00816 | 2.42 |
| 30.1333 | 423.21 | 0.0787 | 2.96580 | 4.07 |
| 30.5511 | 124.72 | 0.1378 | 2.92619 | 1.20 |
| 31.1063 | 62.49 | 0.0590 | 2.87522 | 0.60 |
| 31.7806 | 408.88 | 0.0394 | 2.81573 | 3.93 |
| 32.2082 | 26.43 | 0.1181 | 2.77932 | 0.25 |
| 32.6486 | 108.21 | 0.0689 | 2.74283 | 1.04 |
| 33.4789 | 161.08 | 0.0590 | 2.67668 | 1.55 |
| 33.8272 | 66.46 | 0.1574 | 2.64991 | 0.64 |
| 34.4406 | 57.61 | 0.0590 | 2.60411 | 0.55 |
| 34.8017 | 58.46 | 0.0787 | 2.57791 | 0.56 |
| 35.2706 | 114.97 | 0.0590 | 2.54471 | 1.11 |
| 35.7538 | 40.30 | 0.1574 | 2.51141 | 0.39 |
| 37.1881 | 154.39 | 0.1181 | 2.41778 | 1.49 |
| 37.8891 | 127.37 | 0.0886 | 2.37465 | 1.23 |
| 38.5847 | 59.73 | 0.0787 | 2.33342 | 0.57 |
| 39.5967 | 76.20 | 0.1378 | 2.27609 | 0.73 |

DSC/TGA/EGA

Figure 45:
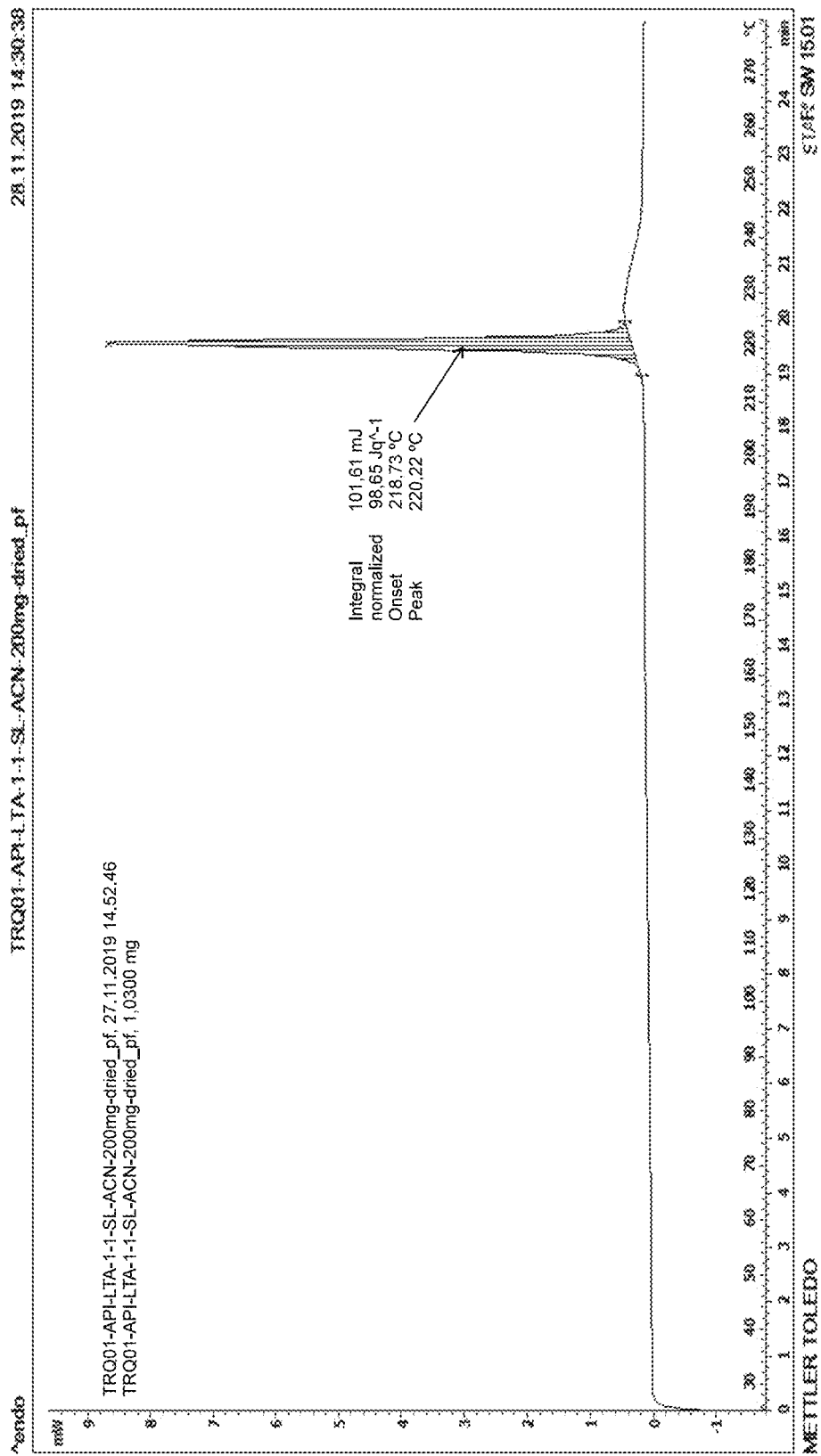
FIG. 45 shows the DSC profile of sample TRQ01-API-LTA-1-1-SL-ACN-200 mg-dried.
Figure 46:
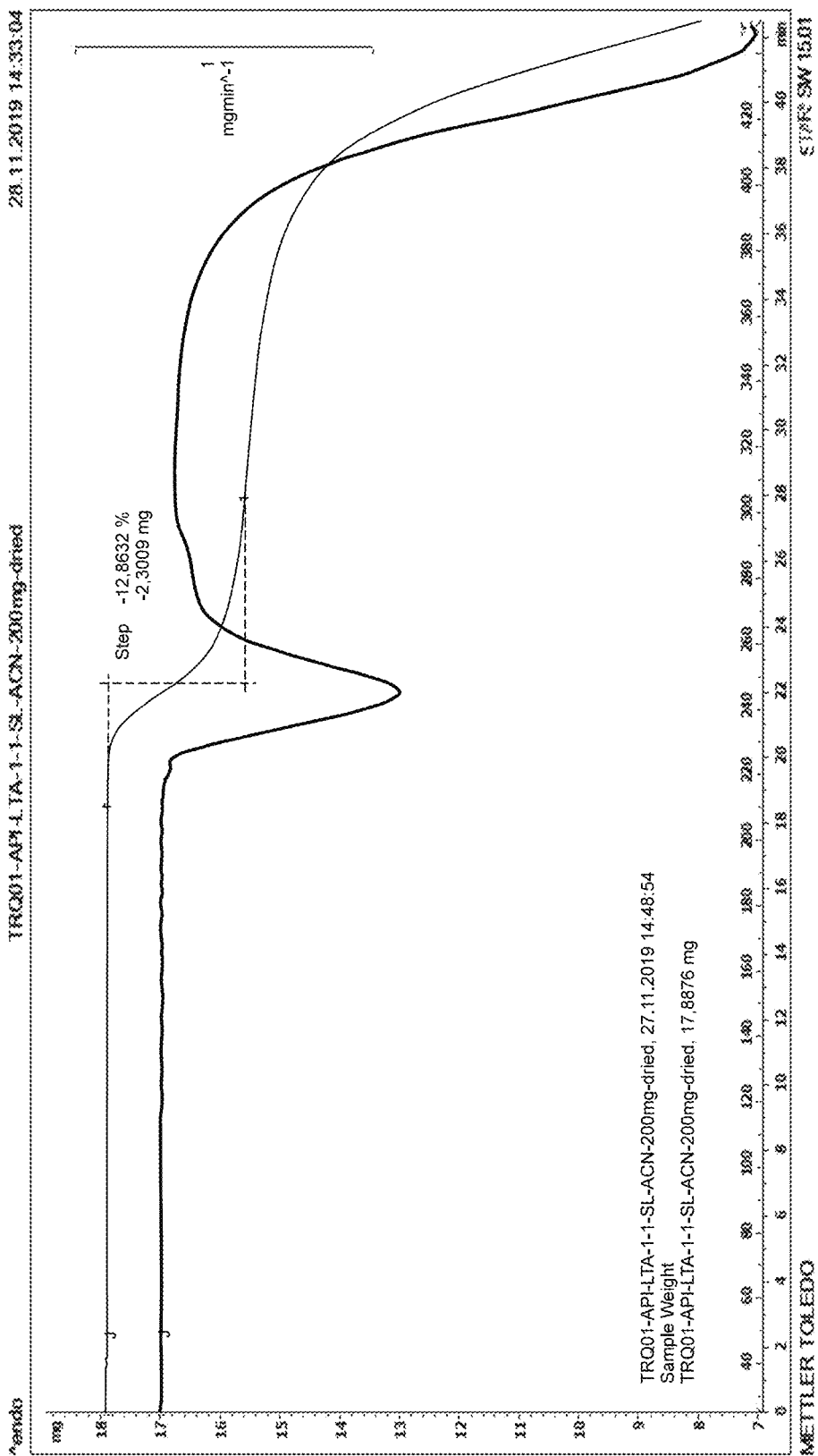
FIG. 46 shows the TG (black line) and dTG (red line) profiles of sample TRQ01-API-LTA-1-1-SL-ACN-200 mg-dried.
Figure 47:
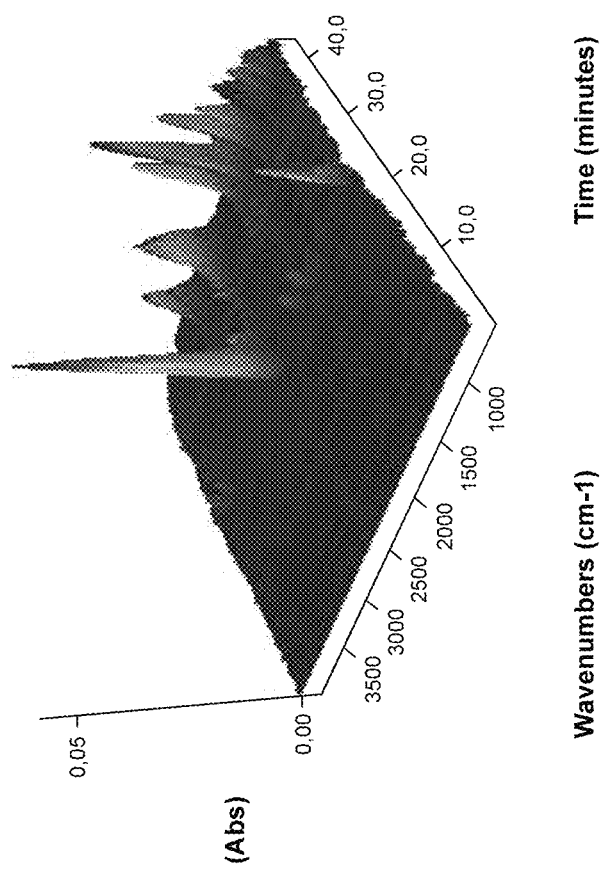
FIG. 47 shows the 3D-EGA profile of sample TRQ01-API-LTA-1-1-SL-ACN-200 mg-dried.

FIGS. 45, 46 and 47 correspond to DSC, TG and EGA analyses performed on sample TRQ01-API-LTA-1-1-SL-ACN-200 mg-dried were reported below.

The DSC profile showed a sharp endothermic peak at 220.2° C. (Onset 218.7° C.) imputable to sample melting and decomposition.

TG/EG analysis highlighted the recovery of an anhydrous compound and confirmed the presence of L-Tartaric Acid in the isolated species. In fact, at approx. 210° C., in correspondence with the sharp endothermic peak observed in DSC, a weight loss of 12.9% w/w was registered and the massive evolution of Carbon Dioxide was highlighted, imputable to the presence of the coformer in the analyzed sample.

In addition, TGA confirmed the decomposition of the Apixaban moiety above approx. 320° C.

FT-IR

Figure 48:
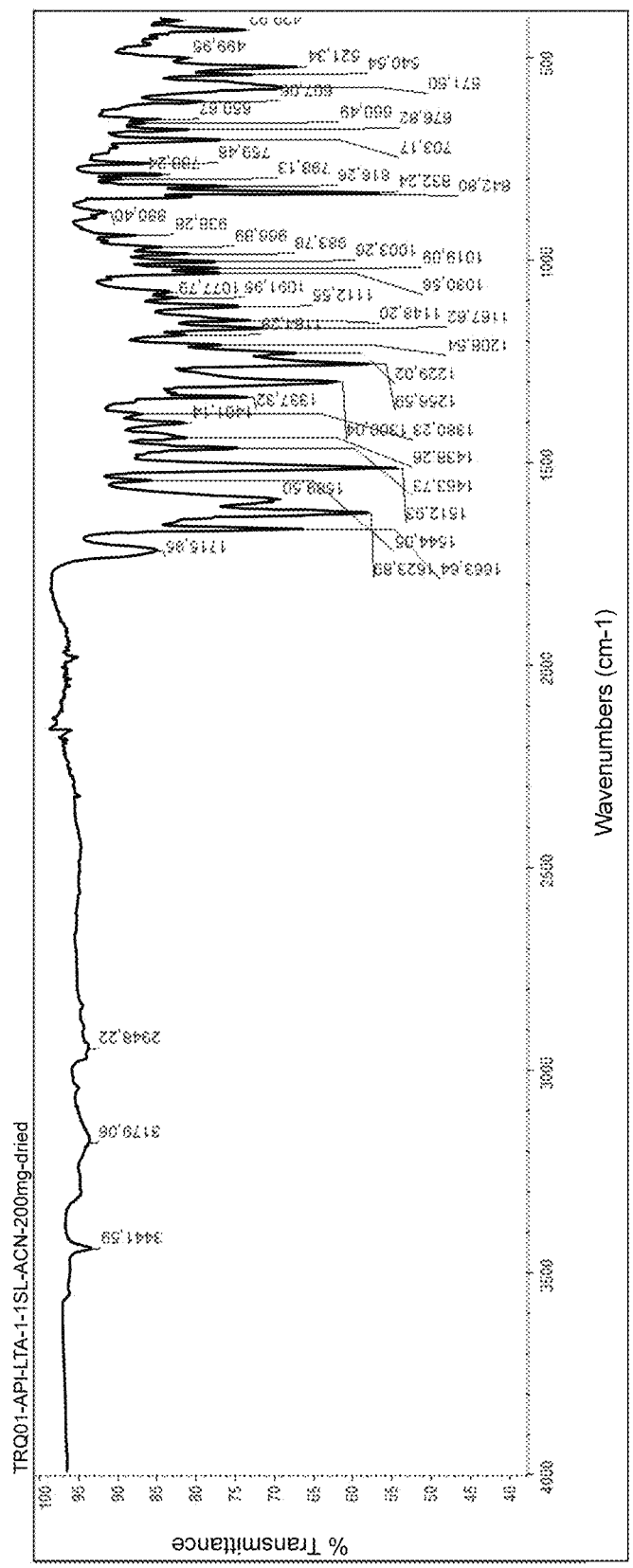
FIG. 48 is the FT-IR spectrum of sample TRQ01-API-LTA-1-1-SL-ACN-200 mg-dried.

In the FIG. 48 was reported the FT-IR spectrum of API-LTA derivative NP01 and the peaks list can be found in the table below.

The comparison with FT-IR spectrum of Apixaban suggested the formation of a new species. In detail, the band at 1716 cm$^{-1}$ could be associated to the presence of the coformer in the new derivative.

TABLE 17

FT-IR peak list of sample TRQ01-API-LTA-1-1-SL-ACN-200 mg-dried.

| Position (cm$^{-1}$) | Intensity | Position (cm$^{-1}$) | Intensity |
|---|---|---|---|
| 406.48 | 82.105 | 1077.79 | 83.328 |
| 429.92 | 73.782 | 1091.95 | 82.493 |
| 499.95 | 80.911 | 1112.55 | 74.571 |
| 521.34 | 66.773 | 1148.20 | 72.692 |
| 540.54 | 72.697 | 1167.62 | 71.309 |
| 571.50 | 68.957 | 1184.28 | 81.326 |
| 607.06 | 79.214 | 1208.54 | 76.830 |

TABLE 17-continued

FT-IR peak list of sample TRQ01-
API-LTA-1-1-SL-ACN-200 mg-dried.

| Position (cm$^{-1}$) | Intensity | Position (cm$^{-1}$) | Intensity |
|---|---|---|---|
| 650.67 | 84.891 | 1229.02 | 67.133 |
| 660.49 | 86.427 | 1256.59 | 57.924 |
| 676.82 | 80.931 | 1300.04 | 61.824 |
| 703.17 | 76.904 | 1337.32 | 73.293 |
| 759.48 | 85.954 | 1380.23 | 87.062 |
| 788.24 | 84.191 | 1401.14 | 81.318 |
| 798.13 | 89.432 | 1438.26 | 81.077 |
| 816.26 | 75.641 | 1463.73 | 74.530 |
| 832.24 | 56.297 | 1512.93 | 54.197 |
| 842.80 | 80.435 | 1544.05 | 85.843 |
| 880.40 | 91.273 | 1589.50 | 69.351 |
| 938.28 | 87.606 | 1623.89 | 57.885 |
| 966.89 | 84.269 | 1663.64 | 66.135 |
| 983.78 | 80.692 | 1715.95 | 84.836 |
| 1003.26 | 77.511 | 2948.22 | 93.582 |
| 1019.09 | 76.939 | 3179.06 | 93.455 |
| 1030.56 | 76.802 | 3441.59 | 93.237 |

FT-Raman

Figure 49:
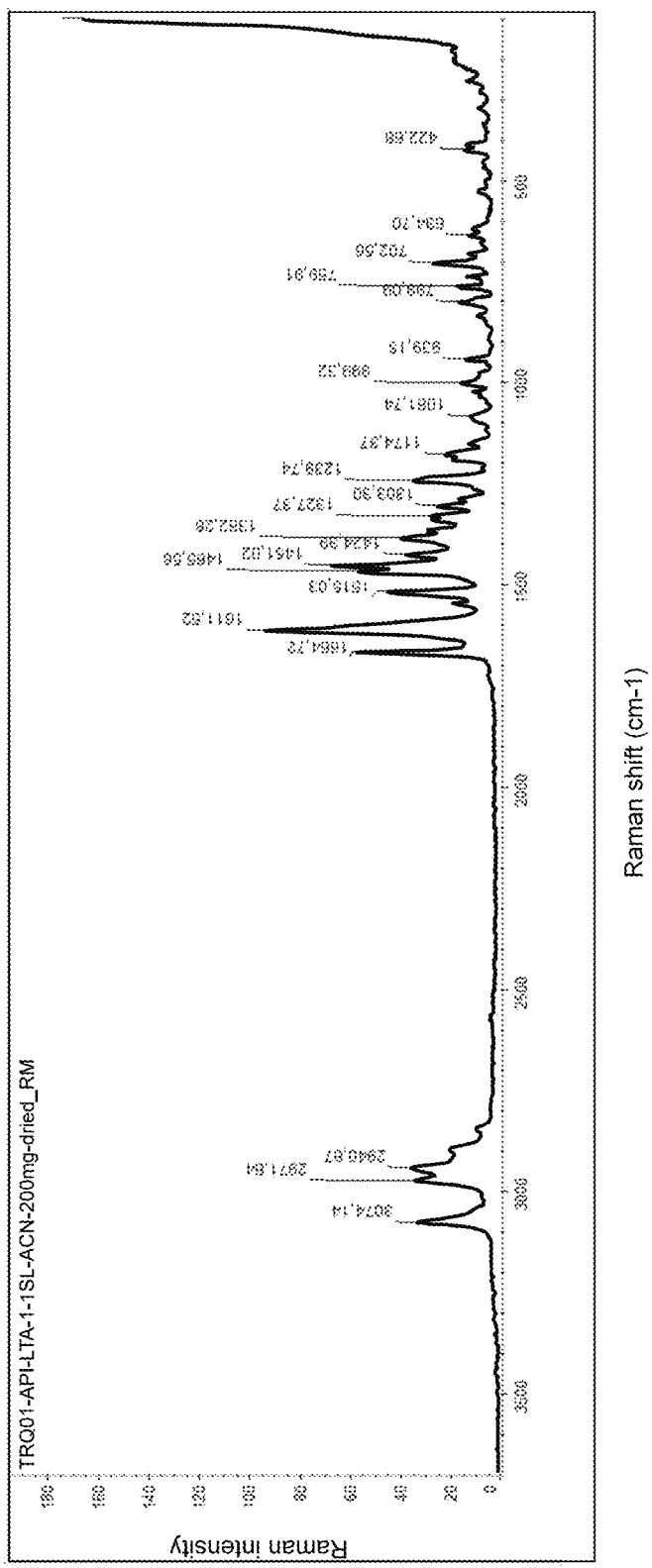
FIG. 49 is the FT-Raman spectrum of sample TRQ01-API-LTA-1-1-SL-ACN-200 mg-dried.

In the FIG. 49 was reported the FT-Raman spectrum of API-LTA derivative NP01 and its peak list can be found in the table below.

TABLE 18

FT-Raman peak list of sample TRQ01-
API-LTA-1-1-SL-ACN-200 mg-dried.

| Position (cm$^{-1}$) | Intensity | Position (cm$^{-1}$) | Intensity |
|---|---|---|---|
| 98.96 | 165.565 | 1327.37 | 26.966 |
| 422.68 | 14.101 | 1382.26 | 38.691 |
| 634.70 | 12.357 | 1424.39 | 37.177 |
| 702.56 | 26.411 | 1451.02 | 66.594 |
| 759.91 | 16.330 | 1465.56 | 56.221 |
| 799.09 | 16.558 | 1515.03 | 44.721 |
| 939.15 | 13.239 | 1611.52 | 93.247 |
| 999.32 | 14.398 | 1664.72 | 56.656 |
| 1081.74 | 11.264 | 2940.87 | 34.703 |
| 1174.37 | 21.100 | 2971.84 | 33.510 |
| 1239.74 | 34.121 | 3074.14 | 32.451 |
| 1303.30 | 24.448 | | |

1H-NMR

Figure 50:
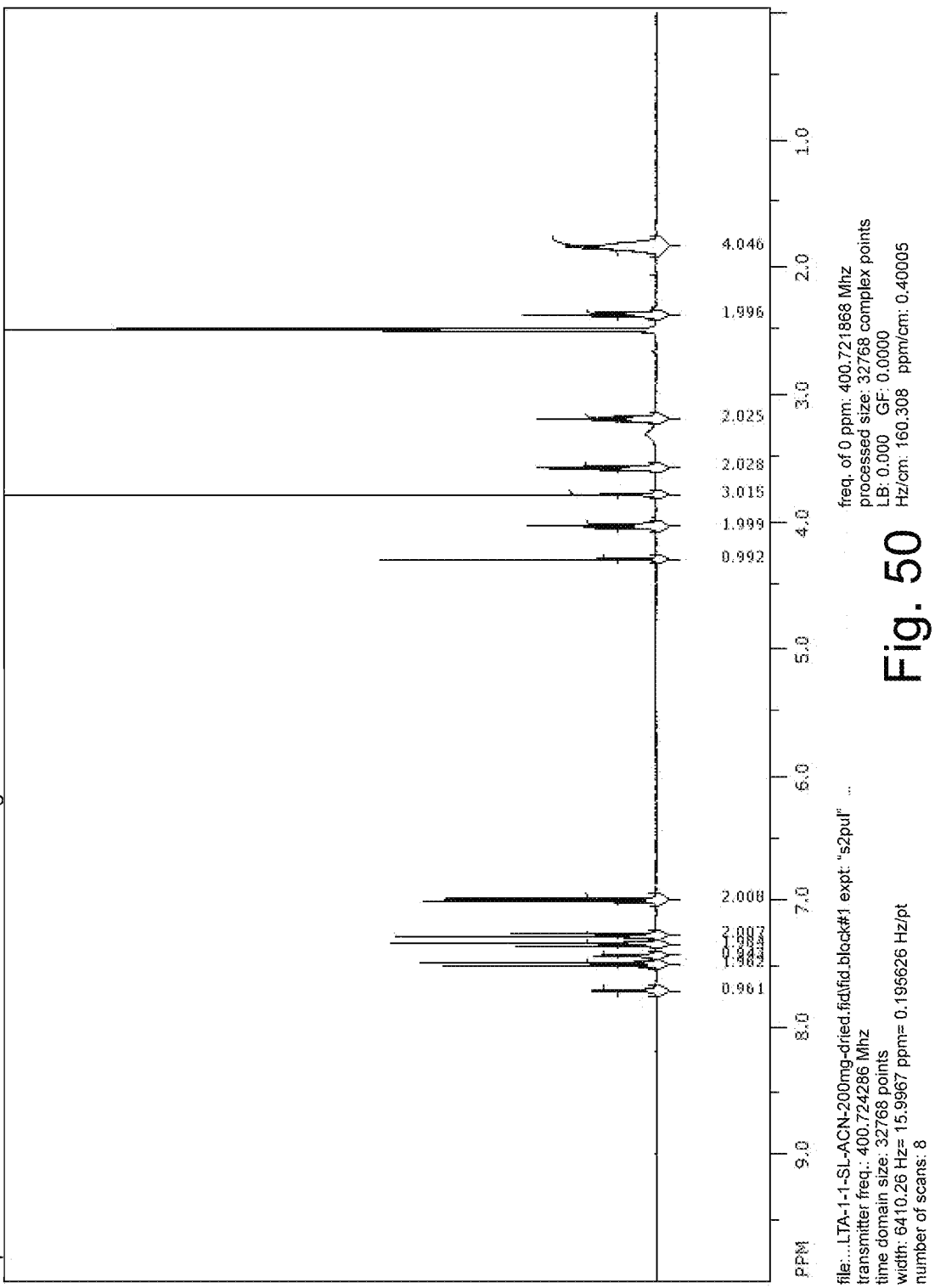
FIG. 50 is the 1H-NMR spectrum of sample TRQ01-API-LTA-1-1-SL-ACN-200 mg-dried.

The 1H-NMR spectrum (FIG. 50) of TRQ01-API-LTA-1-1-SL-ACN-200 mg-dried revealed the presence of Apixaban and L-Tartaric Acid in the stoichiometric ratio API:LTA approx. 1:0.5. The structural integrity of the molecule was confirmed. No traces of residual solvents were visible.

Spectrum 1H-NMR data are as follows: (400 MHz, DMSO-d6) δ: 7.71 (bs, 1H), 7.50 (d, J=8.8 Hz, 2H), 7.43 (bs, 1H), 7.35 (d, J=8.8 Hz, 2H), 7.27 (d, J=8.8 Hz, 2H), 7.00 (d, J=8.8 Hz, 2H), 4.31 (s, 1H), 4.05 (t, J=6.4 Hz, 2H), 3.80 (s, 3H), 3.59 (t, J=5.6 Hz, 2H), 3.20 (t, J=6.4 Hz, 2H), 2.38 (t, J=6.4 Hz, 2H), 1.90-1.78 (m, 4H).

Apixaban—Citric Acid Derivative

A new derivative of Apixaban and Citric Acid was observed from Kneading experiment using Water as solvent, although in mixture with Apixaban Form I.

Characterization of API-CIA Derivative NP02 (200 mg Scale)

Synthesis 92.0 mg of Citric Acid (1.1 equivalents) were accurately weighed in a 20 ml glass vial equipped with a magnetic stirring bar and 6.8 ml of ETA were added. After complete dissolution of the coformer, 200 mg of Apixaban were added and the resulting mixture was stirred for 48 hours at room temperature.

After this time, the formed solid was isolated by vacuum filtration and washed with 4 ml of ETA, analyzed by XRPD and dried at 40° C. and 30 mbar for 70 hours. After the drying step, XRPD analysis was performed again.

The desired derivative API-CIA-NP02 was successfully isolated and it was fully characterized.

XRPD

Figure 51:
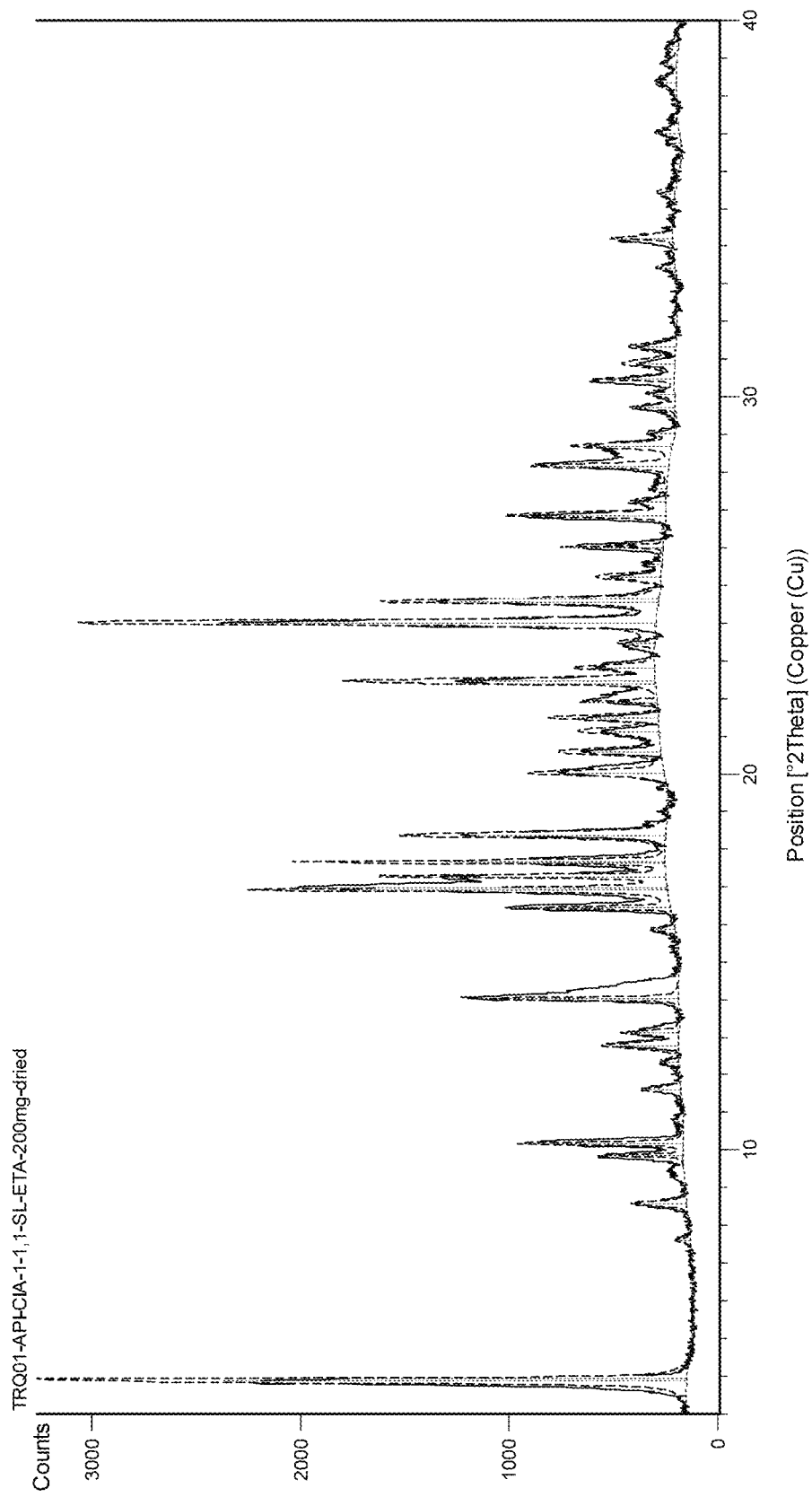
FIG. 51 is the XRPD pattern of sample TRQ01-API-CIA-1-1,1-SL-ETA-200 mg-dried.

The XRPD spectrum pattern is shown in FIG. 51 and the list of peaks of sample TRQ01-API-CIA-1-1,1-SL-ETA-200 mg-dried was reported in the table below.

TABLE 19

XRPD peak list of sample TRQ01-API-
CIA-1-1,1-SL-ETA-200 mg-dried.

| Pos. [°2Th.] | Height [cts] | FWHM [°2Th.] | d-spacing [Å] | Rel. Int. [%] |
|---|---|---|---|---|
| 3.8685 | 2229.91 | 0.1279 | 22.84065 | 100.00 |
| 3.9307 | 1623.10 | 0.0492 | 22.47934 | 72.79 |
| 7.5922 | 63.97 | 0.1181 | 11.64457 | 2.87 |
| 8.5810 | 242.76 | 0.1378 | 10.30475 | 10.89 |
| 9.8526 | 395.46 | 0.0590 | 8.97751 | 17.73 |
| 10.1712 | 753.26 | 0.0787 | 8.69701 | 33.78 |
| 10.7764 | 45.24 | 0.1574 | 8.20989 | 2.03 |
| 11.5998 | 181.37 | 0.1378 | 7.62889 | 8.13 |
| 12.3210 | 81.78 | 0.1574 | 7.18397 | 3.67 |
| 12.7613 | 337.26 | 0.1771 | 6.93702 | 15.12 |
| 13.1062 | 251.35 | 0.1181 | 6.75526 | 11.27 |
| 14.0074 | 958.57 | 0.0689 | 6.32259 | 42.99 |
| 15.8536 | 108.08 | 0.1378 | 5.59025 | 4.85 |
| 16.4175 | 772.57 | 0.0590 | 5.39948 | 34.65 |
| 16.8933 | 1508.14 | 0.0960 | 5.24410 | 67.63 |
| 16.9610 | 1808.15 | 0.0480 | 5.23631 | 81.09 |
| 17.2488 | 1106.84 | 0.0720 | 5.13683 | 49.64 |
| 17.6078 | 931.54 | 0.0480 | 5.03289 | 41.77 |
| 17.6506 | 1048.69 | 0.0480 | 5.02078 | 47.03 |
| 18.3421 | 902.66 | 0.1440 | 4.83302 | 40.48 |
| 18.9738 | 26.79 | 0.1440 | 4.67352 | 1.20 |
| 19.6218 | 29.55 | 0.1440 | 4.52062 | 1.33 |
| 20.0190 | 466.66 | 0.1440 | 4.43180 | 20.93 |
| 20.5845 | 346.89 | 0.1680 | 4.31131 | 15.56 |
| 21.1303 | 265.00 | 0.1920 | 4.20117 | 11.88 |
| 21.4897 | 383.39 | 0.1200 | 4.13172 | 17.19 |
| 21.9106 | 359.88 | 0.0360 | 4.05328 | 16.14 |
| 22.4050 | 710.33 | 0.0600 | 3.96495 | 31.85 |
| 22.4783 | 938.46 | 0.0960 | 3.95219 | 42.09 |
| 22.8080 | 273.90 | 0.1440 | 3.89579 | 12.28 |
| 23.4822 | 133.42 | 0.1440 | 3.78545 | 5.98 |
| 24.0102 | 2099.98 | 0.1320 | 3.70338 | 94.17 |
| 24.5732 | 1044.01 | 0.1200 | 3.61979 | 46.82 |
| 24.6510 | 813.74 | 0.0720 | 3.61751 | 36.49 |
| 25.2201 | 226.43 | 0.1680 | 3.52839 | 10.15 |
| 25.5677 | 73.76 | 0.1440 | 3.48120 | 3.31 |
| 26.0148 | 498.36 | 0.0360 | 3.42238 | 22.35 |
| 26.8588 | 656.92 | 0.0960 | 3.31672 | 29.46 |
| 27.2099 | 132.73 | 0.1440 | 3.27472 | 5.95 |
| 27.5676 | 63.95 | 0.1440 | 3.23303 | 2.87 |
| 28.1638 | 571.29 | 0.0960 | 3.16593 | 25.62 |
| 28.6910 | 399.98 | 0.1200 | 3.10894 | 17.94 |
| 29.0331 | 103.54 | 0.1440 | 3.07309 | 4.64 |
| 29.7234 | 195.49 | 0.0960 | 3.00327 | 8.77 |
| 30.0797 | 103.48 | 0.1440 | 2.96851 | 4.64 |
| 30.4811 | 340.39 | 0.0720 | 2.93032 | 15.26 |
| 30.8720 | 182.48 | 0.2160 | 2.89410 | 8.18 |
| 31.3219 | 170.50 | 0.1920 | 2.85355 | 7.65 |
| 32.0824 | 17.53 | 0.2880 | 2.78762 | 0.79 |
| 33.2169 | 78.17 | 0.1200 | 2.67858 | 3.51 |
| 34.2182 | 276.39 | 0.0840 | 2.61836 | 12.39 |
| 35.4066 | 68.20 | 0.1920 | 2.53315 | 3.06 |
| 36.1864 | 32.93 | 0.2880 | 2.48033 | 1.48 |
| 36.7237 | 56.04 | 0.1440 | 2.44526 | 2.51 |
| 37.0014 | 87.12 | 0.1920 | 2.42754 | 3.91 |
| 38.3233 | 76.99 | 0.2880 | 2.34680 | 3.45 |
| 38.8273 | 68.62 | 0.1440 | 2.31748 | 3.08 |
| 39.3128 | 52.21 | 0.1920 | 2.28998 | 2.34 |

DSC/TGA/EGA

Figure 52:
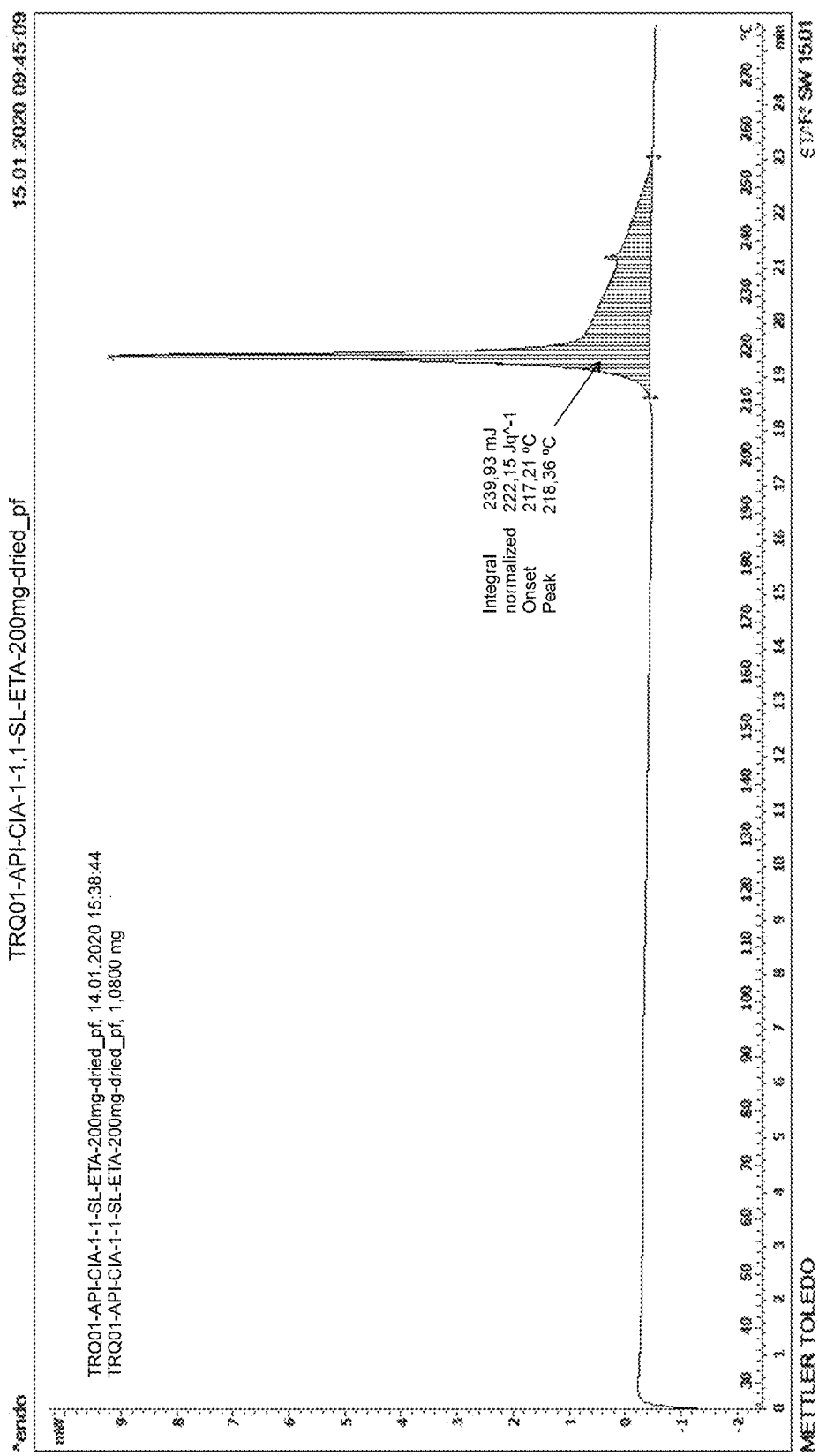
FIG. 52 shows the DSC profile of sample TRQ01-API-CIA-1-1,1-SL-ETA-200 mg-dried.
Figure 53:
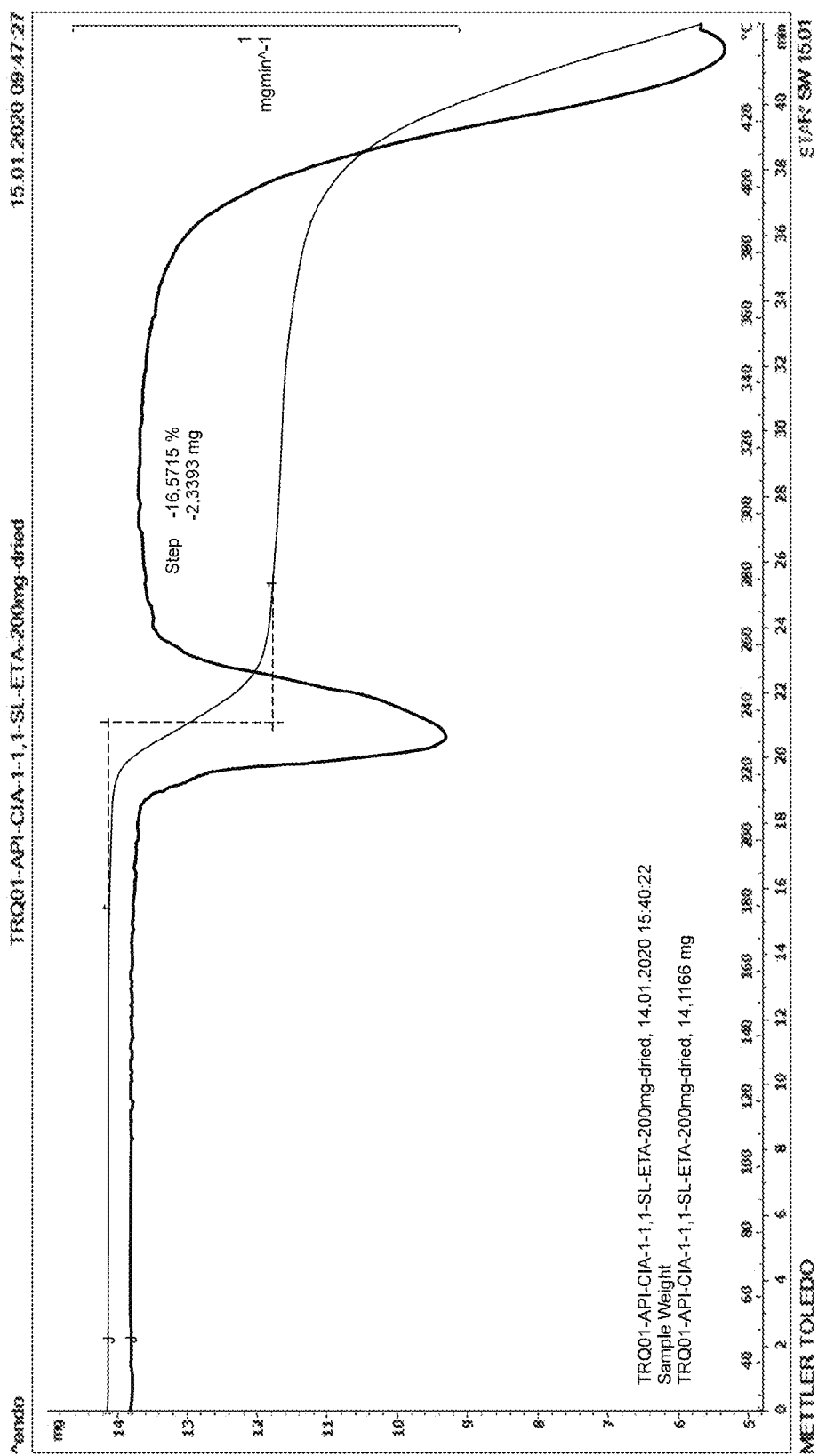
FIG. 53 shows the TG (black line) and dTG (red line) profiles of sample TRQ01-API-CIA-1-1,1-SL-ETA-200 mg-dried.
Figure 54:
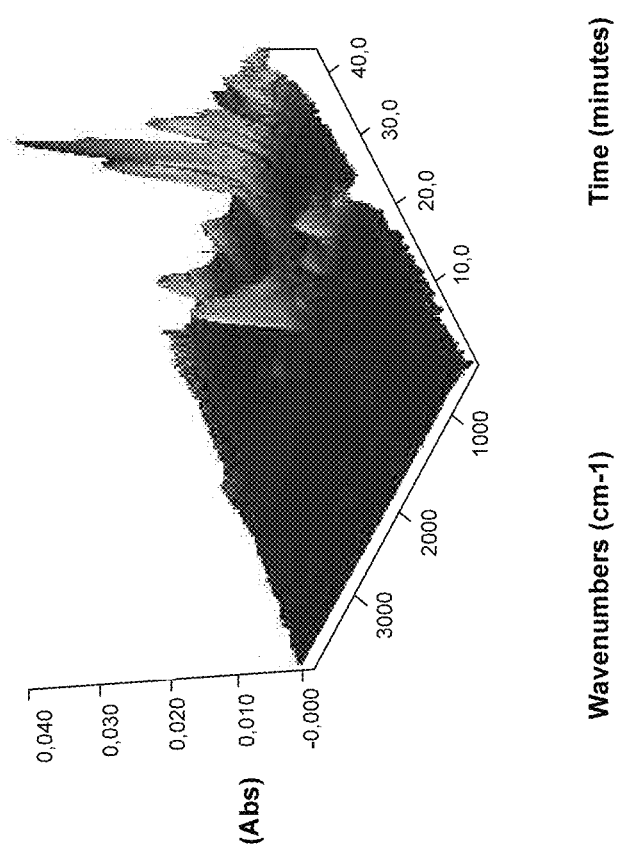
FIG. 54 shows the 3D-EGA profile of sample TRQ01-API-CIA-1-1,1-SL-ETA-200 mg-dried.

FIGS. 52, 53 and 54 correspond to DSC,TG and EGA analyses performed on sample TRQ01-API-CIA-1-1,1-SL-ETA-200 mg-dried were performed.

The DSC profile showed an endothermic peak at 218.4° C. (Onset 217.2° C.) imputable to sample melting and decomposition.

TG/EG analysis highlighted the recovery of an anhydrous compound and confirmed the presence of the coformer in the isolated species. In fact, at approx. 210° C., in correspondence with the endothermic peak observed in DSC, a weight loss of 16.6% w/w was registered and the evolution of Citraconic Anhydride was highlighted. This evidence confirmed the presence of Citric Acid in the analyzed sample.

In addition, TGA confirmed the decomposition of the Apixaban moiety above approx. 340° C.

FT-IR

Figure 55:
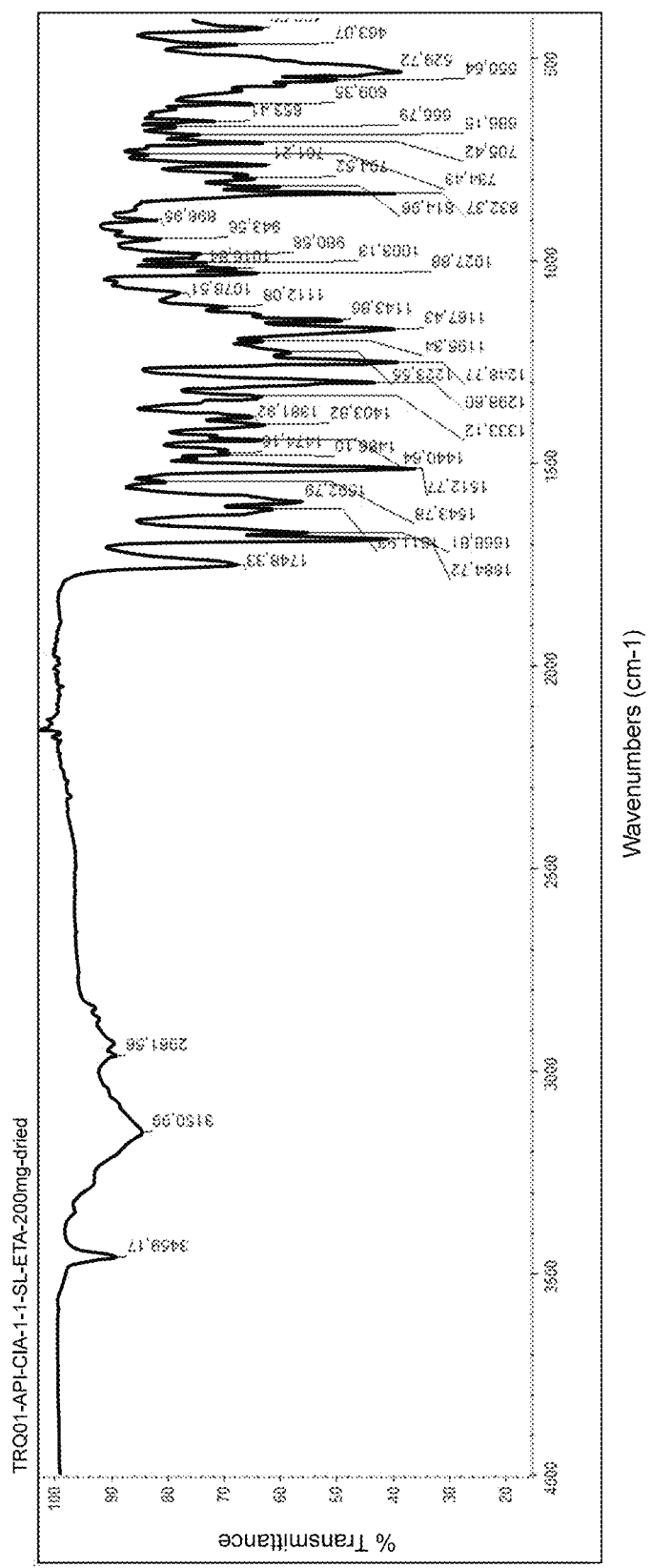
FIG. 55 is the FT-IR spectrum of sample TRQ01-API-CIA-1-1,1-SL-ETA-200 mg-dried.

In the FIG. 55 was reported the FT-IR spectrum of API-CIA derivative NP02 and the its peak list was provided in the table below. The comparison with FT-IR spectrum of Apixaban suggested the formation of a new species. In detail, the band at 1748 cm$^{-1}$ could be associated to the presence of the coformer in the new derivative.

TABLE 20

FT-IR peak list of sample TRQ01-API-CIA-1-1,1-SL-ETA-200 mg-dried.

| Position (cm$^{-1}$) | Intensity | Position (cm$^{-1}$) | Intensity |
|---|---|---|---|
| 423.58 | 63.221 | 1143.86 | 49.050 |
| 463.07 | 67.332 | 1167.43 | 39.626 |
| 529.72 | 38.185 | 1195.34 | 63.016 |
| 550.64 | 49.890 | 1223.55 | 58.226 |
| 609.35 | 64.935 | 1248.77 | 38.746 |
| 653.41 | 71.496 | 1298.60 | 42.848 |
| 666.79 | 78.477 | 1333.12 | 62.962 |
| 686.15 | 74.331 | 1381.92 | 64.893 |
| 705.42 | 62.940 | 1403.82 | 62.688 |
| 734.43 | 83.539 | 1440.64 | 62.872 |
| 761.21 | 62.261 | 1474.16 | 68.995 |
| 794.52 | 64.664 | 1486.10 | 74.551 |
| 814.96 | 60.157 | 1512.77 | 35.688 |
| 832.37 | 39.455 | 1543.78 | 80.195 |
| 896.95 | 81.762 | 1592.79 | 55.847 |
| 943.56 | 81.387 | 1611.93 | 60.934 |
| 980.58 | 73.980 | 1668.81 | 55.030 |
| 1003.13 | 72.963 | 1684.72 | 40.530 |
| 1016.84 | 67.591 | 1748.33 | 67.446 |
| 1027.88 | 63.784 | 2961.56 | 89.148 |
| 1078.51 | 77.617 | 3150.99 | 84.348 |
| 1112.08 | 69.360 | 3459.17 | 88.956 |

FT-Raman

Figure 56:
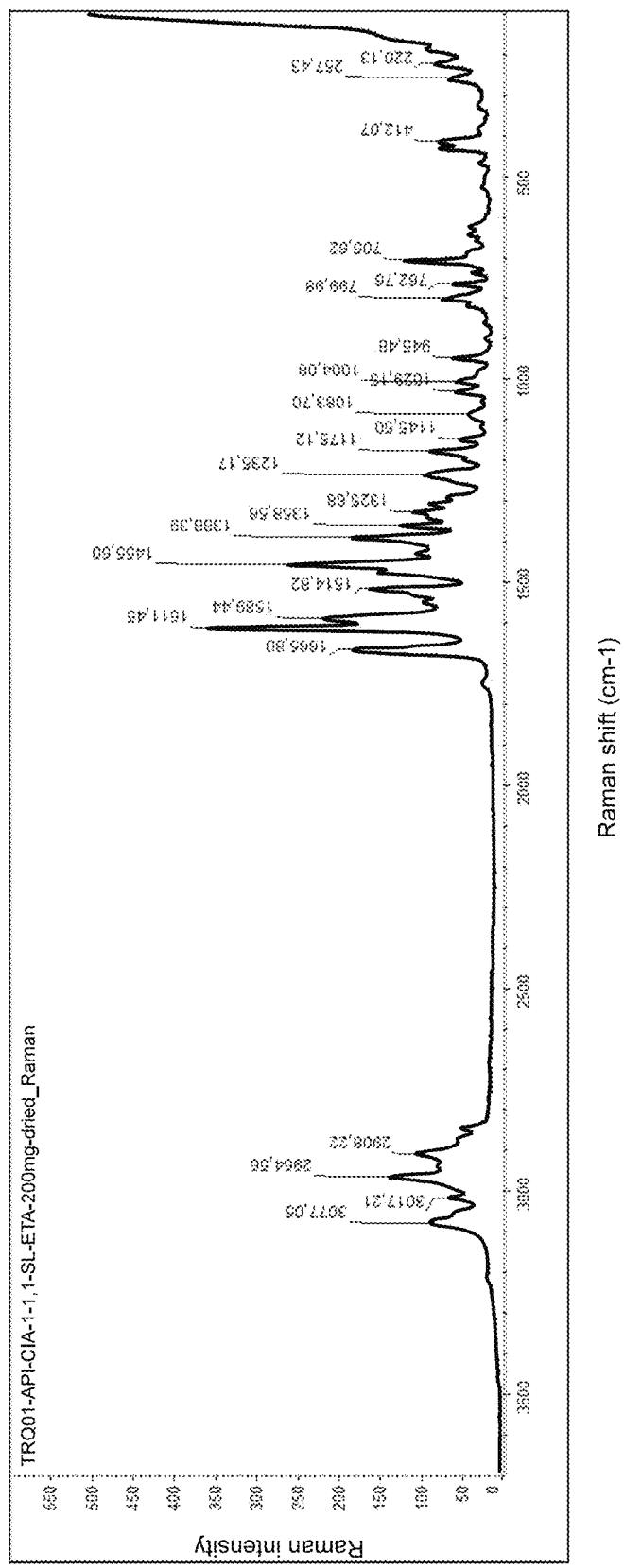
FIG. 56 is the FT-Raman spectrum of sample TRQ01-API-CIA-1-1,1-SL-ETA-200 mg-dried.

In the FIG. 56 below was reported the FT-Raman spectrum of API-CIA derivative NP02 along with its peak list.

TABLE 21

FT-Raman peak list of sample TRQ01-API-CIA-1-1,1-SL-ETA-200 mg-dried.

| Position (cm$^{-1}$) | Intensity | Position (cm$^{-1}$) | Intensity |
|---|---|---|---|
| 97.08 | 505.607 | 1235.17 | 93.272 |
| 220.13 | 80.522 | 1325.68 | 105.989 |
| 257.43 | 62.864 | 1358.56 | 123.395 |
| 412.07 | 75.562 | 1388.39 | 181.961 |
| 705.62 | 115.915 | 1455.60 | 259.337 |
| 762.76 | 59.003 | 1514.82 | 159.147 |
| 799.98 | 68.979 | 1589.44 | 216.235 |
| 945.48 | 56.201 | 1611.45 | 358.690 |
| 1004.08 | 54.745 | 1665.80 | 180.082 |

TABLE 21-continued

FT-Raman peak list of sample TRQ01-API-CIA-1-1,1-SL-ETA-200 mg-dried.

| Position (cm$^{-1}$) | Intensity | Position (cm$^{-1}$) | Intensity |
|---|---|---|---|
| 1029.15 | 53.520 | 2908.22 | 103.979 |
| 1083.70 | 39.432 | 2964.56 | 134.478 |
| 1145.50 | 50.522 | 3017.21 | 63.534 |
| 1175.12 | 87.176 | 3077.05 | 87.312 |

1H-NMR

Figure 57:
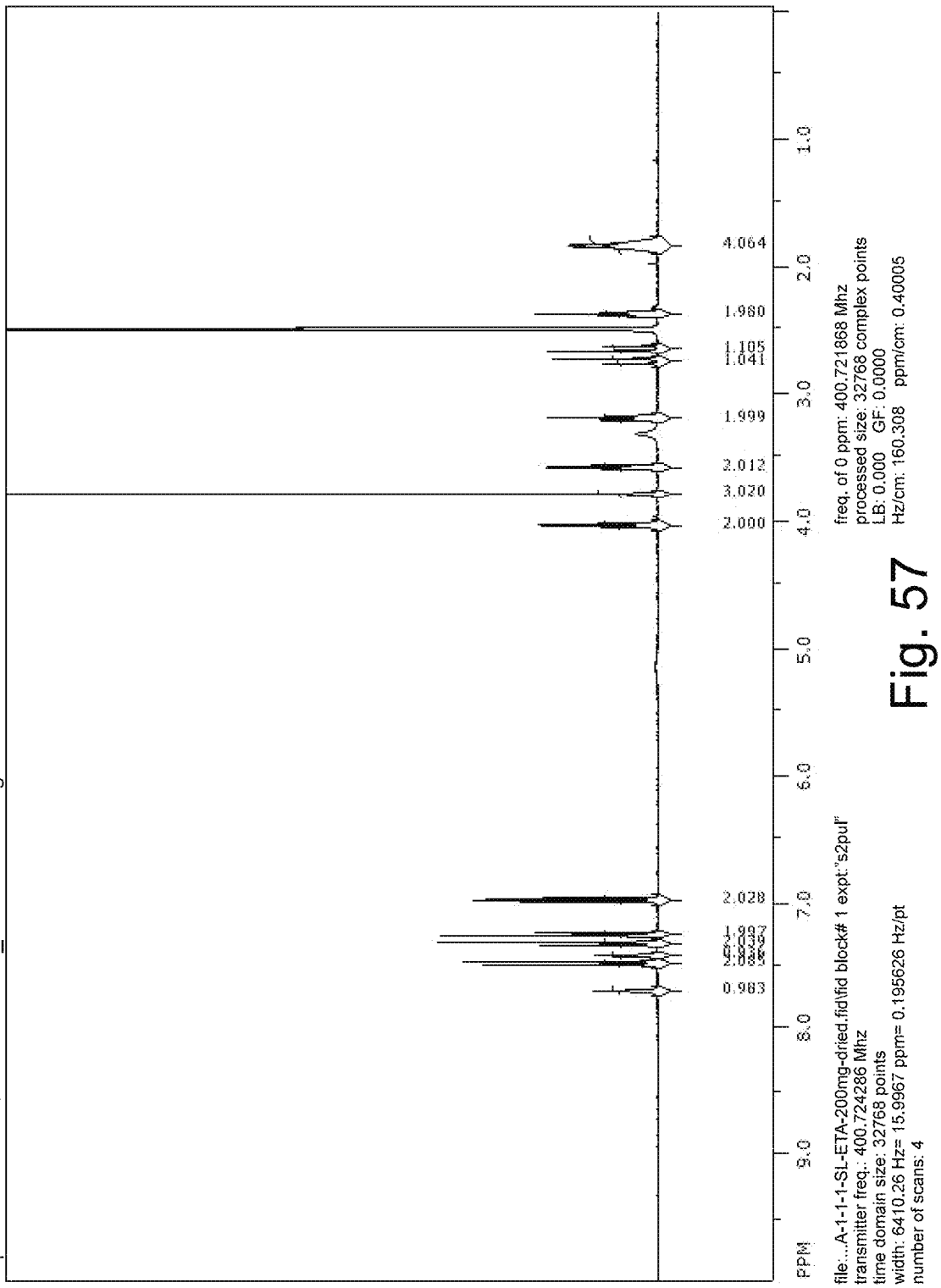
FIG. 57 is the 1H-NMR spectrum of sample TRQ01-API-CIA-1-1,1-SL-ETA-200 mg-dried.

The 1H-NMR spectrum (FIG. 57) of TRQ01-API-CIA-1-1,1-SL-ETA-200 mg-dried revealed the presence of Apixaban and Citric Acid in the stoichiometric ratio API: CIA of approx. 1:0.5. Moreover, the structural integrity of the molecule was confirmed.

Spectrum 1H-NMR data are as follows: (400 MHz, DMSO-d6) δ: 7.71 (bs, 1H), 7.50 (d, J=8.8 Hz, 2H), 7.43 (bs, 1H), 7.35 (d, J=8.8 Hz, 2H), 7.27 (d, J=8.8 Hz, 2H), 7.00 (d, J=8.8 Hz, 2H), 4.05 (t, J=6.4 Hz, 2H), 3.80 (s, 3H), 3.59 (t, J=5.6 Hz, 2H), 3.20 (t, J=6.4 Hz, 2H), 2.76 (d, J=15.4 Hz, 1H), 2.65 (d, J=15.4 Hz, 1H), 2.38 (t, J=6.4 Hz, 2H), 1.90-1.78 (m, 4H).

The invention claimed is:

1. An apixaban derivative comprising an apixaban-α-ketoglutaric acid cocrystal, wherein the apixaban and the α-ketoglutaric acid are in the stoichiometric ratio of 1:1.

2. The apixaban derivative of claim 1;, wherein a XRPD peak list is as follows:

| Pos. [°2Th.] | Height [cts] | FWHM [°Th.] | d-spacing [Å] | Rel. Int. [%] |
|---|---|---|---|---|
| 3.2265 | 18.82 | 0.2362 | 27.38412 | 0.67 |
| 5.5285 | 37.32 | 0.1574 | 15.98567 | 1.34 |
| 6.3659 | 1448.05 | 0.0984 | 13.88457 | 51.91 |
| 8.5284 | 345.71 | 0.0394 | 10.36826 | 12.39 |
| 10.9701 | 48.68 | 0.1574 | 8.06539 | 1.74 |
| 12.4024 | 417.06 | 0.0492 | 7.13698 | 14.95 |
| 13.5989 | 646.45 | 0.0689 | 6.51159 | 23.17 |
| 13.9609 | 660.42 | 0.0600 | 6.33829 | 23.67 |
| 14.0013 | 781.77 | 0.0590 | 6.32534 | 28.02 |
| 15.0356 | 418.58 | 0.0394 | 5.89248 | 15.00 |
| 15.6675 | 238.04 | 0.0787 | 5.65623 | 8.53 |
| 15.9813 | 37.52 | 0.0984 | 5.54584 | 1.35 |
| 16.3741 | 293.88 | 0.0689 | 5.41367 | 10.53 |
| 17.0420 | 413.85 | 0.0480 | 5.19869 | 14.84 |
| 17.1107 | 369.93 | 0.0492 | 5.18225 | 13.26 |
| 17.3416 | 640.01 | 0.0787 | 5.11376 | 22.94 |
| 17.8078 | 126.84 | 0.0590 | 4.98092 | 4.55 |
| 18.1972 | 243.69 | 0.0689 | 4.87523 | 8.74 |
| 18.4765 | 65.12 | 0.1181 | 4.80216 | 2.33 |
| 19.0027 | 68.08 | 0.1574 | 4.67035 | 2.44 |
| 19.5763 | 80.73 | 0.1181 | 4.53478 | 2.89 |
| 19.9861 | 745.13 | 0.0689 | 4.44271 | 26.71 |
| 20.3443 | 197.83 | 0.0984 | 4.36529 | 7.09 |
| 20.9534 | 348.54 | 0.0590 | 4.23974 | 12.49 |
| 21.5680 | 393.25 | 0.0394 | 4.12030 | 14.10 |
| 22.3222 | 1123.84 | 0.1378 | 3.98277 | 40.29 |
| 23.4517 | 2789.71 | 0.1279 | 3.79343 | 100.00 |
| 24.0583 | 42.17 | 0.0984 | 3.69916 | 1.51 |
| 24.6482 | 263.89 | 0.1181 | 3.61193 | 9.46 |
| 24.8508 | 201.50 | 0.1181 | 3.58295 | 7.22 |
| 25.6615 | 335.51 | 0.1771 | 3.47157 | 12.03 |
| 26.1885 | 107.14 | 0.1181 | 3.40289 | 3.84 |
| 26.8581 | 533.74 | 0.0984 | 3.31955 | 19.13 |
| 27.2819 | 99.45 | 0.1378 | 3.26894 | 3.56 |
| 28.0618 | 196.45 | 0.0590 | 3.17985 | 7.04 |
| 28.4363 | 99.94 | 0.1181 | 3.13881 | 3.58 |
| 29.8395 | 74.72 | 0.1574 | 2.99433 | 2.68 |
| 30.2508 | 128.90 | 0.1378 | 2.95455 | 4.62 |
| 30.5052 | 93.31 | 0.0984 | 2.93048 | 3.34 |
| 30.8588 | 74.25 | 0.1181 | 2.89771 | 2.66 |

-continued

| Pos. [°2Th.] | Height [cts] | FWHM [°Th.] | d-spacing [Å] | Rel. Int. [%] |
|---|---|---|---|---|
| 31.3648 | 44.90 | 0.1968 | 2.85210 | 1.61 |
| 32.9322 | 38.13 | 0.3936 | 2.71986 | 1.37 |
| 33.8768 | 53.11 | 0.1574 | 2.64614 | 1.90 |
| 34.2951 | 68.77 | 0.1968 | 2.61482 | 2.47 |
| 35.4351 | 68.02 | 0.1574 | 2.53327 | 2.44 |
| 35.6866 | 60.94 | 0.2362 | 2.51599 | 2.18 |
| 37.2404 | 34.78 | 0.1968 | 2.41451 | 1.25 |
| 37.8218 | 47.69 | 0.1968 | 2.37872 | 1.71 |
| 38.7662 | 39.48 | 0.2362 | 2.32292 | 1.42. |

3. The apixaban derivative of claim 1, wherein a DSC profile is shown in FIG. 24.

4. The apixaban derivative of claim 1, wherein a TG and a dTG profiles are shown in FIG. 25.

5. The apixaban derivative of claim 1, wherein a 3D-EGA profile is shown in FIG. 26.

6. The apixaban derivative of claim 1, wherein a FT-IR peak list is as follows:

| Position (cm$^{-1}$) | Intensity |
|---|---|
| 414.10 | 57.872 |
| 431.13 | 75.013 |
| 459.64 | 69.854 |
| 489.44 | 51.917 |
| 513.92 | 67.845 |
| 523.10 | 70.306 |
| 545.30 | 56.641 |
| 560.14 | 51.149 |
| 593.14 | 71.971 |
| 606.42 | 58.161 |
| 615.38 | 63.322 |
| 630.45 | 53.109 |
| 680.94 | 52.539 |
| 708.33 | 49.761 |
| 760.99 | 58.516 |
| 801.53 | 71.012 |
| 813.17 | 59.162 |
| 831.59 | 32.729 |
| 926.04 | 74.704 |
| 945.21 | 71.822 |
| 983.93 | 62.417 |
| 1004.41 | 56.681 |
| 1017.51 | 51.583 |
| 1052.29 | 73.051 |
| 1092.61 | 60.446 |
| 1114.84 | 74.669 |
| 1146.56 | 42.417 |
| 1170.15 | 40.671 |
| 1201.05 | 60.109 |
| 1223.09 | 53.537 |
| 1254.44 | 29.844 |
| 1283.15 | 46.228 |
| 1298.52 | 38.450 |
| 1318.94 | 60.773 |
| 1334.02 | 59.826 |
| 1396.63 | 55.785 |
| 1417.43 | 63.590 |
| 1429.59 | 63.784 |
| 1444.04 | 63.563 |
| 1465.06 | 59.570 |
| 1511.32 | 30.726 |
| 1591.26 | 43.785 |
| 1611.32 | 59.949 |
| 1671.37 | 39.205 |
| 1726.59 | 43.194 |
| 2892.04 | 87.999 |
| 3241.29 | 90.525 |
| 3381.30 | 90.114. |

7. The apixaban derivative of claim 1, wherein a FT-Raman peak list is as follows:

| Position (cm$^{-1}$) | Intensity |
|---|---|
| 106.57 | 216.689 |
| 218.27 | 28.397 |
| 257.68 | 23.743 |
| 404.18 | 24.203 |
| 637.76 | 16.910 |
| 708.88 | 45.366 |
| 762.09 | 31.139 |
| 797.29 | 21.029 |
| 945.36 | 19.812 |
| 1005.82 | 22.576 |
| 1086.06 | 32.451 |
| 1147.98 | 24.916 |
| 1177.51 | 39.878 |
| 1225.93 | 43.981 |
| 1286.79 | 60.348 |
| 1335.38 | 43.432 |
| 1361.42 | 45.116 |
| 1383.61 | 80.404 |
| 1448.42 | 105.022 |
| 1515.14 | 63.409 |
| 1607.96 | 167.686 |
| 1672.50 | 82.915 |
| 1736.89 | 19.867 |
| 2891.14 | 44.257 |
| 2921.22 | 51.791 |
| 2967.87 | 68.067 |
| 3083.06 | 30.101. |

8. The apixaban derivative of claim 1, wherein a 1H-NMR spectrum data are as follows: (400 MHZ, DMSO-d6) δ:7.71 (bs, 1H), 7.50 (d, J=8.8 Hz, 2H), 7.43 (bs, 1H), 7.35 (d, J=8.8 Hz, 2H), 7.27 (d, J=8.8 Hz, 2H), 7.00 (d, J=8.8 Hz, 2H), 4.05 (t, J=6.4 Hz, 2H), 3.80 (s, 3H), 3.59 (t, J=5.6 Hz, 2H), 3.20 (t, J=6.4 Hz, 2H), 2.99 (bs, 1.6H), 2.38 (t, J=6.4 Hz, 2H), 1.90-1.78 (m, 4H).

9. An apixaban derivative comprising an apixaban citric acid cocrystal, wherein apixaban and citric acid are in the stoichiometric ratio of 1:0.5.

10. The apixaban derivative of claim 9, wherein a XRPD peak list is as follows:

| Pos. [°2Th.] | Height [cts] | FWHM [°2Th.] | d-spacing [Å] | Rel. Int. [%] |
|---|---|---|---|---|
| 3.8685 | 2229.91 | 0.1279 | 22.84065 | 100.00 |
| 3.9307 | 1623.10 | 0.0492 | 22.47934 | 72.79 |
| 7.5922 | 63.97 | 0.1181 | 11.64457 | 2.87 |
| 8.5810 | 242.76 | 0.1378 | 10.30475 | 10.89 |
| 9.8526 | 395.46 | 0.0590 | 8.97751 | 17.73 |
| 10.1712 | 753.26 | 0.0787 | 8.69701 | 33.78 |
| 10.7764 | 45.24 | 0.1574 | 8.20989 | 2.03 |
| 11.5998 | 181.37 | 0.1378 | 7.62889 | 8.13 |
| 12.3210 | 81.78 | 0.1574 | 7.18397 | 3.67 |
| 12.7613 | 337.26 | 0.1771 | 6.93702 | 15.12 |
| 13.1062 | 251.35 | 0.1181 | 6.75526 | 11.27 |
| 14.0074 | 958.57 | 0.0689 | 6.32259 | 42.99 |
| 15.8536 | 108.08 | 0.1378 | 5.59025 | 4.85 |
| 16.4175 | 772.57 | 0.0590 | 5.39948 | 34.65 |
| 16.8933 | 1508.14 | 0.0960 | 5.24410 | 67.63 |
| 16.9610 | 1808.15 | 0.0480 | 5.23631 | 81.09 |
| 17.2488 | 1106.84 | 0.0720 | 5.13683 | 49.64 |
| 17.6078 | 931.54 | 0.0480 | 5.03289 | 41.77 |
| 17.6506 | 1048.69 | 0.0480 | 5.02078 | 47.03 |
| 18.3421 | 902.66 | 0.1440 | 4.83302 | 40.48 |
| 18.9738 | 26.79 | 0.1440 | 4.67352 | 1.20 |
| 19.6218 | 29.55 | 0.1440 | 4.52062 | 1.33 |
| 20.0190 | 466.66 | 0.1440 | 4.43180 | 20.93 |
| 20.5845 | 346.89 | 0.1680 | 4.31131 | 15.56 |
| 21.1303 | 265.00 | 0.1920 | 4.20117 | 11.88 |
| 21.4897 | 383.39 | 0.1200 | 4.13172 | 17.19 |
| 21.9106 | 359.88 | 0.0360 | 4.05328 | 16.14 |
| 22.4050 | 710.33 | 0.0600 | 3.96495 | 31.85 |
| 22.4783 | 938.46 | 0.0960 | 3.95219 | 42.09 |
| 22.8080 | 273.90 | 0.1440 | 3.89579 | 12.28 |

-continued

| Pos. [°2Th.] | Height [cts] | FWHM [°2Th.] | d-spacing [Å] | Rel. Int. [%] |
|---|---|---|---|---|
| 23.4822 | 133.42 | 0.1440 | 3.78545 | 5.98 |
| 24.0102 | 2099.98 | 0.1320 | 3.70338 | 94.17 |
| 24.5732 | 1044.01 | 0.1200 | 3.61979 | 46.82 |
| 24.6510 | 813.74 | 0.0720 | 3.61751 | 36.49 |
| 25.2201 | 226.43 | 0.1680 | 3.52839 | 10.15 |
| 25.5677 | 73.76 | 0.1440 | 3.48120 | 3.31 |
| 26.0148 | 498.36 | 0.0360 | 3.42238 | 22.35 |
| 26.8588 | 656.92 | 0.0960 | 3.31672 | 29.46 |
| 27.2099 | 132.73 | 0.1440 | 3.27472 | 5.95 |
| 27.5676 | 63.95 | 0.1440 | 3.23303 | 2.87 |
| 28.1638 | 571.29 | 0.0960 | 3.16593 | 25.62 |
| 28.6910 | 399.98 | 0.1200 | 3.10894 | 17.94 |
| 29.0331 | 103.54 | 0.1440 | 3.07309 | 4.64 |
| 29.7234 | 195.49 | 0.0960 | 3.00327 | 8.77 |
| 30.0797 | 103.48 | 0.1440 | 2.96851 | 4.64 |
| 30.4811 | 340.39 | 0.0720 | 2.93032 | 15.26 |
| 30.8720 | 182.48 | 0.2160 | 2.89410 | 8.18 |
| 31.3219 | 170.50 | 0.1920 | 2.85355 | 7.65 |
| 32.0824 | 17.53 | 0.2880 | 2.78762 | 0.79 |
| 33.4259 | 78.17 | 0.1200 | 2.67858 | 3.51 |
| 34.2182 | 276.39 | 0.0840 | 2.61836 | 12.39 |
| 35.4066 | 68.20 | 0.1920 | 2.53315 | 3.06 |
| 36.1864 | 32.93 | 0.2880 | 2.48033 | 1.48 |
| 36.7237 | 56.04 | 0.1440 | 2.44526 | 2.51 |
| 37.0014 | 87.12 | 0.1920 | 2.42754 | 3.91 |
| 38.3233 | 76.99 | 0.2880 | 2.34680 | 3.45 |
| 38.8273 | 68.62 | 0.1440 | 2.31748 | 3.08 |
| 39.3128 | 52.21 | 0.1920 | 2.28998 | 2.34. |

11. The apixaban derivative of claim 9, wherein a DSC profile is shown in FIG. 52.

12. The apixaban derivative of claim 9, wherein a TG and a dTG profiles are shown in FIG. 53.

13. The apixaban derivative of claim 9, wherein a 3D-EGA profile is shown in FIG. 54.

14. The apixaban derivative of claim 9, wherein a FT-IR peak list is as follows:

| Position (cm$^{-1}$) | Intensity | Position (cm$^{-1}$) | Intensity |
|---|---|---|---|
| 423.58 | 63.221 | 1143.86 | 49.050 |
| 463.07 | 67.332 | 1167.43 | 39.626 |
| 529.72 | 38.185 | 1195.34 | 63.016 |
| 550.64 | 49.890 | 1223.55 | 58.226 |
| 609.35 | 64.935 | 1248.77 | 38.746 |
| 653.41 | 71.496 | 1298.60 | 42.848 |
| 666.79 | 78.477 | 1333.12 | 62.962 |
| 686.15 | 74.331 | 1381.92 | 64.893 |
| 705.42 | 62.940 | 1403.82 | 62.688 |
| 734.43 | 83.539 | 1440.64 | 62.872 |
| 761.21 | 62.261 | 1474.16 | 68.995 |
| 794.52 | 64.664 | 1486.10 | 74.551 |
| 814.96 | 60.157 | 1512.77 | 35.688 |
| 832.37 | 39.455 | 1543.78 | 80.195 |
| 896.95 | 81.762 | 1592.79 | 55.847 |
| 943.56 | 81.387 | 1611.93 | 60.934 |
| 980.58 | 73.980 | 1668.81 | 55.030 |
| 1003.13 | 72.963 | 1684.72 | 40.530 |
| 1016.84 | 67.591 | 1748.33 | 67.446 |
| 1027.88 | 63.784 | 2961.56 | 89.148 |
| 1078.51 | 77.617 | 3150.99 | 84.348 |
| 1112.08 | 69.360 | 3459.17 | 88.956. |

15. The apixaban derivative of claim 9, wherein a FT-Raman peak list is as follows:

| Position (cm$^{-1}$) | Intensity | Position (cm$^{-1}$) | Intensity |
|---|---|---|---|
| 97.08 | 505.607 | 1235.17 | 93.272 |
| 220.13 | 80.522 | 1325.68 | 105.989 |
| 257.43 | 62.864 | 1358.56 | 123.395 |
| 412.07 | 75.562 | 1388.39 | 181.961 |
| 705.62 | 115.915 | 1455.60 | 259.337 |
| 762.76 | 59.003 | 1514.82 | 159.147 |
| 799.98 | 68.979 | 1589.44 | 216.235 |
| 945.48 | 56.201 | 1611.45 | 358.690 |
| 1004.08 | 54.745 | 1665.80 | 180.082 |
| 1029.15 | 53.520 | 2908.22 | 103.979 |
| 1083.70 | 39.432 | 2964.56 | 134.478 |
| 1145.50 | 50.522 | 3017.21 | 63.534 |
| 1175.12 | 87.176 | 3077.05 | 87.312. |

16. The apixaban derivative of claim 9, wherein a spectrum 1H-NMR data are as follows: (400 MHZ, DMSO-d6) δ:7.71 (bs, 1H), 7.50 (d, J=8.8 Hz, 2H), 7.43 (bs, 1H), 7.35 (d, J=8.8 Hz, 2H), 7.27 (d, J=8.8 Hz, 2H), 7.00 (d, J=8.8 Hz, 2H), 4.05 (t, J=6.4 Hz, 2H), 3.80 (s, 3H), 3.59 (t, J=5.6 Hz, 2H), 3.20 (t, J=6.4 Hz, 2H), 2.76 (d, J=15.4 Hz, 1H), 2.65 (d, J=15.4 Hz, 1H), 2.38 (t, J=6.4 Hz, 2H), 1.90-1.78 (m, 4H).

* * * * *